United States Patent [19]
Wakabayashi et al.

[11] Patent Number: 5,918,077
[45] Date of Patent: Jun. 29, 1999

[54] CAMERA WITH VIBRATION CORRECTION FUNCTION

[75] Inventors: Hiroshi Wakabayashi, Yokohama; Hidenori Miyamoto, Urayasu; Toshiyuki Nakamura; Sueyuki Ohishi, both of Tokyo, all of Japan

[73] Assignee: Nikon Corporation, Tokyo, Japan

[21] Appl. No.: 08/782,385

[22] Filed: Jan. 13, 1997

Related U.S. Application Data

[62] Division of application No. 08/373,790, Jan. 17, 1995, Pat. No. 5,623,704.

[30] Foreign Application Priority Data

Apr. 22, 1994 [JP] Japan ................................... 6-85079
Apr. 22, 1994 [JP] Japan ................................... 6-85080
Apr. 22, 1994 [JP] Japan ................................... 6-85081
Apr. 28, 1997 [JP] Japan ................................... 6-92651

[51] Int. Cl.⁶ ...................................................... G03B 5/00
[52] U.S. Cl. ............................................................. 396/55
[58] Field of Search ................................... 396/48, 55, 52, 396/104, 133, 89, 266

[56] References Cited

U.S. PATENT DOCUMENTS 5,146,263  9/1992  Kataoka ................................... 354/430
5,210,563  5/1993  Hamada et al. ........................... 396/55
5,534,967  7/1996  Matsuzawa .............................. 354/430

Primary Examiner—W. B. Perkey

[57] ABSTRACT

A camera with a vibration correction function provided with a continuous shot mode for carrying out continuous photographing, has a vibration detecting device for detecting vibration of the camer, a vibration correcting device for correcting the vibration of the camera at the time of photographing based on a signal from the vibration detecting device, a film feeding device for feeding a photographic film loaded in the camera, a film end detecting device for detecting an end of the photographic film, and a control device for stopping the operation of the vibration detecting device and making the film feeding device start rewinding the photographic film when receiving a film end detection signal from the film end detecting device during photographing under the continuous shot mode.

13 Claims, 43 Drawing Sheets

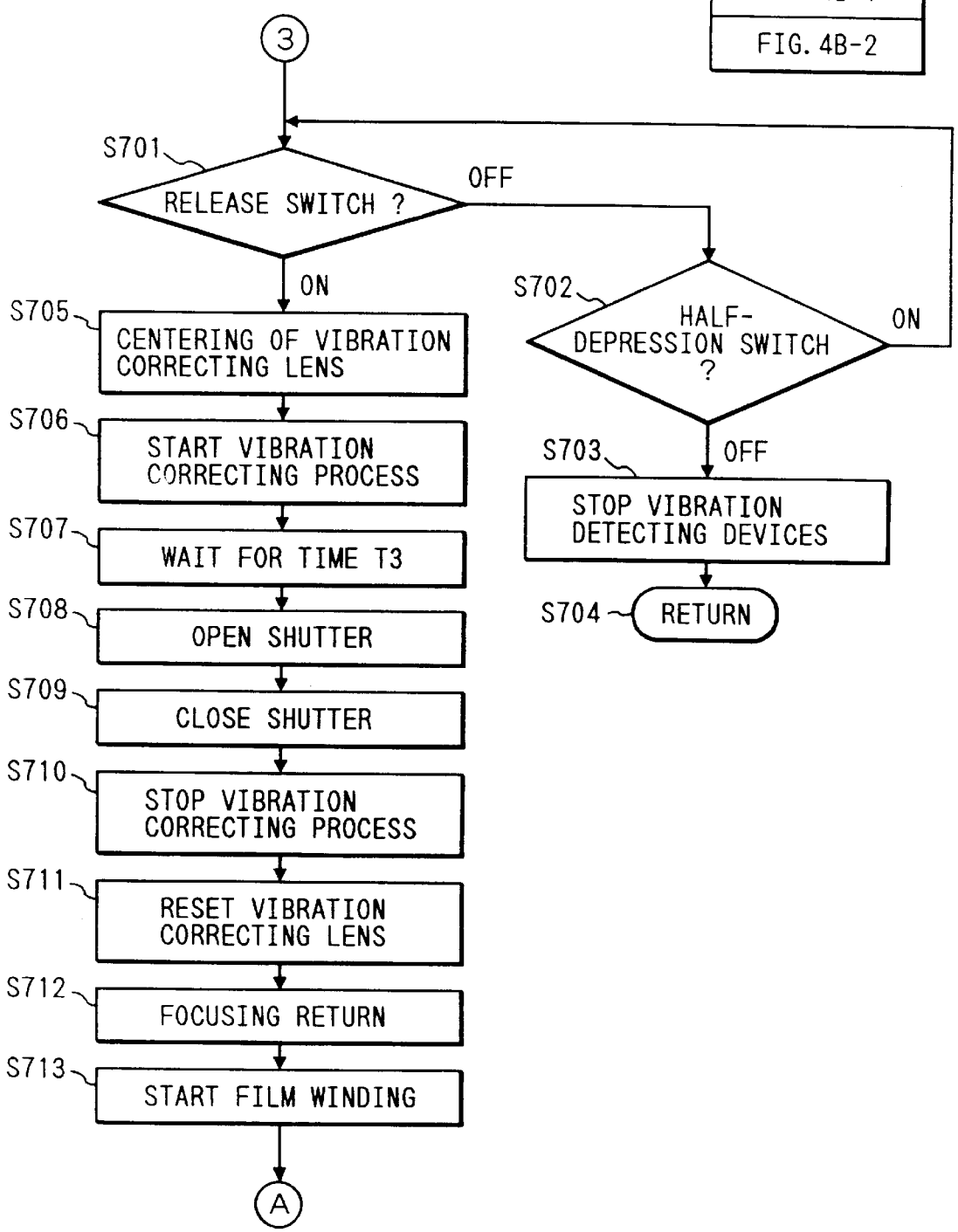

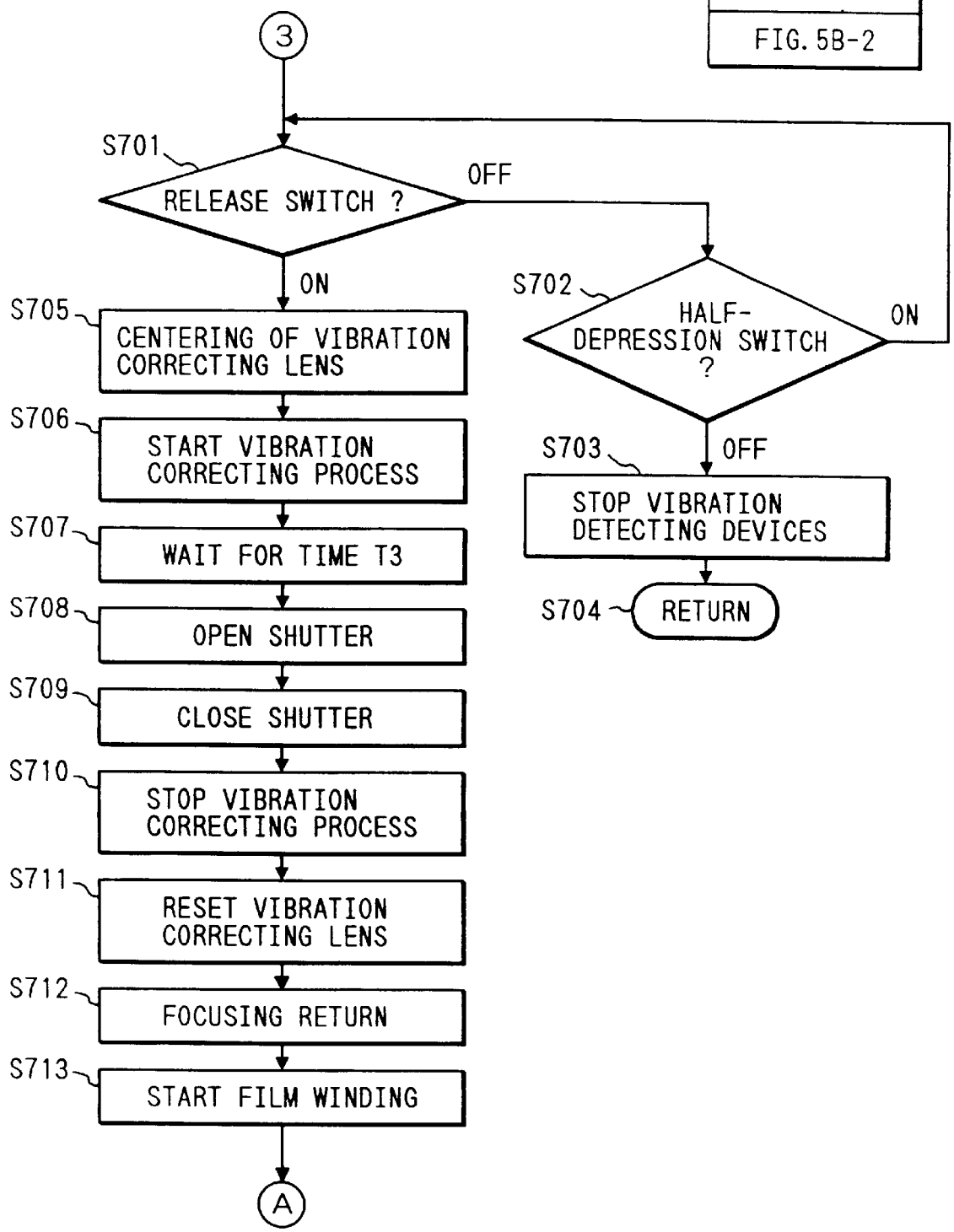

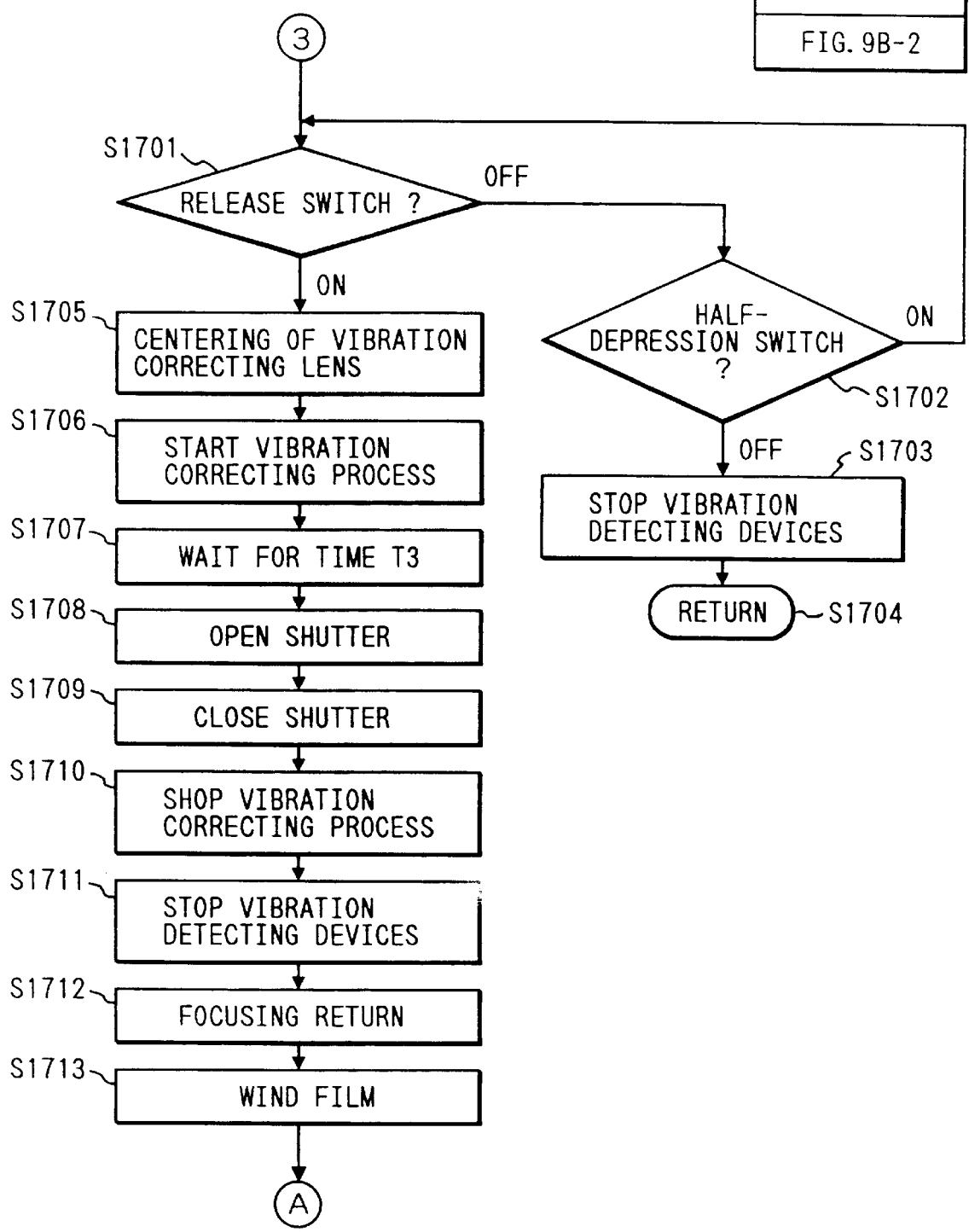

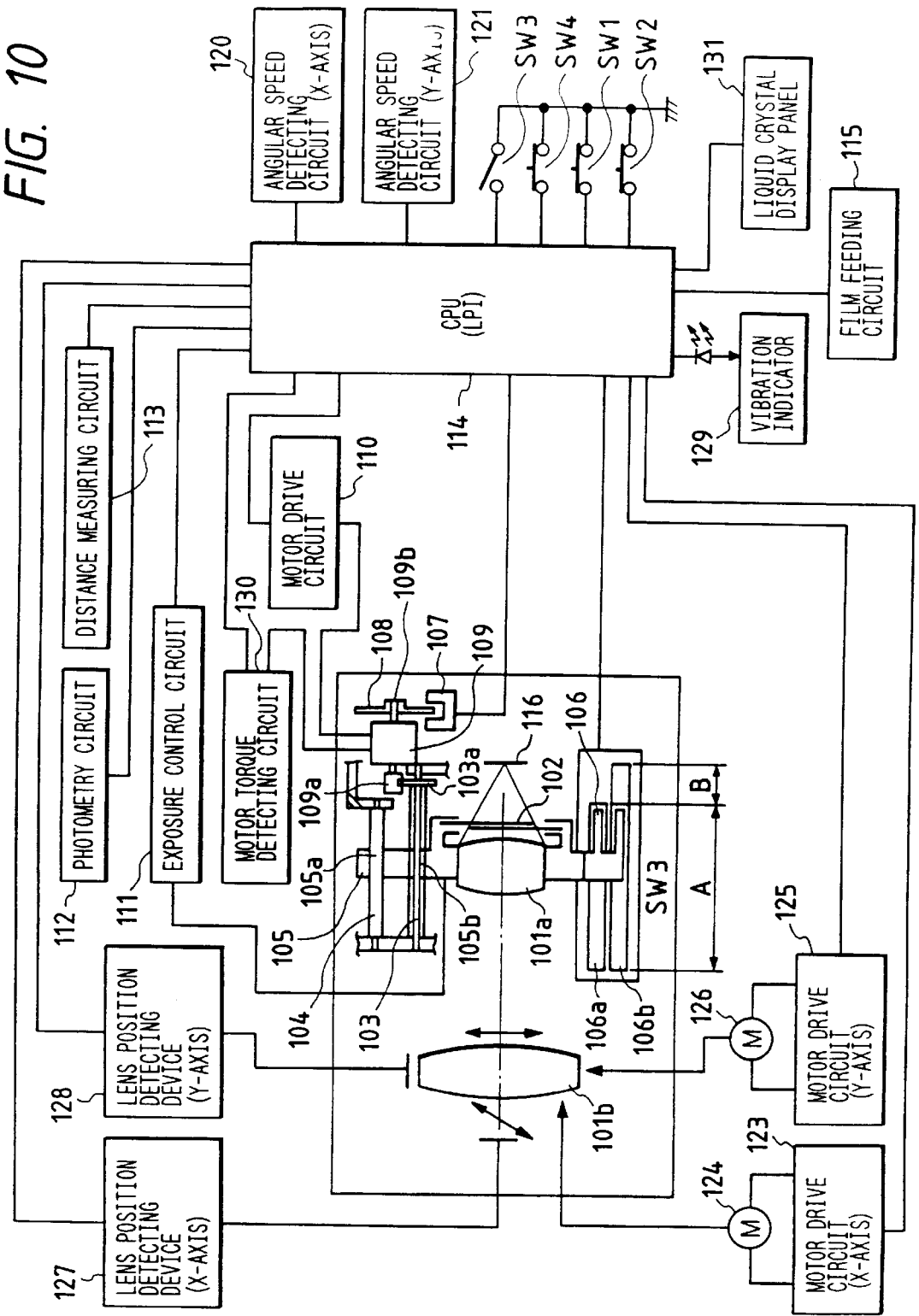

CAMERA WITH VIBRATION CORRECTION FUNCTION

This application is a division of application Ser. No. 08/373,790, filed Jan. 17, 1995, now U.S. Pat. No. 5,623,704.

BACKGROUND OF THE INVENTION

1. Field of the Invention

The present invention relates to a camera having a vibration correction function.

2. Related Background Art

Various vibration correcting devices (e.g., Japanese Patent Application Laid-Open No. 5-224270) for cameras have been proposed so as to correct a camera shake, and in particular, the blurring of an image occurring when a camera is inclined. In such vibration correcting devices, an angular speed sensor is utilized as vibration detecting means for detecting a camera shake and vibrations. The angular speed sensor detects the angular speed of the camera shake. In accordance with the result of the detection, vibration correcting means is driven to shift a taking lens system as a principal optical system or a vibration correcting optical system as a portion of the taking lens system in a direction perpendicular to the optical axis to correct the blurring of an image.

Therefore, in cameras equipped with such vibration correcting devices, even though exposure is carried out at a slower shutter speed than that in the ordinary photographing, it is possible to take a photograph with no blurring.

A vibration detecting circuit of the vibration correcting device is stopped by cutting off a power source supplied to the vibration detecting circuit.

In this case, each time one frame of a photographic film is exposed, the vibration detecting circuit is stopped. However, when the vibration detecting circuit is once stopped (the power source is cut off), it takes time for the vibration detecting circuit to be stabilized again after the redriving thereof (resupply of the power source). Therefore, in the case of a camera with a continuous shot photographing mode, even at the time of a continuous shot photographing, the vibration detecting circuit is stopped and redriven for each shot. Accordingly, intervals of photographing need to be lengthened. As a result, the continuous shot photographing cannot be carried out speedily.

Also, conventionally, vibration correction is performed for each frame. However, at the time of the continuous shot photographing, it is necessary to make wait time between frames as short as possible, which causes a problem. Namely, in the continuous shot photographing, there is a case where a photographer takes photographs while changing the composition, so that the camera might be moved largely between frames. When a vibration reference signal level ($\omega=0$) is detected during the wait time between the frames and the continuous photographing is carried out while changing the composition, the amount of camera shake cannot be detected properly; on the contrary, an abnormal correcting operation is carried out. As a result, image quality is deteriorated considerably.

Also, the technique on the autofocus detection of a taking lens of a camera is known. When abnormality occurs in the autofocus detection, if a vibration correcting function is kept operating even though the abnormality is detected, a battery is spent in vain for the vibration correction.

Further, in conventional cameras with a vibration correction function, generally, a vibration detecting device for detecting an amount of vibration and a vibration correcting device for correcting the vibration are kept operating while a power source of the camera is switched on. However, there is a problem that during moving a refractive power operation of a variable power lens, accuracy of the vibration detection is lowered due to vibration of the variable power lens and noise of a drive motor, or a voltage drop caused by the drive of the motor.

SUMMARY OF THE INVENTION

It is an object of the present invention to provide a camera with a vibration correction function having a continuous shot mode which can take photographs speedily and prevent a battery from being spent in vain by stopping a vibration detecting device appropriately.

It is another object of the present invention to provide a camera with a vibration correction function capable of prohibiting a vibration correcting operation when abnormality of autofocus detection is detected.

It is still another object of the present invention to provide a camera with a vibration correction function in which accuracy of vibration detection is improved.

In order to achieve the above objects, according to a first aspect of the present invention, a camera with a vibration correction function provided with a continuous shot mode for carrying out continuous photographing, has a vibration detecting device for detecting vibration of the camera; a vibration correcting device for correcting the vibration of the camera at the time of photographing based on a signal from the vibration detecting device; a film feeding device for feeding a photographic film loaded in the camera; a film end detecting device for detecting an end of the photographic film; and a control device, when receiving a film end detection signal from the film end detecting device during photographing under the continuous shot mode, for stopping the operation of the vibration detecting device and making the film feeding device start rewinding the photographic film.

Preferably, the control device is a one chip microcomputer.

According to a second aspect of the present invention, a camera with a vibration correction function provided with a continuous shot mode for carrying out continuous photographing, has a vibration detecting device for detecting vibration of the camera; a vibration correcting device for correcting the vibration of the camera at the time of photographing based on a signal from the vibration detecting device; a film feeding device for feeding a photographic film loaded in the camera; a film end detecting device for detecting an end of the photographic film; and a control device, when receiving a film end detection signal from the film end detecting device during photographing under the continuous shot mode, for stopping the operation of the vibration detecting device after the photographic film has been rewound by the film feeding device.

According to a third aspect of the present invention, a camera with a vibration correction function by a vibration correcting optical system provided with a continuous shot mode for carrying out continuous photographing, has a vibration detecting device for detecting vibration of the camera; a vibration correcting device for correcting the vibration of the camera at the time of photographing based on a signal from the vibration detecting device; and a control device for stopping the vibration correcting operation of the vibration correcting device at the time of the continuous shot mode.

Preferably, the control device does not stop the vibration correcting operation of the vibration correcting device at the time of taking the first photograph, and stops the vibration correcting operation of the vibration correcting device at the time of taking the second and later photographs.

Preferably, at the time of taking the second and later photographs, the vibration correcting device holds the vibration correcting optical system such that an optical axis of the vibration correcting optical system coincides with an optical axis of a photographing optical system.

According to a fourth aspect of the present invention, a camera with a vibration correction function, has a photographing optical system for photographing an object field; a focus adjusting device for performing focus adjustment of the photographing optical system; a shutter for opening and closing a light path of the photographing optical system; a vibration correcting device for correcting vibration of the camera at the time of photographing; and a control device for prohibiting the operation of the vibration correcting device in response to abnormality of the focus adjusting device.

Preferably, the vibration correcting device has a vibration detecting section for detecting the vibration of the camera at the time of photographing, and the control device prohibits the operation of the vibration detecting section in response to the abnormality of the focus adjusting device. Also, preferably, the vibration correcting device has a vibration detecting section for detecting the vibration of the camera at the time of photographing and a vibration correcting section for correcting the vibration in response to the detection of the vibration detecting section, and the control device prohibits the operation of the vibration correcting section in response to the abnormality of the focus adjusting device.

Preferably, the focus adjusting device has a focus detecting section for detecting a focusing condition of an object and outputting a focus detection signal; and an adjusting section for performing focus adjustment of the photographing optical system in response to the focus detection signal, and the control device prohibits the operation of the vibration correcting device in response to abnormality of the adjusting section. Also, preferably, the focus adjusting device has a focus detecting section for detecting a focusing condition of an object and outputting a focus detection signal; and an adjusting section for performing focus adjustment of the photographing optical system in response to the focus detection signal, and the control device prohibits the operation of the vibration correcting device in response to abnormality of the focus detecting section.

The abnormality of said focus detecting section means that said focus detection signal is not output.

Preferably, the focus adjusting section has a drive portion for driving the photographing optical system to a predetermined position in response to the focus detection signal; and a position detecting portion for detecting the position of the photographing optical system, and when the position detecting portion detects that the photographing optical system is not driven to the predetermined position, the control device prohibits the operation of the vibration correcting device. Also, preferably, the focus detecting device has a distance measuring section for measuring a distance to an object and outputting a distance signal; and a focus adjusting section for performing focus adjustment of the photographing optical system in response to the distance signal, and the control device prohibits the operation of the vibration correcting device in response to abnormality of the focus adjusting section.

Preferably, the focus adjusting device has a distance measuring section for measuring a distance to an object and outputting a distance signal; and a focus adjusting section for performing focus adjustment of the photographing optical system in response to the distance signal, and the control device prohibits the operation of the vibration correcting device in response to abnormality of the distance measuring section.

The abnormality of the distance measuring section means that the distance signal is not output.

The control device may prohibit the operation of the shutter in response to the abnormality of the focus adjusting device.

According to a fourth aspect of the present invention, a camera with a vibration correction function, has a vibration detecting device for detecting an amount of vibration of the camera; a vibration correcting device for correcting the vibration based on an output of the vibration detecting device; a variable power lens; and a control device for controlling the vibration detecting device so as not to be driven during a refractive power varying operation of the variable power lens.

Preferably, the camera is provided with a drive motor for driving the variable power lens, the refractive power varying operation being performed by the use of the drive motor.

According to a fifth aspect of the present invention, a camera with a vibration correction function has a vibration detecting device for detecting an amount of vibration of the camera; a vibration correcting device for correcting the vibration based on an output of the vibration detecting device; a variable power lens; and a control device for prohibiting the operation of the vibration correcting device during a refractive power varying operation of the variable power lens.

Preferably, the camera is provided with a drive motor for driving the variable power lens, the refractive power varying operation being performed by the use of the drive motor.

The above and other objects, features and advantages of the present invention are explained hereinafter and may be better understood by reference to the drawings and the descriptive matter which follows.

BRIEF DESCRIPTION OF THE DRAWINGS

FIG. 10 is a block diagram showing circuits of a camera according to a third embodiment of the present invention;

DETAILED DESCRIPTION OF THE PREFERRED EMBODIMENTS

Figure 1:
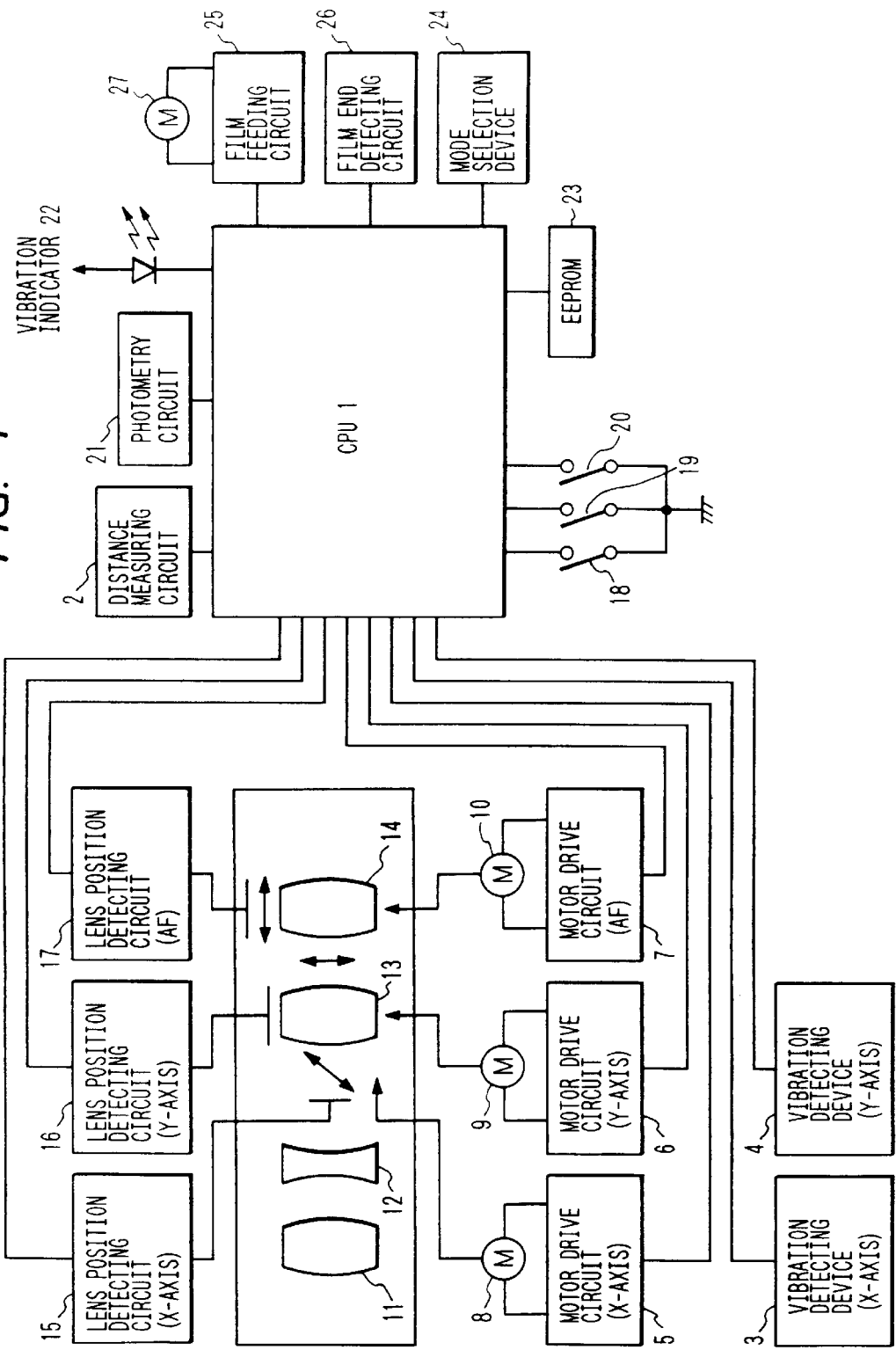
FIG. 1 is a block diagram showing circuits of a camera according to a first embodiment of the present invention.

FIG. 1 is a block diagram showing circuits according to a first embodiment of the present invention. A taking lens is constituted of four lenses 11, 12, 13, 14. The lens 13 is a vibration correcting lens (hereinafter referred to as the vibration correcting lens 13) which can be driven in an X-axis direction (longitudinal direction) and a Y-axis direction for vibration correction.

A CPU 1 is a one chip microcomputer and is a control device for controlling whole sequences of the camera. The CPU has a counter function, a timer function for measuring time, and an A/D converting function.

A distance measuring circuit 2 is a circuit for measuring an object distance. A photometry circuit 21 is a circuit for performing photometry in the object field. A vibration indicator 22 indicates the state of vibration. A main switch 18 is a switch for starting the operation of the camera. The main switch 18 is a momentary switch, and when the main switch 18 is depressed with the camera in the off state, a main switch signal is input to cause a power source of the camera to be turned on. Also, when the main switch 18 is depressed with the camera in the on state, a main switch signal is input to cause the power source to be turned off. A half-depression switch 19 is a switch for starting preparation of photographing when a shutter release button is half depressed. A release switch 20 is a switch to be turned on when the shutter release button is wholly depressed. A non-volatile memory 23 (hereinafter referred to as the EEPROM 23) is a writable non-volatile memory.

A vibration detecting device 3 is a circuit for detecting the angular speed of a camera shake around the Y-axis in the X-axis direction. A vibration detecting device 4 is a circuit for detecting the angular speed thereof around the X-axis in the Y-axis direction. A motor drive circuit 5 controls a motor 8 for driving the vibration correcting lens 13 in the X-axis direction. A motor drive circuit 6 controls a motor 9 for driving the vibration correcting lens 13 in the Y-axis direction. A motor drive circuit 7 controls a motor 10 for driving a focusing lens 14.

A lens position detecting circuit 15 detects the position (the amount of shift) of the vibration correcting lens 13 in the X-axis direction. A lens position detecting circuit 16 detects the position (the amount of shift) of the vibration correcting lens 13 in the Y-axis direction.

The vibration detecting devices 3 and 4 are circuits for correcting a camera shake. The output values of the vibration detecting devices 3 and 4 change in accordance with the angular speeds caused by the camera shake. The CPU 1 performs the A/D conversion of these output values to detect the angular speeds of the camera shake. The vibration detecting device 3 detects the angular speed around the Y-axis in the X direction, while the vibration detecting device 4 detects the angular speed around the X-axis in the Y direction.

The motor drive circuit 5 drives the motor 8 while controlling its duty. The CPU 1 outputs drive direction signals to the motor drive circuits 5, 6 to direct the drive directions of the motors 8, 9. Also, the CPU 1 outputs drive duty signals to the motor drive circuits 5, 6 to direct the drive speeds of the motors 8, 9. In accordance with these signals, the motor drive circuits 5, 6 energize the motors 8, 9 in the specified directions with arbitrary duties to control the vibration correcting lens 13 at arbitrary speeds. The CPU 1 calculates distance data obtained in the distance measuring circuit 2. In accordance with the calculation result, the CPU 1 directs the motor drive circuit 7. The motor drive circuit 7 energizes the motor 10 in a direction specified by the CPU 1 to control the focusing lens 14 at an arbitrary speed.

The rotation of the motor 8 is transformed by a correcting lens drive mechanism system (not shown) into linear motion to drive the vibration correcting lens 13 in the X-axis direction. The rotation of the motor 9 is transformed by a correcting lens drive mechanism system (not shown) into linear motion to drive the vibration correcting lens 13 in the Y-axis direction. The rotation of the motor 10 is transformed by a focusing lens drive mechanism system (not shown) into linear motion to drive the focusing lens 14 in the optical axis direction.

The lens position detecting circuit 15 outputs pulses in accordance with the amount of shift of the vibration correcting lens 13 in the X-axis direction. The lens position detecting circuit 16 outputs pulses in accordance with the amount of shift of the vibration correcting lens 13 in the Y-axis direction. The CPU 1 counts these pulses to read the positions and the amounts of shift of the vibration correcting lens 13 in the X- and Y-axis directions. Also, the CPU 1 detects the amounts of shift of the vibration correcting lens 13 for a predetermined period of time to calculate speeds thereof in the X- and Y-axis directions. The lens position detecting circuit 17 outputs pulses in accordance with the amount of shift of the focusing lens 14 in the optical axis direction. The CPU 1 counts these pulses to read the position and the amount of shift of the focusing lens 14 in the optical axis direction.

The EEPROM 23 is the non-volatile memory in which predetermined data necessary for a photographing process are written beforehand. When required to perform a predetermined sequence, predetermined data are read from the EEPROM 23.

A mode selection device 24 is a device for a photographer to select a photographing mode such as a continuous shot mode, a self-mode, etc.

A film feeding circuit 25 drives a motor 27 to wind or rewind a photographic film.

A film end detecting device 26 detects the trailing end of the photographic film.

Figure 2:
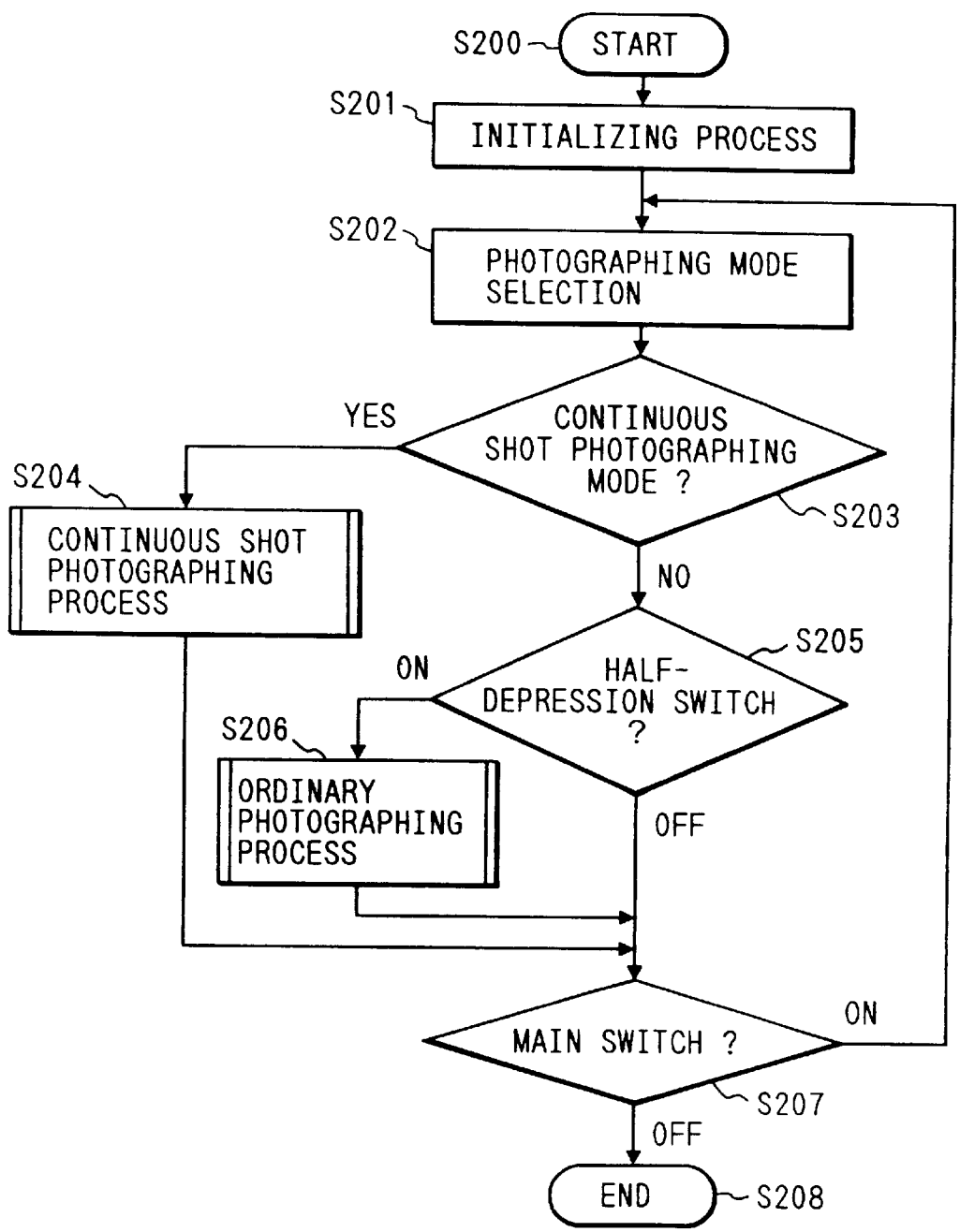
FIG. 2 is a flowchart showing a main flow of the first embodiment of the present invention.

FIG. 2 is a flowchart showing a main flow of the first embodiment of the present invention. The power source, i.e., the main switch 18 has been already turned on, and the process is started from the step S200. First, in the step S201, the inside of the CPU 1 is initialized. Next, in the step S202, the photographer selects a photographing mode via the mode selection device 24. Next, in the step S203, it is judged whether the continuous shot photographing mode is selected. When it is selected, the procedure goes to the step S204 and a continuous shot photographing process is performed. After the continuous shot photographing process has been completed, the procedure goes to the step S207. In the step S207, when the main switch 18 is off, the procedure goes to the step S208, ending the process. When in the step S203, it is judged that the continuous shot photographing mode is not selected and the half-depression switch 19 is off in the step S205, the procedure goes to the step S207. When the main switch 18 is off in the step S207, the procedure goes to the step S208, ending the process. When the main switch 18 is on in the step S207, the process is started again from the step S200. When the half-depression switch 19 is on in the step S205, the procedure goes to the step S206 and a photographing process is called. After the photographing process has been completed, the procedure goes to the step S207 and when the main switch 18 is off in the step S207, the procedure goes to the step S208, ending the process.

Now, the operation of the first embodiment of the present invention will be described with reference to flowcharts of FIGS. 2, 3A to 3C, 4A, 4B-1 and 4B-2. The control program of these flowcharts is contained in the CPU 1.

Also, in this embodiment, the distance measurement execution time of the distance measuring circuit 2 is 0 ms to 300 ms. The photometry execution time of the photometry circuit 21 is 50 ms. The drive time of the focusing lens 14 is 100 ms. The circuit stabilization time of the vibration detecting devices 3, 4 is 300 ms. The shock avoiding time at the time of a release is 50 ms. The angular speed zero detection time is 900 ms. The approach run control time for stabilization of the vibration correction control is 20 ms.

Figure 3A:
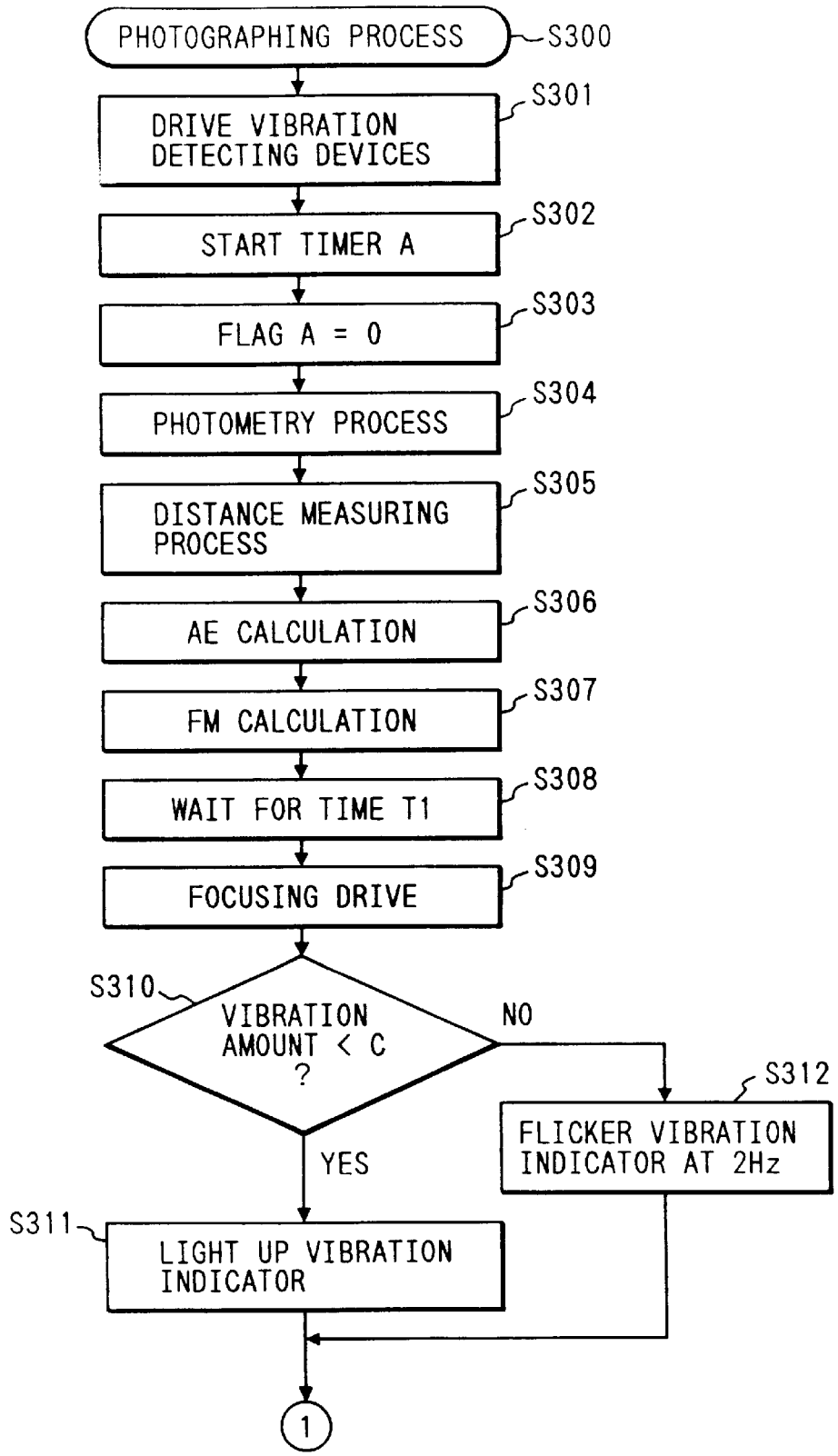
FIGS. 3A to 3C are flowcharts for explaining a photographing process of the first embodiment of the present invention.

In the step S205, when it is ascertained that the half-depression switch 19 is on, the process is started in the step S300 of FIG. 3A. First, in the step S301, the vibration detecting devices 3, 4 are driven. Next, in the step S302, a timer A (the angular speed zero detection time: 900 ms) is started, and a flag A is set to "0" in the step S303. Then, a photometry process is performed in the step S304, and a distance measuring process is performed in the step S305.

Thereafter, in the step S306, the AE calculation is executed by the use of the result of the photometry performed in the step S304, and in the step S307, the FM calculation is executed by the use of the result of the distance measurement performed in the step S305. Next, in the step S308, wait for time T1 which is necessary to secure time required to stabilize the circuits of the vibration detecting devices. In this embodiment, the wait for time T1 is 250 ms obtained by subtracting the distance measuring time of 0 to 300 ms and the photometry time of 50 ms from the time of 300 ms required to stabilize the circuits of the vibration detecting devices. In the step S309, the focusing lens 14 is driven to a predetermined position in accordance with the distance value set in the step S305.

Next, in the step S310, it is judged whether the outputs from the vibration detecting devices 3, 4, i.e., the amount of vibration, are smaller than a predetermined value C. When it is judged that the amount of vibration is smaller than the predetermined value C, the vibration indicator 22 is lit up and the procedure goes to the step S401 of FIG. 3B. The lighting indication of the vibration indicator 22 indicates that the amount of vibration is within a correctable range.

Figure 3B:
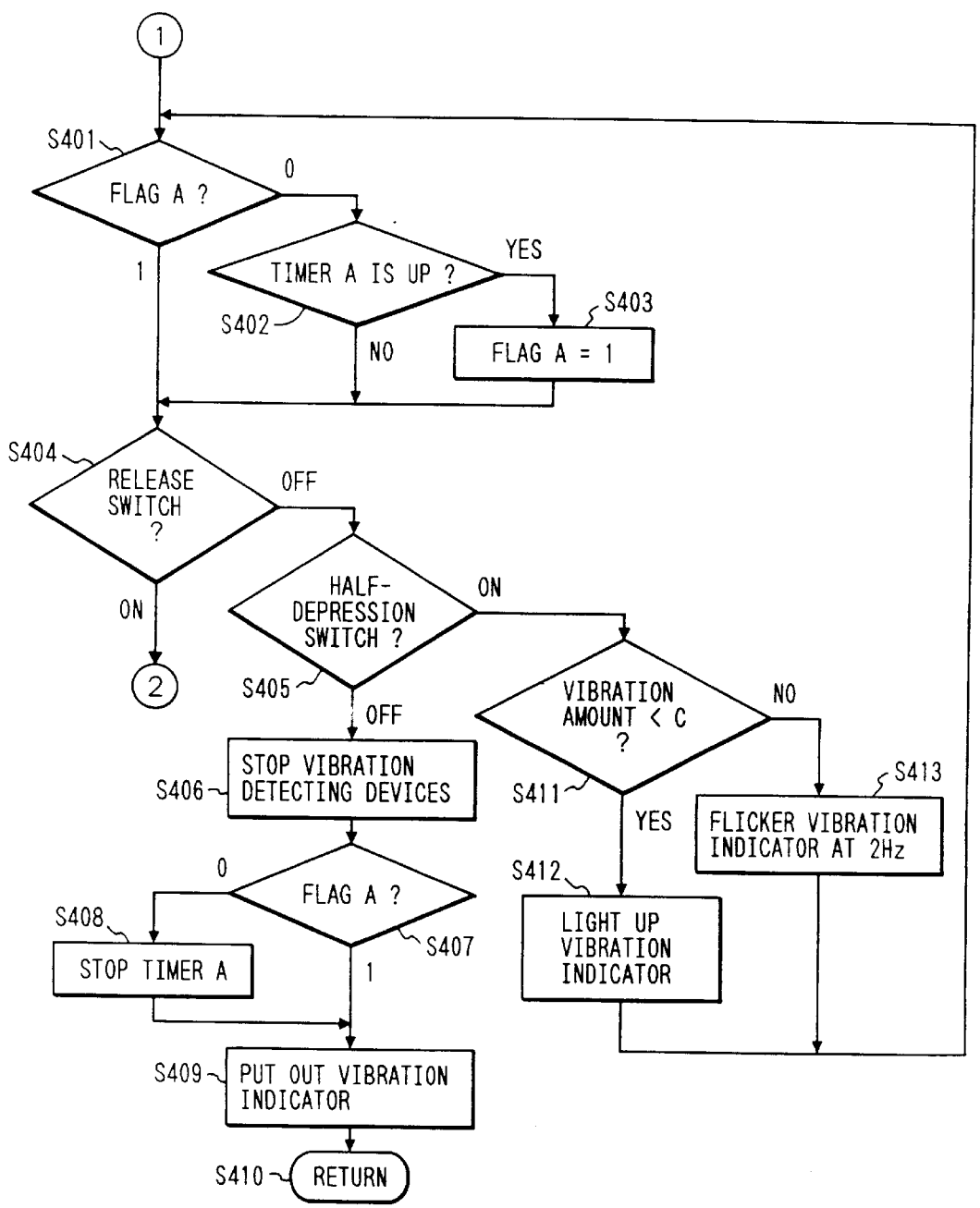

On the other hand, when it is judged that the amount of vibration is larger than the predetermined value C in the step S310, the vibration indicator 22 is flickered at 2 Hz, and the procedure goes to the step S401 of FIG. 3B. The 2 Hz flickering indication of the vibration indicator 22 indicates that the amount of vibration is too large and it is unknown whether it can be corrected.

In the step S401 of FIG. 3B, the flag A is checked, and when the flag A provided in the step S303 is "0", the procedure goes to the step S402.

In the step S401, when it is judged that the flag A is set to "1", the procedure goes to the step S404.

After the timer A is up (the angular speed zero detection time (900 ms) has elapsed)) in the step S402, the flag A is set to "1", and the procedure goes to the step S404.

Figure 3C:
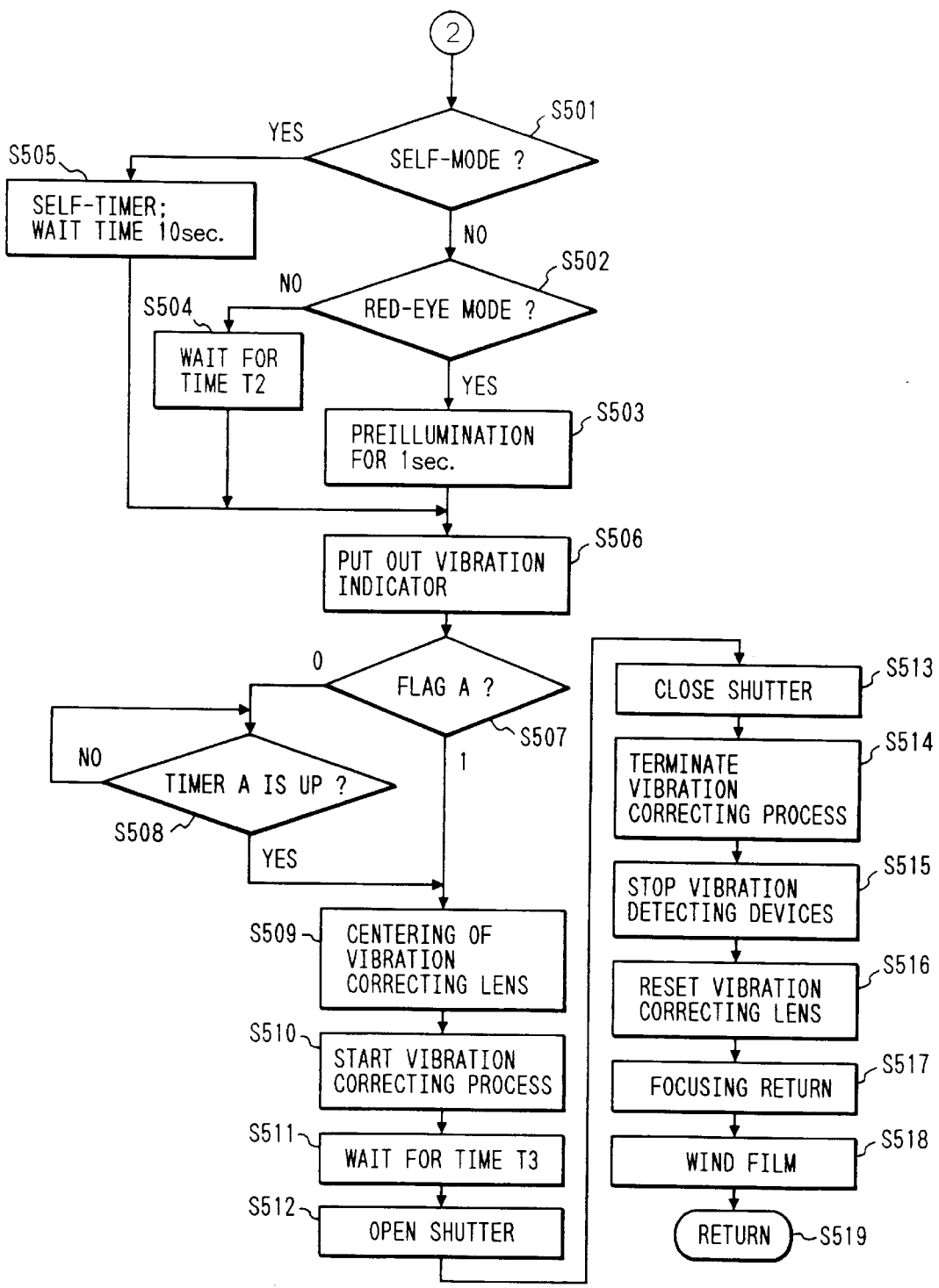
Figure 4A:
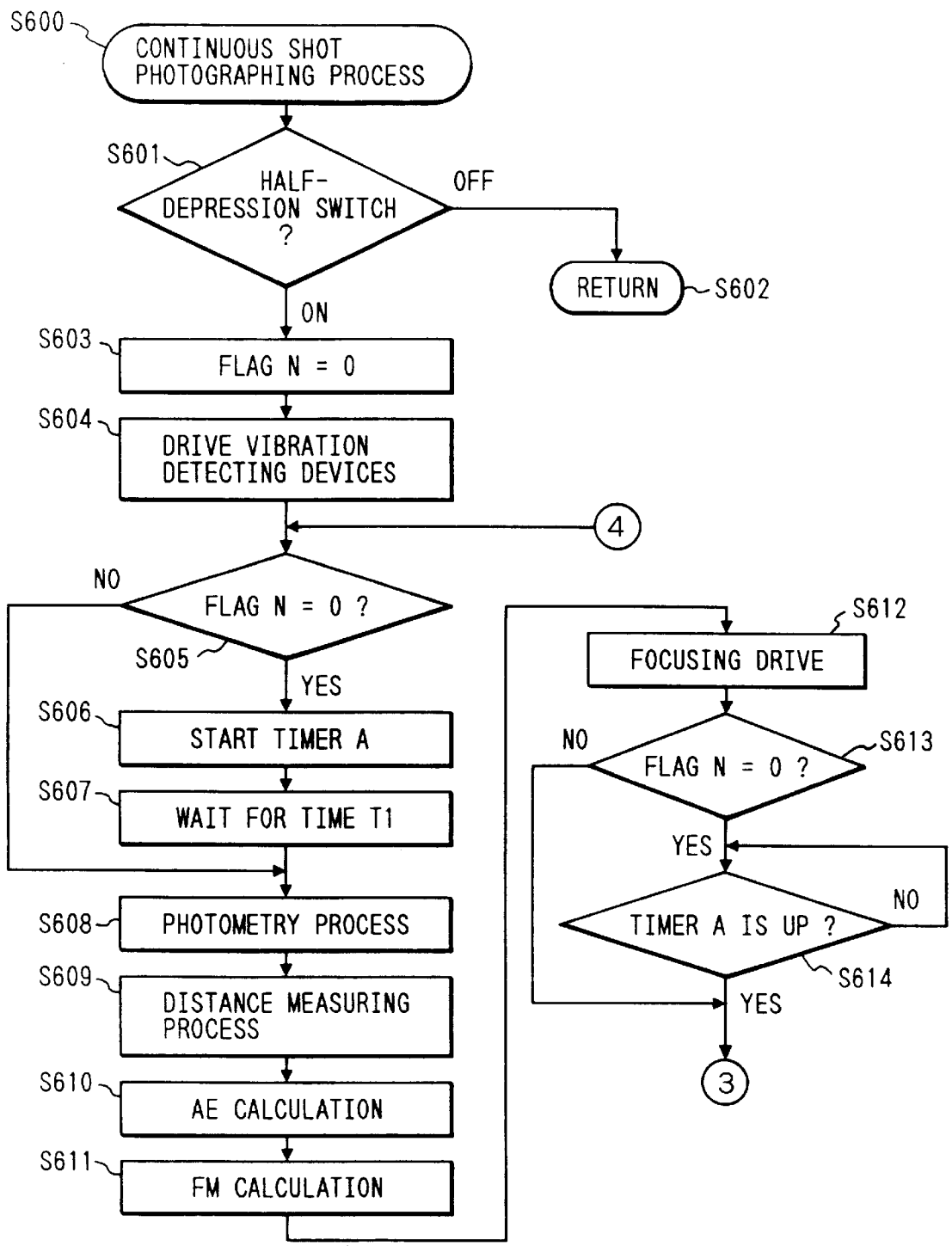
FIG. 4A is a flowchart for explaining an example of a continuous shot photographing process of the first embodiment of the present invention.
Figures 2, 4B:
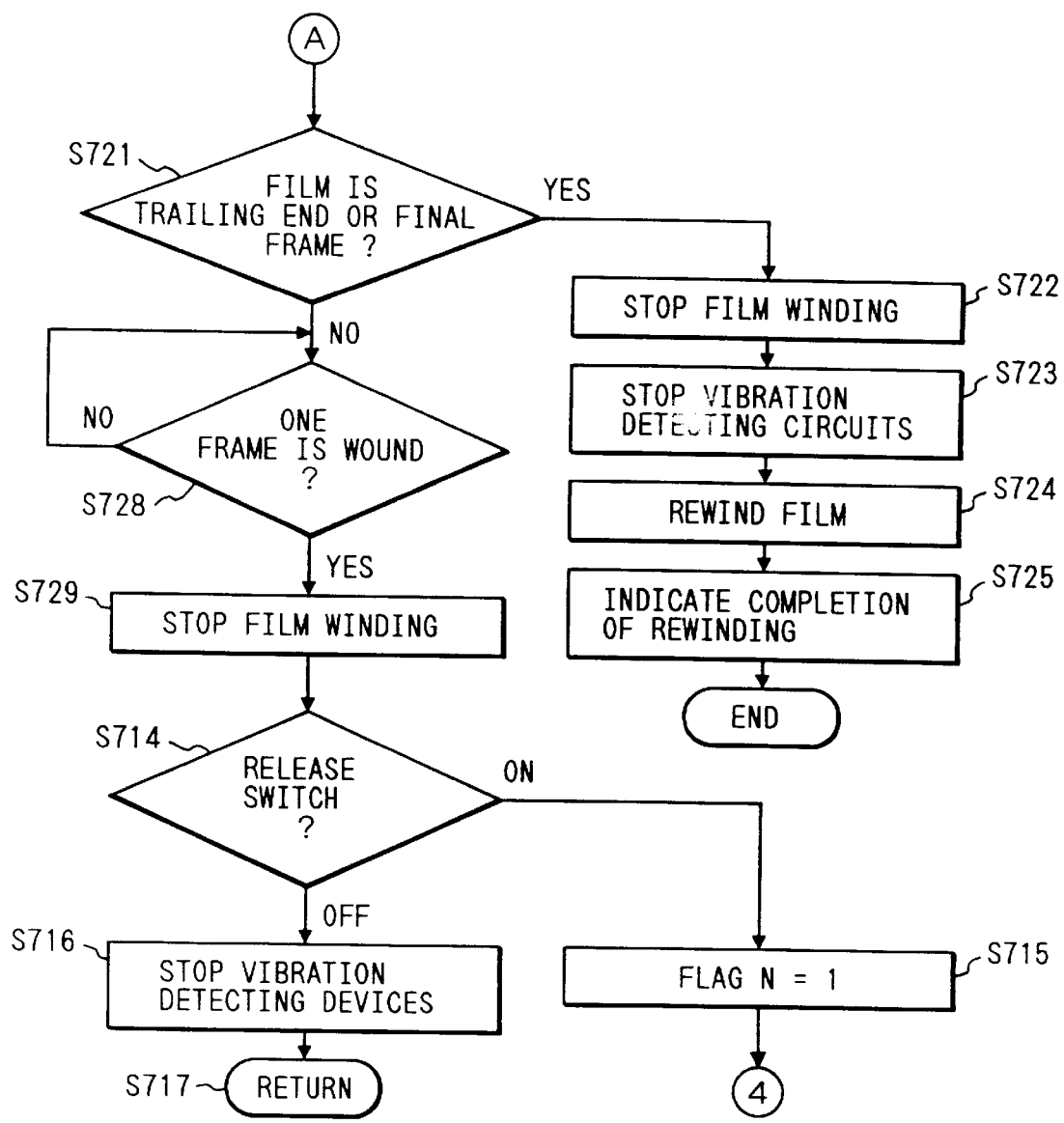
FIG. 4B is comprised of FIGS. 4B-1 and 4B-2 showing flowcharts for explaining an example of a continuous shot photographing process of the first embodiment of the present invention.
Figure 5A:
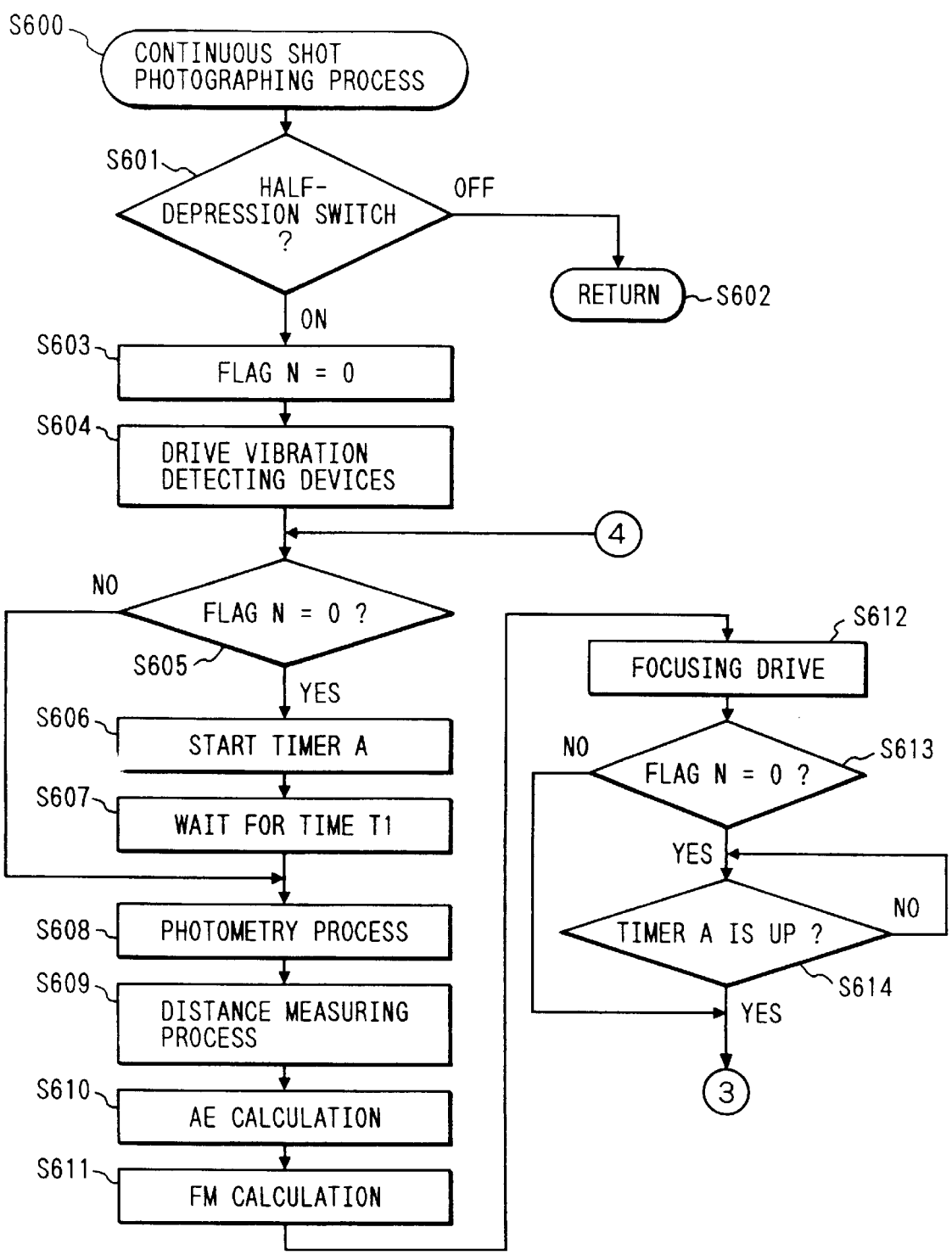
FIG. 5A is a flowchart for explaining another example of a continuous shot photographing process of the first embodiment of the present invention.
Figures 2, 5B:
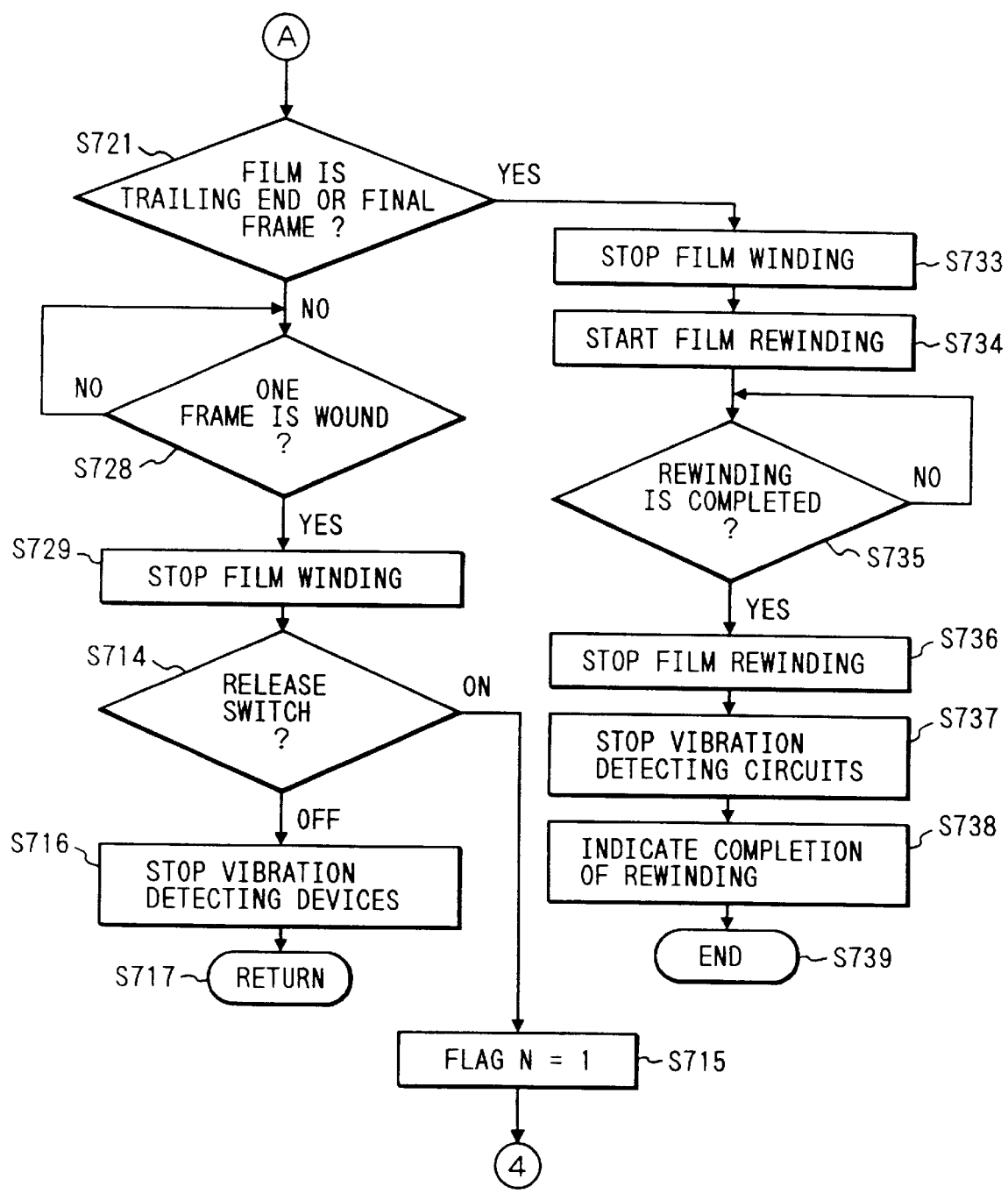
FIG. 5B is comprised of FIGS. 5B-1 and 5B-2 showing flowcharts for explaining another example of a continuous shot photographing process of the first embodiment of the present invention.

In the step S404, when the release switch 20 is on, the procedure goes to the step S501 of FIG. 3C. On the other hand, when the release switch 20 is off, it is ascertained whether the half-depression switch 19 is on in the step S405.

In the step S405, when the half-depression switch 19 is off, the vibration detecting devices 3, 4 are stopped in the step S406. Thereafter, in the step S407, the flag A is checked, and when it is "1", the procedure goes to the step S409. On the other hand, when it is "0", the timer A is stopped in the step S408, and the procedure goes to the step S409. In the step S409, the vibration indicator 22 is put out and thereafter, from the step S410, the procedure returns to the flowchart of FIG. 2. In this case, photographing is not carried out.

When the half-depression switch 19 is on in the step S405, it is judged in the step S411 whether the outputs of the vibration detecting devices 3, 4, i.e., the amount of vibration is smaller than the predetermined value C. When the amount of vibration is smaller than the predetermined value C, the vibration indicator 22 is lit up in the step S412 and the procedure returns to the step S401.

On the other hand, when the amount of vibration is larger than the predetermined value C, the vibration indicator 22 is flickered at 2 Hz in the step S413 and the procedure returns to the step S401.

In the step S501 of FIG. 3C, it is judged whether a self-mode is selected. When the self-mode is selected, the procedure goes to the step S506 after a predetermined period of time (e.g., 10 sec.) set in a self-timer has elapsed in the step S505.

On the other hand, when the self-mode is not selected, a red-eye mode is checked in the step S502 and in the case of "NO", wait for time T2 (the shock avoiding time at the time of a release: 50 ms) and the procedure goes to the step S506.

In the step S502, when the answer is "YES", one second preillumination is set in the step S503 and the procedure goes to the step S506.

In the step S506, the indication of the vibration indicator 22 carried out in the steps S311, S312, S412 or S413 is put out and the procedure goes to the step S507.

In the step S507, the flag A is checked, and when it is "1", the procedure goes to the step S509. On the other hand, when it is "0" in the step S507, wait until the timer A started in the step S302 is up in the step S508. Thereafter, the procedure goes to the step S509.

In the step S509, the center of the vibration correcting lens 13 is moved from an initial reset position to the center position of the optical axis. In the step S510, vibration correction is started. In the step S511, wait for time T3 (the approach run control time for stabilization of the vibration correction control: 20 ms), and thereafter, the procedure goes to the step S512.

In the step S512, the shutter starts opening. The vibration correcting process continues from the step S510 before the opening of the shutter to the step S514 immediately after the closing of the shutter. In the step S512, the shutter is opened at a predetermined shutter speed based on the exposure value in accordance with the AE calculation value obtained in the step S306. Thereafter, in the step S513, the shutter is closed, and the vibration correcting process is terminated in the step S514. Next, in the step S515, the vibration detecting devices 3, 4 are stopped. Then, the vibration correcting lens 13 is returned to the initial position in the step S516, and the focusing lens 14 is driven to the reset position in the step S517. Next, in the step S518, the photographic film is wound, and from the step S519, the procedure goes back to the flowchart of FIG. 2.

FIGS. 4A, 4B-1 and 4B-2 are flowcharts showing an example of a continuous shot photographing mode. When it is judged that the continuous shot photographing mode is selected in the step S203, the procedure enters the continuous shot photographing process.

When the half-depression switch 19 is checked in the step S601 and it is off, the procedure goes to the step S602 and returns to the main flow. When the half-depression switch 19 is on in the step S601, a flag N is set to "0" in the step S603, and the vibration detecting devices 3, 4 are driven in the step S604.

Next, in the step S605, it is ascertained whether the flag N is "0", and when it is "0", the procedure goes to the step S606. When it is not "0", the timer A is not started and the wait for time T1 is not taken, going to the step S608. In the step S606, the timer A (the angular speed zero detection time: 900 ms) is started, and in the step S607, wait for the time T1 which is necessary to secure time for stabilization of the circuits of the vibration detecting devices. In this embodiment, the wait for time T1 is 250 ms obtained by subtracting the distance measuring time of 0 to 300 ms and the photometry time of 50 ms from the time of 300 ms required to stabilize the circuits of the vibration detecting devices. Next, in the step S608, a photometry process is performed and in the step S609, a distance measuring process is performed.

Thereafter, in the step S610, the AE calculation is executed by the use of the result of the photometry performed in the step S608 in the step S610, and in the step S611, the FM calculation is executed by the use of the result of the distance measurement performed in the step S609. In the step S612, the focusing lens 14 is driven to a predetermined position in accordance with the distance value set in the step S305.

Next, in the step S613, it is ascertained whether the flag N is "0", and when it is "0", the procedure goes to the step S614 and wait until the timer A is up. Thereafter, the procedure goes to the step S701. When the flag N is not "0" in the step S613, the procedure goes to the step S701 without checking the timer A.

In the step S701, it is ascertained whether the release switch 20 is on, and when it is off, the procedure goes to the step S702 and it is ascertained whether the half-depression switch 19 is on. When the half-depression switch 19 is on in the step S702, the procedure goes back to the step S701 again and it is ascertained whether the release switch 20 is on or off. Also, when the half-depression switch 19 is off in the step S702, the vibration detecting devices are stopped in the step S703, going out of the continuous shot photographing process in the step S704.

When the release switch 20 is on in the step S701, the procedure goes to the step S705. In the step S705, the center of the vibration correcting lens 13 is moved from the initial reset position to the center position of the optical axis. In the step S706, vibration correction is started, and the procedure goes to the step S708 after the wait for time T3 (the approach run control time for stabilization of the vibration correction control: 20 ms) has elapsed in the step S707.

In the step S708, the shutter starts opening.

The vibration correcting process continues from the step S706 before the opening of the shutter to the step S710 immediately after the closing of the shutter. In the step S708, the shutter is opened at a predetermined shutter speed based on the exposure value in accordance with the AE calculation value obtained in the step S608. Thereafter, the shutter is closed in the step S709, and the vibration correcting process is terminated in the step S710. Then, the vibration correcting lens 13 is returned to the initial position in the step S711, and the focusing lens 14 is driven to the predetermined reset position in the step S712. Next, in the step S713, the photographic film starts to be wound one frame. In the step S721, it is judged whether the photographic film reaches the trailing end or the final frame. When it reaches the trailing end, the procedure goes to the step S722, while when it has not yet reached the trailing end, the procedure goes to the step S728. In the step S728, it is judged whether the photographic film is wound one frame and when it is wound one frame, the winding of the photographic film is stopped, and the procedure goes to the step S714. In the step S714, it is ascertained whether the release switch 20 is on. When it is on, the flag N is set to "1" in the step S715, and the procedure goes back to the step S605 and the photographing is started again. When the release switch 20 is off in the step S714, the vibration detecting devices 3, 4 are stopped in the step S716, and from the step S717, the procedure returns to the main flow.

When the photographic film is the trailing end or the final frame in the step S721, the winding of the photographic film is stopped in the step S722, and the vibration detecting circuits are stopped in the step S723. Thereafter, in the step S724, the photographic film starts to be rewound. When the rewinding has been completed, the indication of the completion of rewinding is carried out in the step S725.

FIGS. 5A, 5B-1 and 5B-2 are flowcharts showing another example of a continuous shot photographing mode.

The process up to the step S729 are the same as that in FIGS. 4A, 4B-1 and 4B-2, so the description thereof is omitted.

When the final frame or the trailing end of the photographic film is detected in the step S721, the winding of the photographic film is stopped in the step S733, and the photographic film starts to be rewound in the step S734. When the rewinding is completed in the step S735, the rewinding is terminated in the step S736, vibration detection circuits are stopped in the step S737, and the completion of the rewinding is indicated in the step S738.

Figure 6:
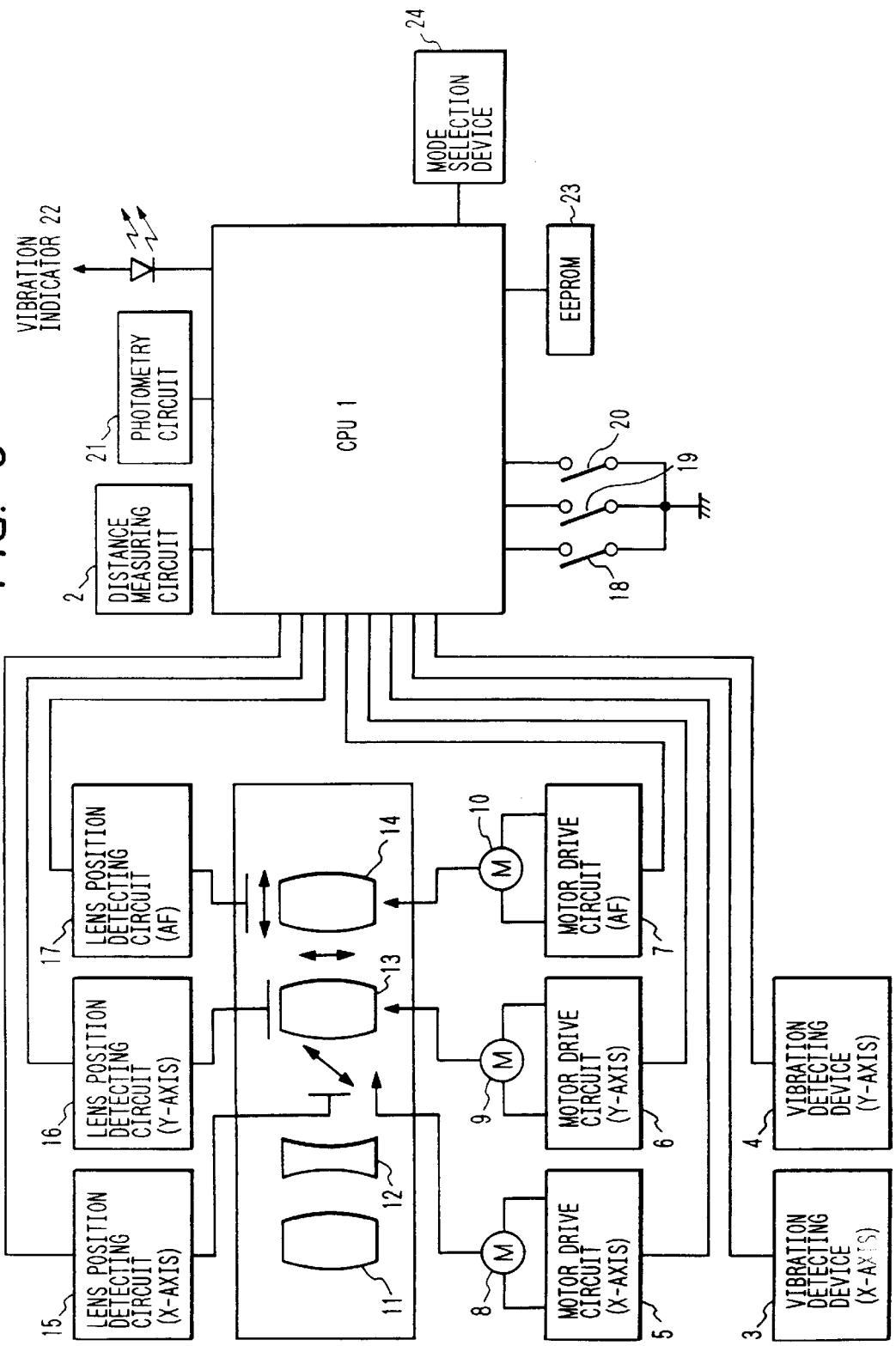
FIG. 6 is a block diagram showing circuits of a camera according to a second embodiment of the present invention.

FIG. 6 is a block diagram showing circuits according to a second embodiment of the present invention. In this embodiment, the film feeding circuit 25, the film end detecting circuit 26, and the motor 27 are removed from the first embodiment shown in FIG. 1.

Figure 7:
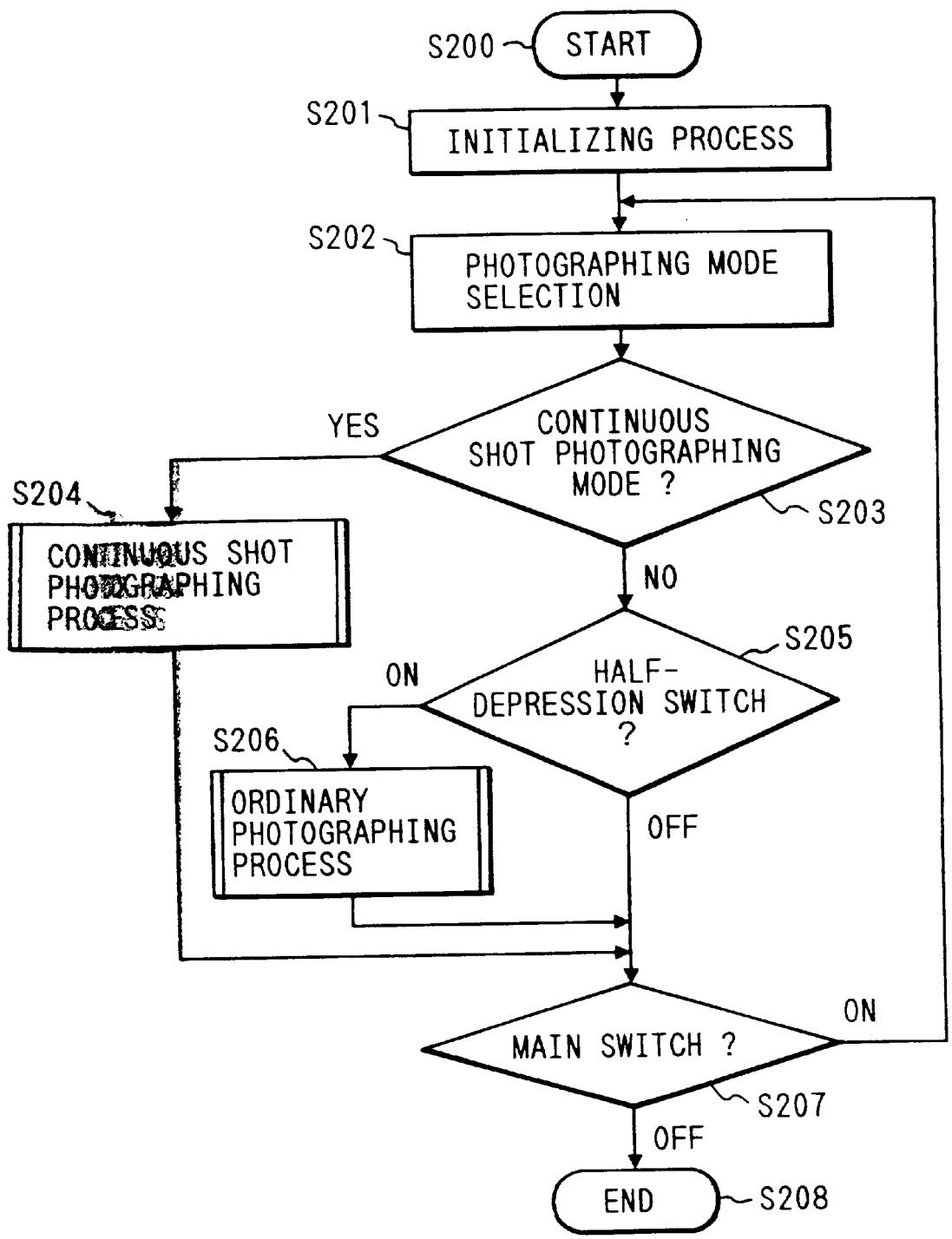
FIG. 7 is a flowchart showing a main flow of the second embodiment of the present invention.
Figure 8A:
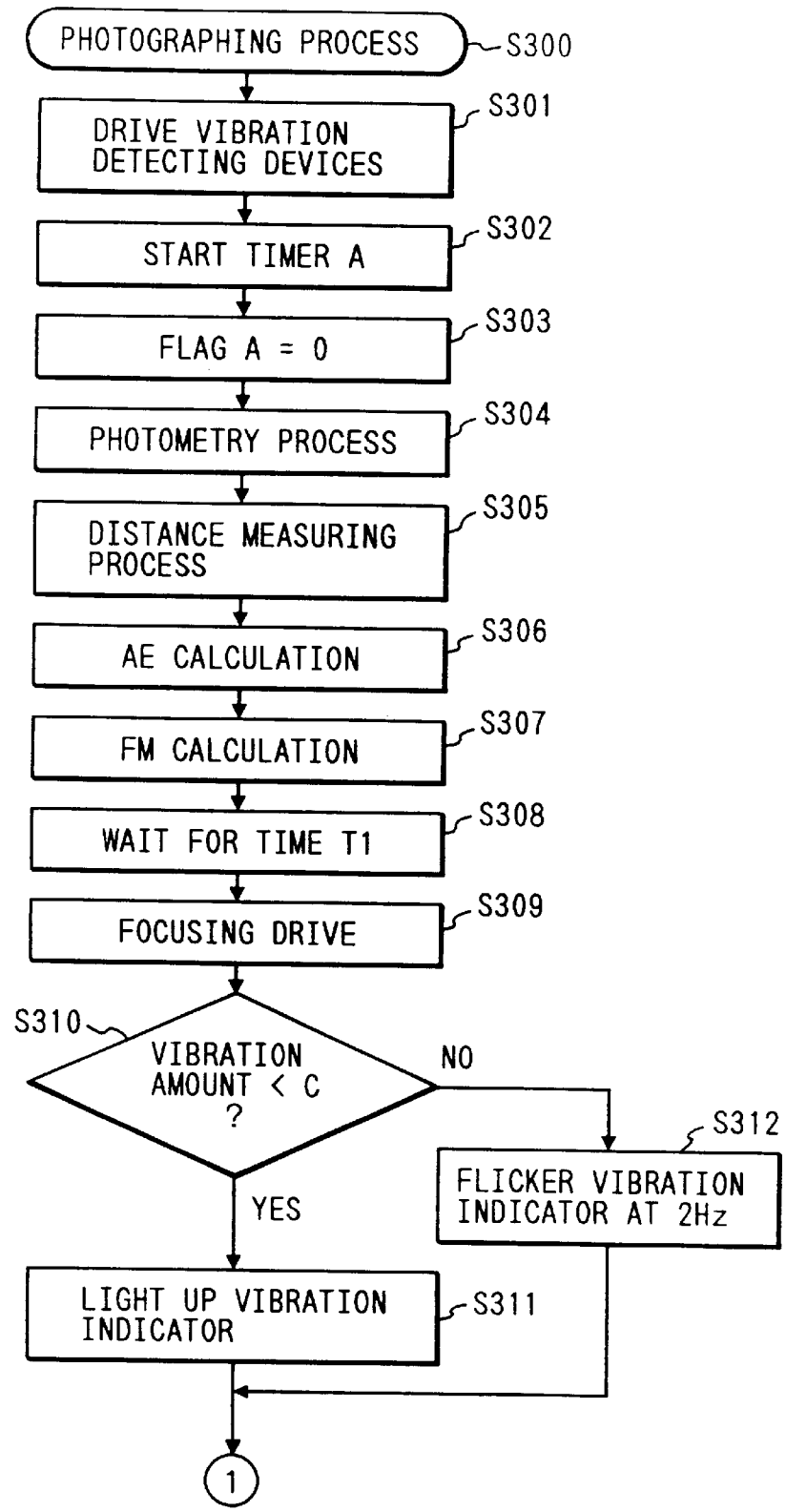
FIGS. 8A to 8C are flowcharts for explaining a photographing process of the second embodiment of the present invention.
Figure 8B:
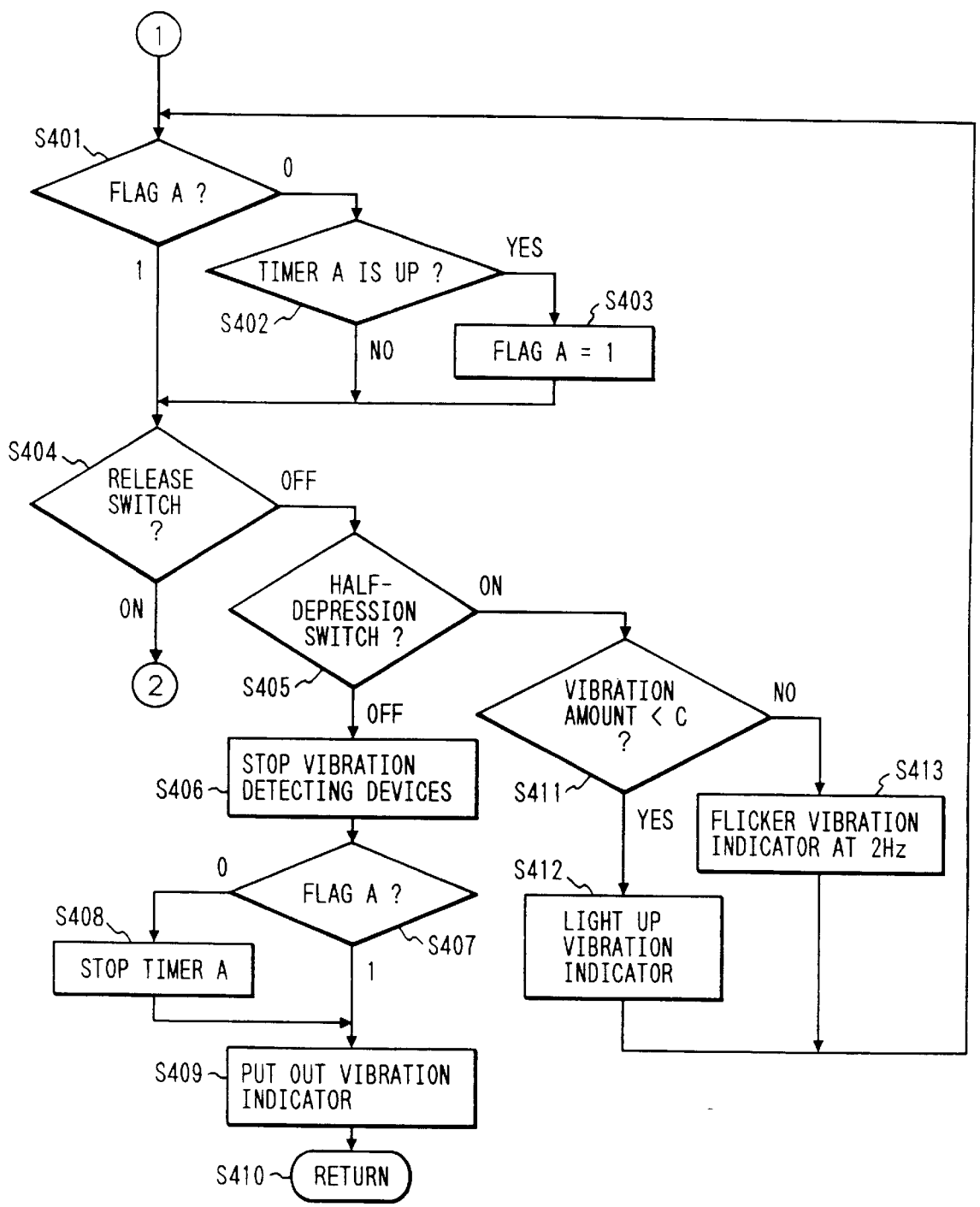
Figure 8C:
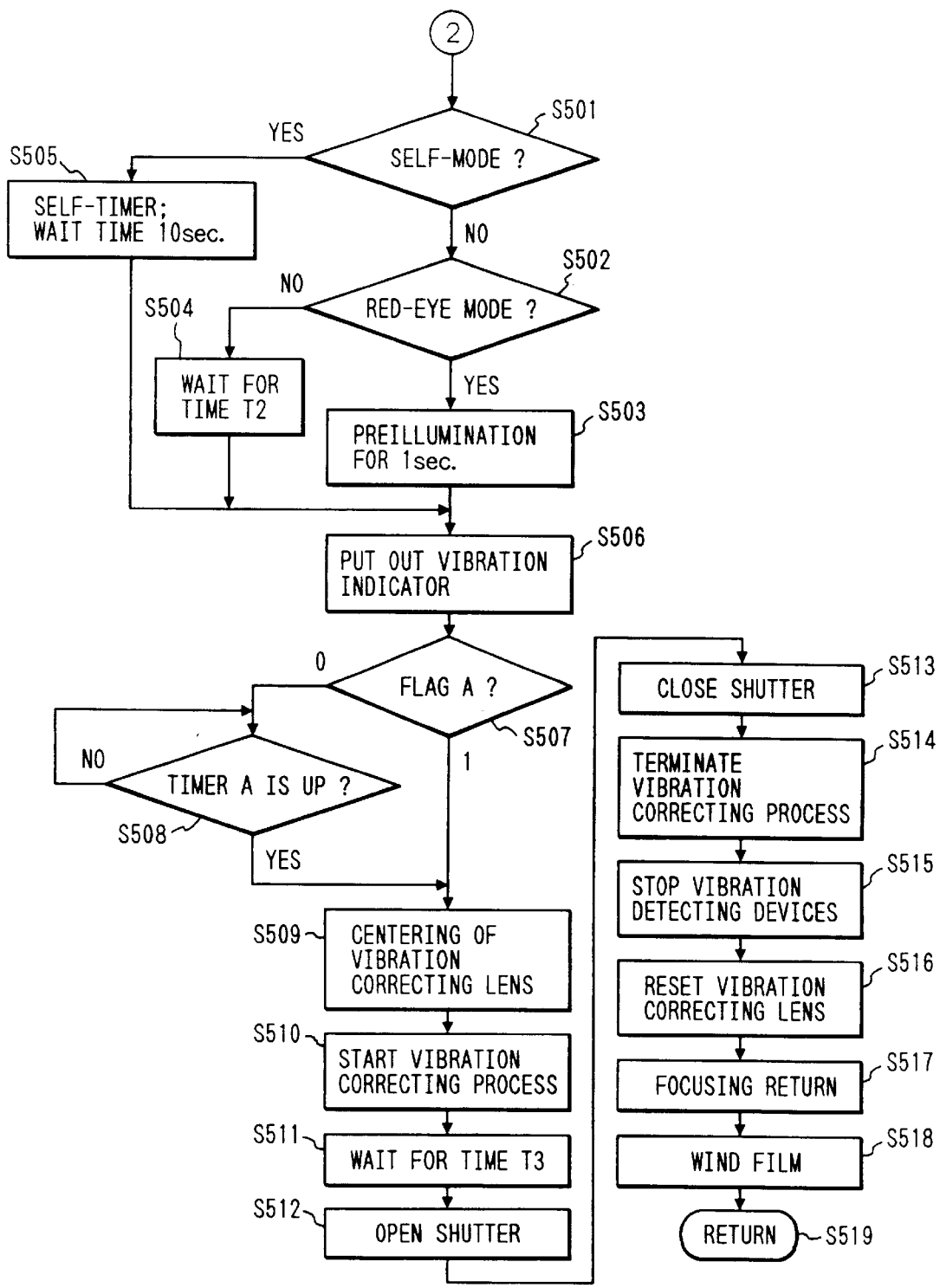
Figure 9A:
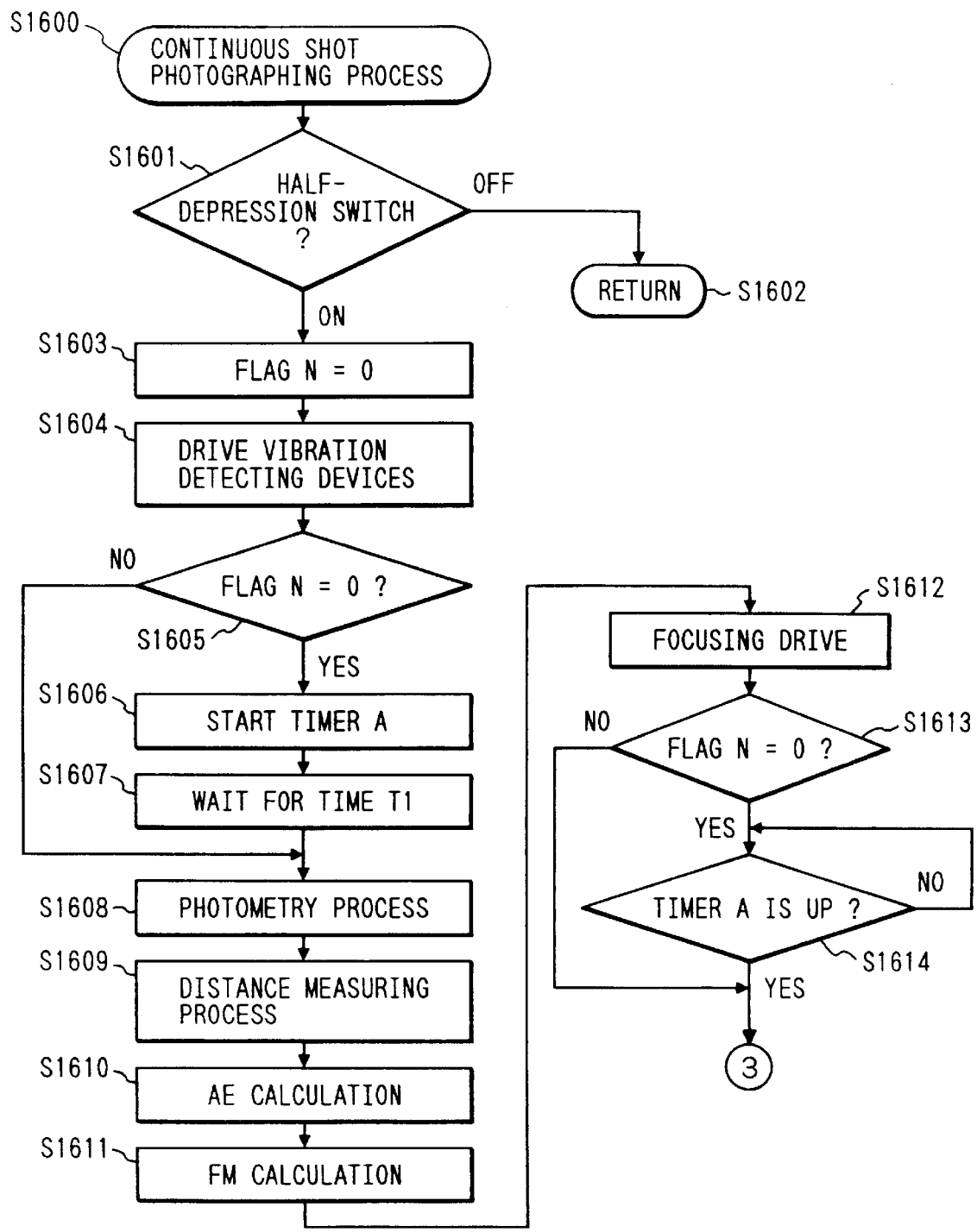
FIG. 9A is a flowchart for explaining a continuous shot photographing process of the second embodiment of the present invention.
Figures 2, 9B:
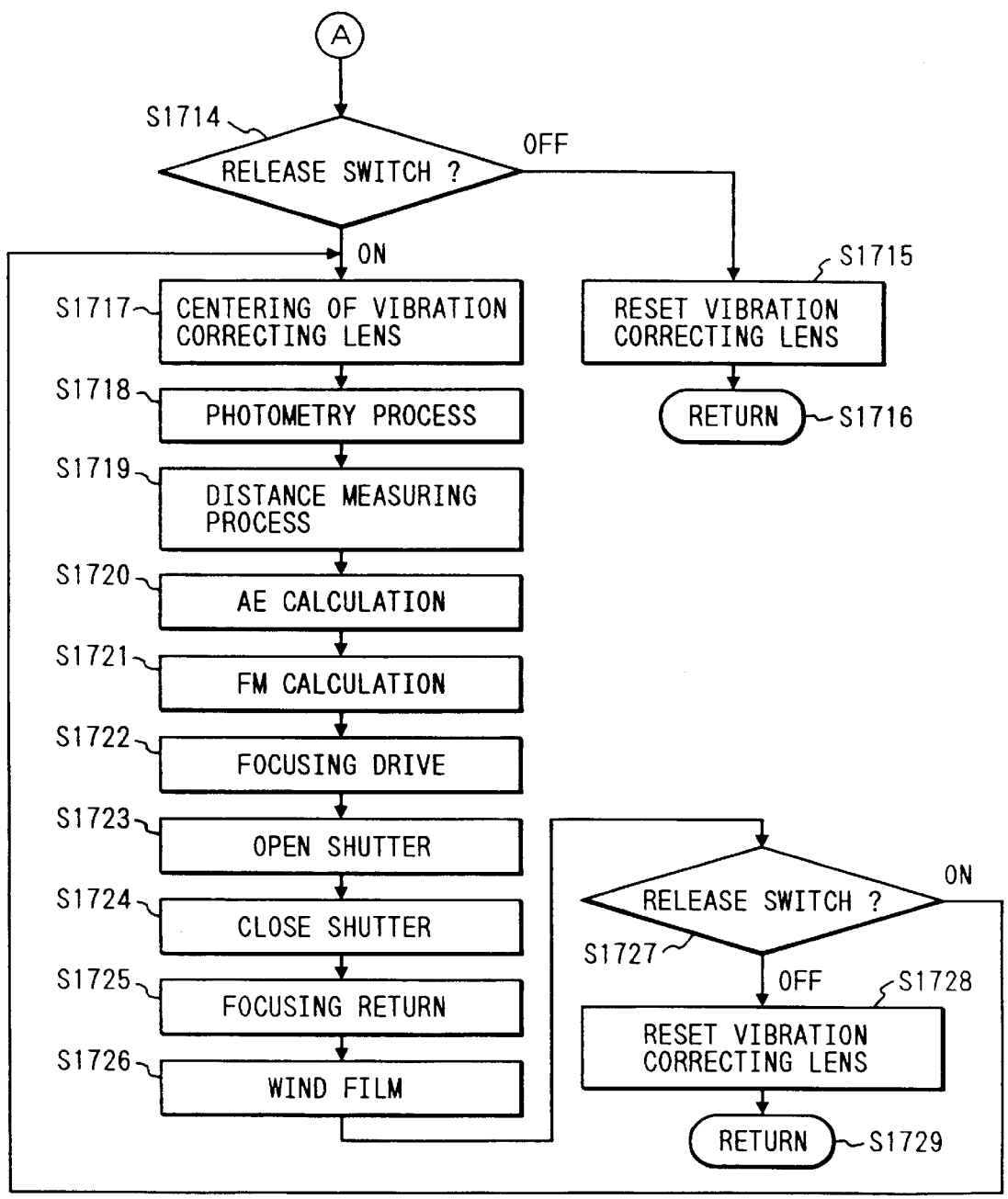
FIG. 9B is comprised of FIGS. 9B-1 and 9B-2 showing flowcharts for explaining a continuous shot photographing process of the second embodiment of the present invention.

FIGS. 7, 8A to 8C, 9A, 9B-1 and 9B-2 are flowcharts for explaining the operation of the second embodiment of the present invention. The flowchart of FIG. 7 showing a main flow and the flowcharts of FIGS. 8A to 8C showing a photographing process are identical to the flowcharts of FIGS. 2 and 3A to 3C showing the first embodiment, and then, the description thereof will be omitted.

FIGS. 9A, 9B-1 and 9B-2 are flowcharts of a continuous shot photographing mode. When it is judged that the continuous shot photographing mode is selected in the step S203, the continuous shot photographing process is performed.

In the step S1601, the half-depression switch 19 is checked, and when the half-depression switch 19 is off, the procedure goes to the step S1602, returning to the main flow. When the half-depression switch 19 is on in the step S1601, the flag N is set to "0" in the step S1603, and the vibration detecting devices 3, 4 are driven in the step S1604.

Next, in the step S1605, the flag N is checked, and when it is "0", the procedure goes to the step S1606. When the flag N is not "0", the procedure goes to the step S1608 without starting the timer A and waiting for the time T1. In the step S1606, the timer A (the angular speed zero detection timer: 900 ms) is started, and in the step S1607, wait for the time T1 which is necessary to secure time for stabilization of the circuits of the vibration detecting devices. In this embodiment, the wait for time T1 is 250 ms obtained by subtracting the distance measuring time of 0 to 300 ms and the photometry time of 50 ms from the time of 300 ms required to stabilize the circuits of the vibration detecting devices. Next, a photometry process is performed in the step S1608, and a distance measuring process is performed in the step S1609.

Thereafter, in the step S1610, the AE calculation is executed by the use of the result of the photometry performed in the step S1608, and in the step S1611, the FM calculation is executed by the use of the result of the distance measurement performed in the step S1609. In the step S1612, the focusing lens 14 is driven to a predetermined position in accordance with the distance value set in the step S305 (FIG. 8A).

Next, in the step S1613, it is ascertained whether the flag N is "0", and when it is "0", the procedure goes to the step S1614, and it is ascertained whether the timer A is up. When the timer A is not up, wait until it is up, and thereafter, the procedure goes to the step S1701. When the flag N is not "0", the timer A is not checked and the procedure goes to the step S1701.

In the step S1701, it is ascertained whether the release switch 20 is on, and when it is off, it is ascertained whether the half-depression switch 19 is on in the step S1702. When the half-depression switch 19 is on in the step S1702, the procedure returns to the step S1701, and it is ascertained whether the release switch is on or off again. Also, when the half-depression switch is off in the step S1702, the vibration detecting devices are stopped in the step S1703, and the continuous shot photographing process is terminated.

When the release switch 20 is on in the step S1701, the procedure goes to the step S1705. In the step S1705, the center of the vibration correcting lens 13 is moved from the initial reset position to the center position of the optical axis. In the step S1706, vibration correction is started. In the step S1707, wait for time T3 (the approach run control time for stabilization of the vibration correction control: 20 ms), and the procedure goes to the step S1708.

In the step S1708, the shutter starts opening. The shutter is opened at a predetermined shutter speed based on the exposure value in accordance with the AE calculation value obtained in the step S1608. Thereafter, in the step S1709, the shutter is closed. Then, the vibration correcting process is stopped in the step S1710, and the vibration detecting devices are stopped in the step S1711. In the step S1712, the focusing lens 14 is driven to the predetermined reset position. Next, in the step S1713, the photographic film is wound one frame, and in the step S1714, it is ascertained whether the release switch 20 is on. When the release switch 20 is off, the vibration correcting lens 13 is returned to the reset position, and from the step S1716, the procedure goes to the main flow.

When the release switch 20 is on in the step S1714, the procedure goes to the step S1717. In the step S1717, the center of the vibration correcting lens 13 is moved from the initial reset position to the center position of the optical axis. Then, the photometry process is performed in the step S1718, and the distance measuring process is performed in the step S1719. Thereafter, in the step S1720, the AE calculation is executed by the use of the result of the photometry performed in the step S1718, and in the step S1721, the FM calculation is executed by the use of the result of the distance measurement performed in the step S1719. In the step S1722, the focusing lens 14 is driven to a predetermined position in accordance with the distance value set in the step S1719. In the step S1723, the shutter starts opening. The shutter is opened based on the exposure value in accordance with the AE calculation value obtained in the step S1720. Thereafter, the shutter is closed in the step S1724, and the focusing lens 14 is driven to the predetermined reset position in the step S1725. Next, in the step S1726, the photographic film is wound, and in the step S1727, it is judged whether the release switch is on or off. When the release switch is on in the step S1727, the procedure returns to the step S1717 to start photographing again. When the release switch is off in the step S1727, the procedure goes to the step S1728 and the vibration correcting lens 13 is returned to the reset position in the step S1728. Then, from the step S1729, the procedure returns to the main flow.

FIG. 10 is a block diagram showing a third embodiment of the present invention.

A taking lens 101 is a single focus lens or a variable power lens having a plurality of lens groups and is constituted of a focusing lens 101a and a vibration correcting lens 101b. The vibration correcting lens 101b can be driven in the X-axis direction (longitudinal direction of the camera) and Y-axis direction (vertical direction of the camera) to correct a camera shake at the time of photographing. The focusing lens 101a is held by a lens frame 105. A guide hole 105a and a female screw hole 105b are formed in the upper portion of the lens frame 105. A rod 104 is slid in the guide hole 105a to guide the lens frame 105 to shift in the optical axis direction (lateral direction in FIG. 10), and the female screw hole 105b is engaged with a feed screw 103 to drive the lens frame 105 in the optical axis direction. A diaphragm shutter 102 is disposed close to the lens frame 105 on the side of a photographic film 116. A slidable brush 106 is fixedly mounted on the lower portion of the lens frame 105. The lens frame 105, the diaphragm shutter 102 and the slidable brush 106 are shifted together in the optical axis direction.

On the right end of the feed screw 103 is secured a gear 103a coaxially. The gear 103a is engaged with a pinion gear 109a, which is secured to a shaft 109b of a focusing motor 109. Therefore, as the focusing motor 109 rotates, the feed screw 103 rotates to shift the lens frame 105 in the optical axis direction. The rotation of the lens frame 105 is controlled by a CPU 114 via a motor drive circuit 110. Also, the amount of rotation of the lens frame 105 is detected by a combination of a rotating disk 108 mounted on the shaft 109b and a photointerruptor 107, and supplied to the CPU 114 as an output pulse signal.

The slidable brush 106 mounted on the lower portion of the lens frame 105 constitutes a lens barrel switch SW3 together with conductor patterns 106a and 106b. That is, the slidable brush 106 constitutes a needle of the barrel switch SW3, while the conductor patterns 106a and 106b constitute a stator of the barrel switch SW3. The length of the conductor pattern 106a is differentiated from that of the conductor pattern 106b. The conductor patterns 106a, 106b are divided into an area A where the slidable brush 106 is brought into contact with both conductor patterns 106a, 106b and an area B where it is brought into contact with only the conductor pattern 106b.

When the slidable brush 106 is located in the area A, the barrel switch SW3 is turned on. On the other hand, when the slidable brush 106 is located in the area B, the barrel switch SW3 is turned off. Thereby, the CPU 114 can detect whether the lens frame 105 is located in the area A or whether the lens frame 105 is located in the area B. In a reset condition prior to a focusing operation of the lens frame 105 and the like, the slidable brush 106 is disposed in the area B. From the time when the slidable brush 6 is shifted in the area A due to forward rotation of the focusing motor 109, the CPU 114 starts counting the output pulse signal from the photointerruptor 107, and stops the focusing motor 109 when the count reaches a predetermined value.

Based on a photometry value from a photometry circuit 112, an exposure control circuit 111 controls the diaphragm shutter 102 according to a control signal from the CPU 114. A distance measuring circuit 113 measures an object distance and supplies a distance measurement signal to the CPU 114. The CPU 114 calculates a focusing position of the taking lens 101 based on the distance measurement signal and rotates the focusing motor 109 forward via the motor drive circuit 110. Thereby, the lens frame 105 starts shifting leftward in FIG. 10. When the count of the output pulse signal from the photointerruptor 107 reaches a predetermined value, the CPU 114 stops rotation of the focusing motor 109.

A switch SW1 connected to the CPU 114 is a half-depression switch for directing the photometry circuit 112 and the distance measuring circuit 113 to perform photometry and distance measurement respectively. Also, a switch SW2 is a whole-depression switch for directing the rotation of the focusing motor 109 and exposure (exposure of the photographic film 116) by means of the diaphragm shutter 102. Both switches are operation switches to be depressed by the photographer. A film feeding circuit 115 is controlled by the CPU 114 to wind the photographic film 116 one frame after taking a picture (exposure of the photographic film 116) in preparation for the following photographing and to rewind the photographic film after the entire photographic film has been exposed. To the CPU 114 is connected the half-depression switch SW1 to be turned on due to the half depression of the release button, the release switch SW2 to be turned on due to the whole depression of the release button, and the main switch SW4 for starting the operation of the camera. The main switch SW4 includes off and on positions, and once set to the on position, it is kept turned on until returned to the off position.

Also, to the CPU 114 is connected a lens barrel switch SW3 for recognizing a reference position of the lens frame 105 including the taking lens 101 (hereinafter referred to as the lens barrel), the photointerruptor 107, and the motor drive circuit 110. When the lens barrel is located in the initial position, the lens barrel switch SW3 is in the off state. When the lens barrel is shifted in a projecting direction or shifted forward, switch SW3 enters the on state. Further, the exposure control circuit 111, the photometry circuit 112, the distance measuring circuit 113, and the film feeding circuit 115 are connected to the CPU 114.

The CPU 114 is a one chip microcomputer and controls whole sequences of the camera. FIGS. 11, 12A to 12C, and 13A to 13C are flowcharts showing processes related to this embodiment among programs contained in the CPU 114. Timers, counters and the like shown in the flowcharts are housed in the CPU 114.

The motor drive circuit 110 controls the motor 109 in accordance with the control signal from the CPU 114. The motor 109 drives the lens barrel. The lens barrel is projected forward (focusing) owing to forward rotation of the motor 109, while it is retracted rearward (focusing return) owing to reverse rotation thereof. When the motor 109 is energized to shift the lens barrel, the photointerruptor 107 detects rotation of the motor 109. Each time the lens barrel is shifted a predetermined amount, the photointerruptor 107 reverses the output signal (LPI) and sends the output to the CPU 114. As a result, the photointerruptor 7 outputs a pulse train the number of pulses of which corresponds to the amount of shift of the lens barrel. A position where the lens barrel switch SW3 is switched from off to on is determined as the reference position, and the CPU 114 counts pulses input to a LPI terminal after the lens barrel switch SW3 is reversed. Thereafter, when a predetermined number of pulses is counted, the motor 109 is stopped to position the lens barrel in a predetermined position. This number of pulses is determined in accordance with the result of the distance measurement in the distance measuring circuit 113, and the focusing is completed by driving the lens barrel until the count of the pulses reaches the target number of pulses obtained in the distance measurement.

An angular speed detecting circuit 120 is a circuit for detecting the angular speed of a camera shake around the Y-axis in the X-axis direction. An angular speed detecting circuit 121 is a circuit for detecting the angular speed thereof around the X-axis in the Y-axis direction. The output values of the angular speed detecting circuits 120, 121 change in accordance with the angular speeds produced due to the camera shake. The CPU 114 performs the A/D conversion of the output values to obtain the angular speeds of the camera shake.

A motor drive circuit 123 controls a motor 124 for driving the vibration correcting lens 101b in the X-axis direction. A motor drive circuit 125 controls a motor 126 for driving the vibration correcting lens 101b in the Y-axis direction.

The motor drive circuit 123 controls the motor 124 while controlling its duty. The motor drive circuit 125 controls the motor 126 while controlling its duty. The CPU 114 outputs drive direction signals to the motor drive circuits 123, 125 to direct the drive directions of the motors 124, 126. Also, the CPU 114 outputs drive duty signals to the motor drive circuits 123, 125 to direct the drive speeds of the motors 124, 126. The motor drive circuits 123, 125 energize the motors 124, 126 in specified directions with arbitrary duties. Thereby, the vibration correcting lens 101b is controlled in accordance with the angular speeds of the camera shake detected in the angular speed detecting circuits 120, 121.

A lens position detecting circuit 127 is a circuit for detecting the position (the amount of shift) of the vibration correcting lens 101b in the X-axis direction and outputting the detection result to the CPU 114. A lens position detecting circuit 128 is a circuit for detecting the position (the amount of shift) of the vibration correcting lens 101b in the Y-axis direction and outputting the detection result to the CPU 114.

A vibration indicator 129 indicates the state of the camera shake. A motor torque detecting circuit 130 is a circuit for detecting torque applied to the motor 109. A liquid crystal display panel 131 is for indicating the counter of the film, the data, etc.

Figure 11:
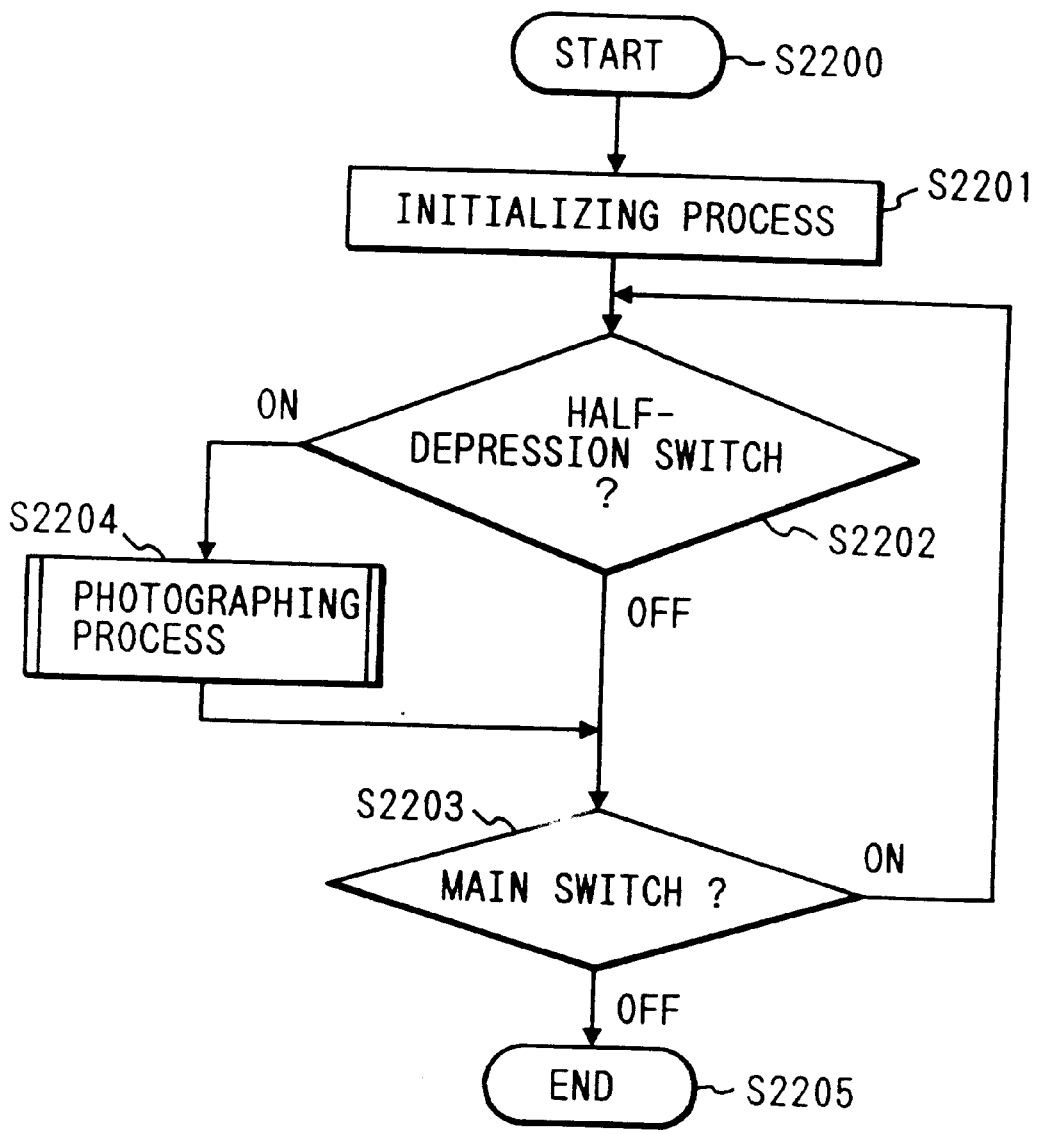
FIG. 11 is a flowchart showing a main flow of the third embodiment of the present invention.

FIG. 11 is a flowchart showing a main flow of the third embodiment of the present invention. The power source, i.e., the main switch SW4 has been already turned on, and the process is started from the step S2200. First, in the step S2201, the inside of the CPU 114 is initialized. Next, while going the loop of the steps S2202, S2203, wait until the half-depression switch SW1 is turned on in the step S2202, or the main switch SW4 is turned on in the step S2203. When the main switch SW4 is off in the step S2203, the procedure goes to the step S2205, ending the process. Thereafter, wait until the main switch SW4 is turned on again. When the main switch SW4 is turned on, the process is started again from the step S2202. When the half-depression switch SW1 is turned on in the step S2202, the procedure goes to the step S2204, and a photographing process is called.

Figure 12A:
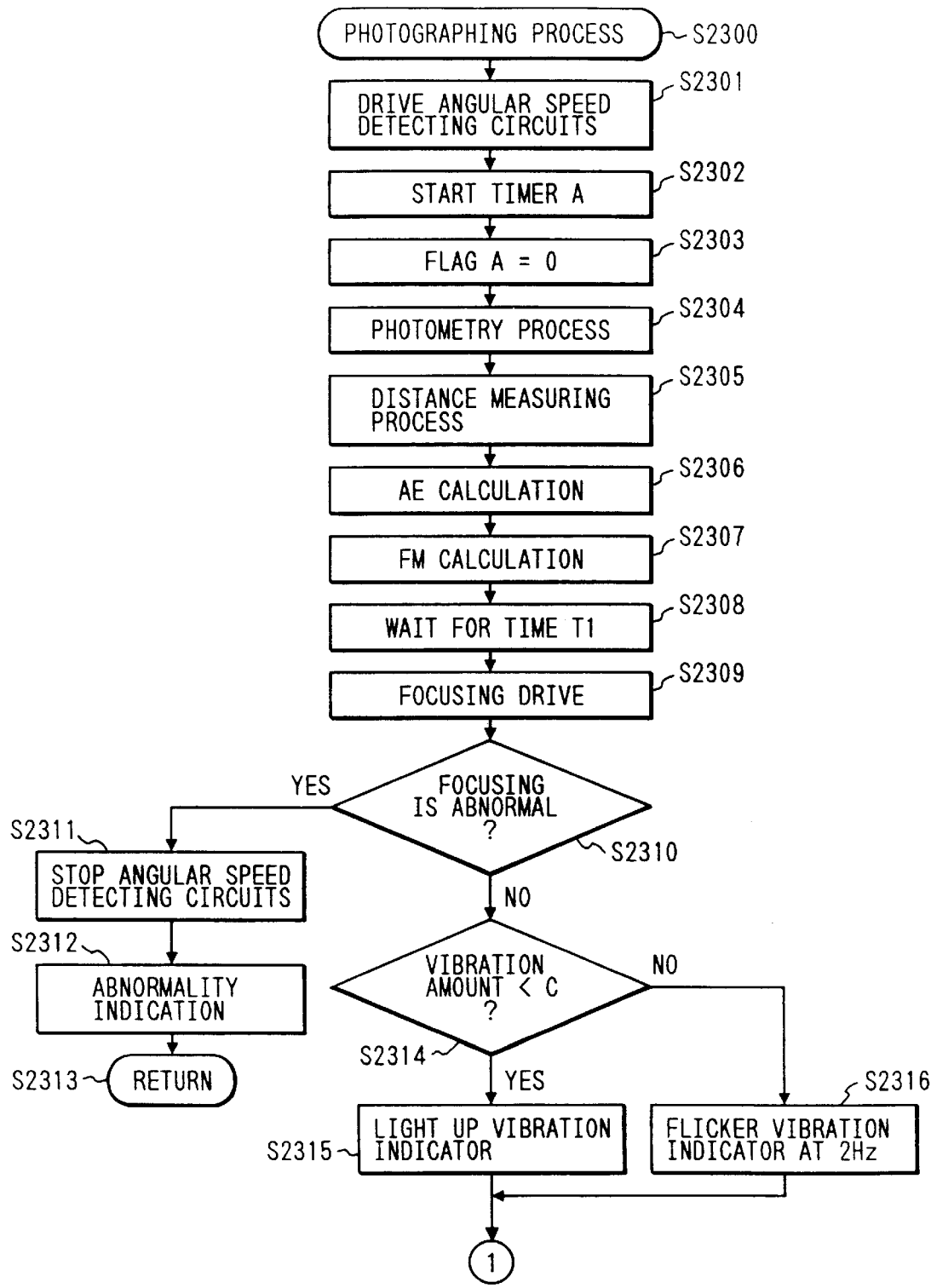
FIGS. 12A to 12C are flowcharts for explaining an example of a photographing process of the third embodiment of the present invention.
Figure 12B:
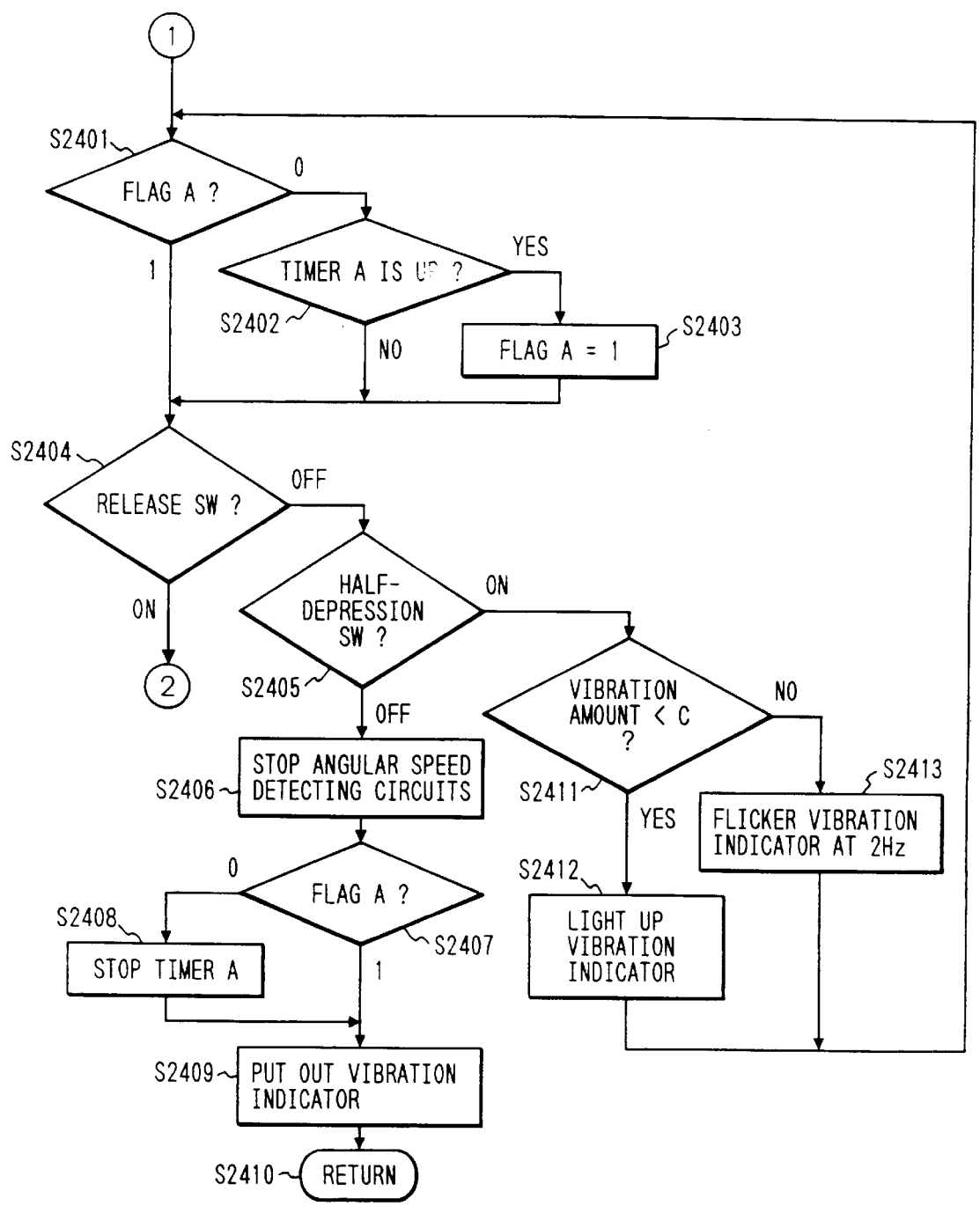
Figure 12C:
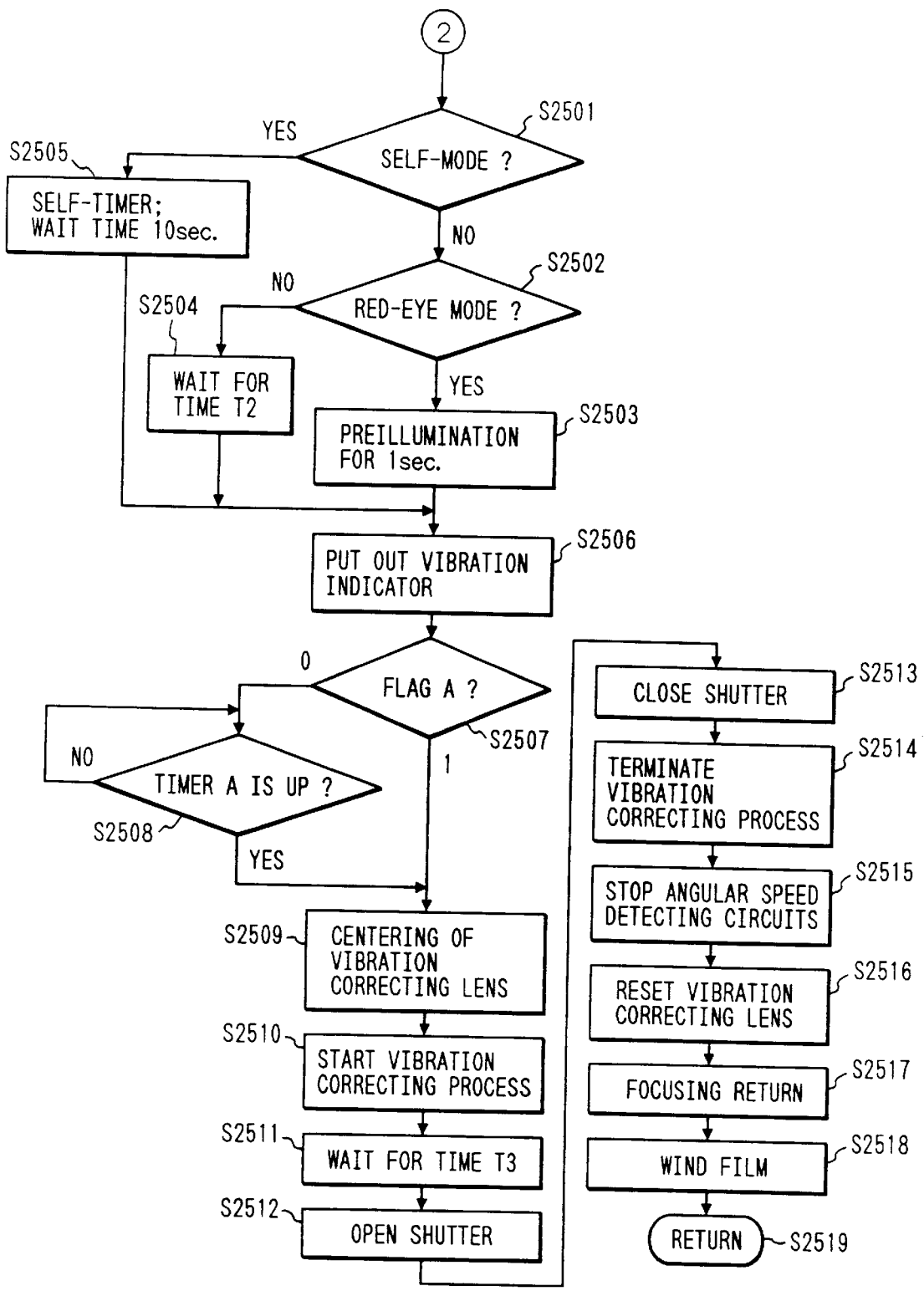
Figure 13A:
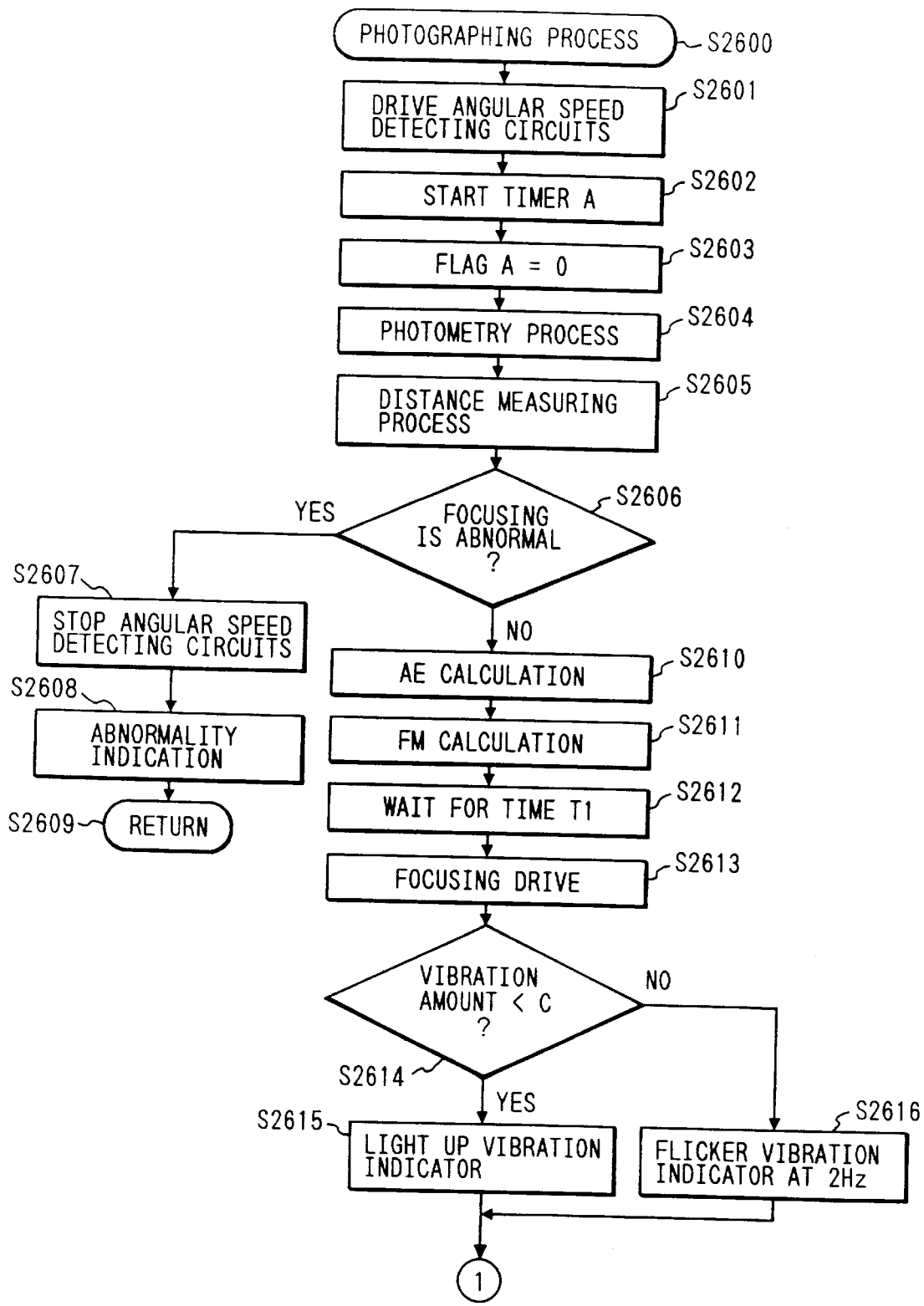
FIGS. 13A to 13C are flowcharts for explaining a photographing process of a sixth embodiment of the present invention.
Figure 13B:
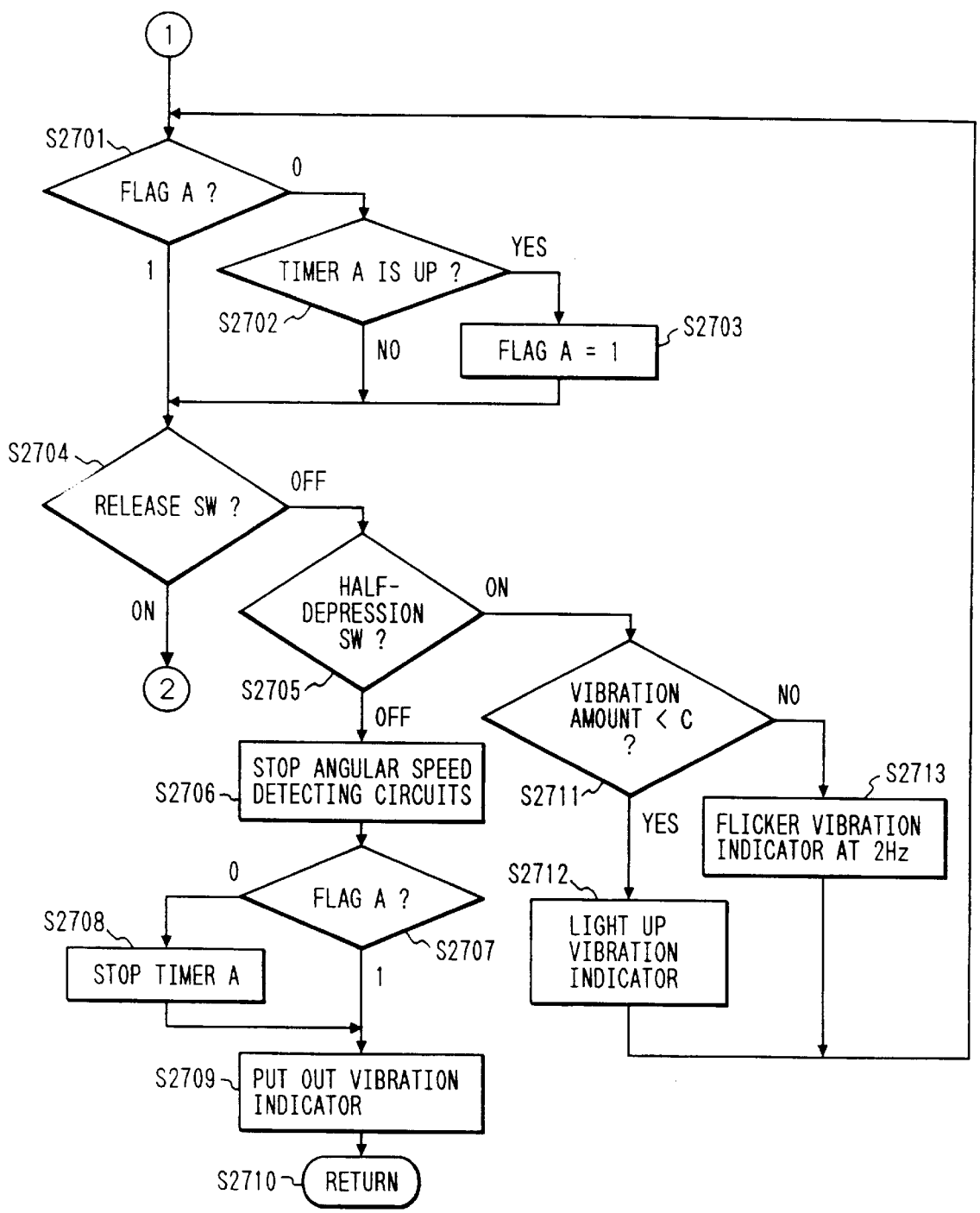
Figure 13C:
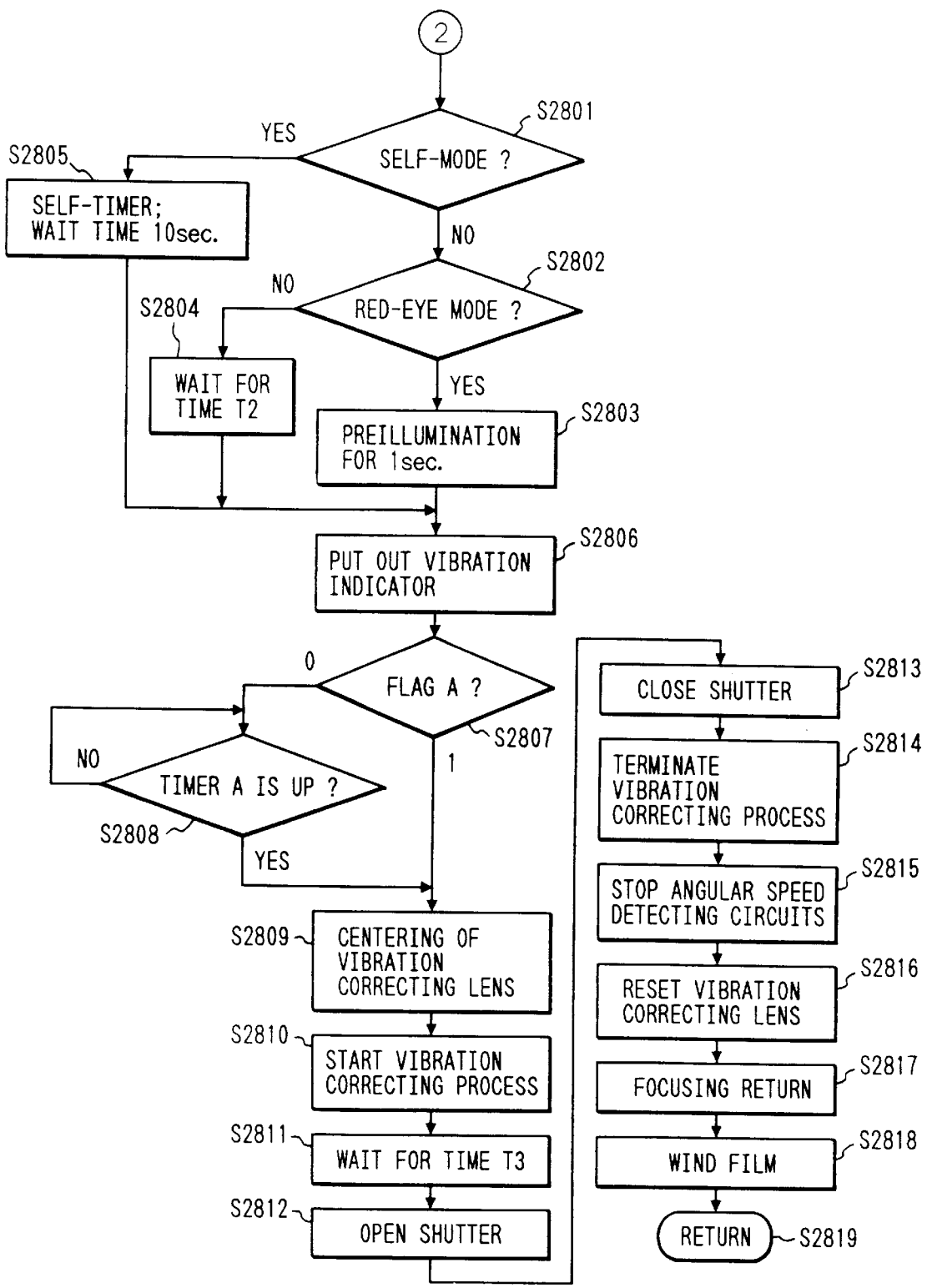

FIGS. 12A to 12C are flowcharts showing an example of a photographing process according to the third embodiment of the present invention.

When it is ascertained that the half-depression switch SW1 is turned on, the process is started from the step S2300 of FIG. 12A. First, in the step S2301, the angular speed detecting circuits 120, 121 are driven.

Next, in the step S2302, a timer A (the angular speed zero detection time: 900 ms) is started, and a flag A is set to "0" in the step S2303. Then, a photometry process is performed in the step S2304, and a distance measuring process is performed in the step S2305.

Thereafter, in the step S2306, the AE calculation is executed by the use of the result of the photometry performed in the step S2304, and in the step S2307, the FM calculation is executed by the use of the result of the distance measurement performed in the step S2305. Next, in the step S2308, wait for time T1. The wait for time T1 is necessary to secure time required for stabilization of the angular speed detecting circuits. In this embodiment, the wait for time T1 is 250 ms obtained by subtracting the distance measuring time of 0 to 300 ms and the photometry time of 50 ms from the time of 300 ms required to stabilize the angular speed detecting circuits. In the step S2309, the focusing lens 101a is driven to a predetermined position in accordance with the distance value set in the step S2305.

Next, in the step S2310, it is ascertained whether the focusing drive is performed properly. When it is not performed properly, the procedure goes to the step S2311, while when it is performed properly, the procedure goes to the step S2314. In this embodiment, the abnormal focusing means that the focusing lens 101a is not driven by the motor 109 into a proper position in accordance with the distance value set in the step S2305. Namely, the case where the number of output pulses of the photointerruptor 107 does not become a value specified by the CPU 114 within a predetermined period of time is judged as the abnormal focusing.

In the step S2314, it is judged whether the outputs of the angular speed detecting circuits 120, 121, i.e., the amount of vibration is smaller than a predetermined value C. When it is judged that the amount of vibration is smaller than the predetermined value C in the step S2314, the vibration indicator 129 is lit up, and the procedure goes to the step S2401 of FIG. 12B. The lighting indication of the vibration indicator 129 indicates that the detected amount of vibration is within a correctable range.

When the amount of vibration is larger than the predetermined value, the vibration indicator 129 is flickered at 2 Hz in the step S2316, and the procedure goes to the step S2401 of FIG. 12B. The 2 Hz flickering indication of the vibration indicator 129 indicates that the amount of vibration is too large and it is unknown whether it can be corrected.

In the step S2311, the angular speed detecting circuits 120, 121 are stopped, and the procedure goes to the step S2312. In the step S2312, the vibration indicator 129 is flickered at 10 Hz, returning to the main flow of FIG. 11. The 10 Hz flickering indication of the vibration indicator 129 means that the abnormal focusing occurred.

In the step S2401 of FIG. 12B, the flag A is checked, and when the flag A provided in the step S2303 is "0", the procedure goes to the step S2402.

When it is judged that the flag A is set to "1" in the step S2401, the procedure goes to the step S2404.

When the timer A is up (the angular speed zero detection time (900 ms) has elapsed) in the step S2402, the flag A is set to "1" in the step S2403, and the procedure goes to the step S2404. In the step S2404, it is ascertained whether the release switch SW2 is on, and when it is on, the procedure goes to the step S2501 of FIG. 12C.

When the release switch SW2 is off in the step S2404, it is ascertained whether the half-depression switch SW1 is on in the step S2405. When the half-depression switch SW1 is off in the step S2405, the angular speed detecting circuits 120, 121 are stopped in the step S2406. Thereafter, the flag A is checked in the step S2407, and when the flag A is "1", the procedure goes to the step S2409. When the flag A is "0", the timer A is stopped in the step S2408, and the procedure goes to the step S2409. In the step S2409, the vibration indicator 129 is put out, and from the step S2410, the procedure returns to the flowchart of FIG. 11. In this case, photographing is not carried out.

When the half-depression switch SW1 is on in the step S2405, the procedure goes to the step S2411. In the step S2411, it is judged whether the outputs of the angular speed detecting circuits 120, 121, i.e., the amount of vibration is smaller than the predetermined value C. When the amount of vibration is smaller than the predetermined value C in the step S2411, the vibration indicator 129 is lit up, and the procedure goes to the step S2401.

When the amount of vibration is larger than the predetermined value C in the step S2411, the vibration indicator 129 is flickered at 2 Hz in the step S2413, and the procedure goes to the step S2401. In the step S2501 of FIG. 12C, it is judged whether a self-mode is selected. When it is selected, the procedure goes to the step S2506 after a self-timer (e.g., 10 sec.) is up in the step S2505.

When the self-mode is not selected, a red-eye mode is checked in the step S2502. In the case of "YES", preillimination for 1 sec. is carried out in the step S2503, and the procedure goes to the step S2506. In the case of "NO" in the step S2502, wait for time T2 (the shock avoiding time at a release: 50 ms), and the procedure goes to the step S2506.

In the step S2506, the indication of the vibration indicator 129 carried out in the step S2312, S2316, S2412, or S2413 is put out, and the procedure goes to the step S2507.

In the step S2507, the flag A is checked, and when it is "1", the procedure goes to the step S2509. When the flag A is "0" in the step S2507, wait in the step 2508 until the timer A started in the step S2302 is up, and the procedure goes to the step S2509.

In the step S2509, the center of the vibration correcting lens 101b is moved from the initial reset position to the center position of the optical axis. In the step S2510, vibration correction is started and in the step S2511, wait for time T3 (the approach run control time for stabilization of the vibration correction control: 20 ms).

Then, in the step S2512, the shutter starts opening.

The vibration correcting process continues from the step S2510 before the opening of the shutter to the step S2514 immediately after the closing of the shutter. In the step S2512, the shutter is opened at a predetermined shutter speed based on the exposure value in accordance with the AE calculation value obtained in the step S2306. Thereafter, the shutter is closed in the step S2513, and the vibration correcting process is terminated. Next, the angular speed detecting circuits 120, 121 are stopped in the step S2515. Then, the vibration correcting lens 101b is returned to the initial position in the step S2516, and the focusing lens 101a is driven to the predetermined reset position in the step S2517. Next, in the step S2518, the photographic film is wound, and from the step S2519, the procedure returns to the flowchart of FIG. 11.

In this embodiment, when the abnormal focusing occurs in the apparatus, the driving of the angular speed detecting circuits 120, 121 is prohibited, so that a battery will not be spent in vain. Also, when the abnormal focusing occurs, the driving of the vibration correcting lens 101b is prohibited. Therefore, the battery will not be spent in vain to drive the vibration correcting lens 101b. Further, when the abnormal focusing occurs, the photographing sequence is terminated and the shutter will not be driven, which prevents an unnecessary picture from being taken.

Next, a fourth embodiment of the present invention will be described. The structure of an apparatus of the fourth embodiment is the same as that of third embodiment, and then, the description thereof will be omitted. The flowchart of the main flow of the fourth embodiment is the same as that of the third embodiment, so the description thereof will be omitted. In the flowchart of the photographing process of the fourth embodiment, the steps S2300 to S2309 are the same as those in the third embodiment, so the description thereof will be omitted.

Next, in the step S2310, it is ascertained whether the focusing drive is performed properly, and when it is not performed properly, the procedure goes to the step S2311. On the other hand, when it is performed properly, the procedure goes to the step S2314. In this embodiment, the abnormal focusing means that the lens barrel switch SW3 cannot recognize the reference position of the lens barrel. That is, the case where the CPU 114 cannot detect the switching of the lens barrel switch SW3 from on to off is judged as the abnormal focusing.

The step S2311 and later steps are the same as those in the third embodiment, so the description thereof will be omitted.

Next, a fifth embodiment of the present invention will be described. The structure of an apparatus of the fifth embodiment is the same as that of the apparatus of the third embodiment, so the description thereof will be omitted. The flowchart of the main flow of the fifth embodiment is the same as that of the third embodiment, so the description thereof will be omitted. In the flowchart of the photographing process of the fifth embodiment, the steps S2300 to S2309 are the same as those in the third embodiment, so the description thereof will be omitted.

Next, in the step S2310, it is ascertained whether the focusing drive is performed properly, and when it is not performed properly, the procedure goes to the step S2311. On the other hand, when it is performed properly, the procedure goes to the step S2314. In this embodiment, the abnormal focusing means that unusually large torque is applied to the motor 109. Namely, the case where the motor torque detecting circuit detects a value exceeding predetermined torque is judged as the abnormal focusing.

The step S2311 and the later steps are the same as those in the third embodiment, so the description thereof will be omitted.

Next, a sixth embodiment of the present invention will be described. The structure of an apparatus of the sixth embodiment is the same as the third embodiment, so the description thereof will be omitted.

The flowchart of the main flow of the sixth embodiment is the same as that of the third embodiment, so the description thereof will be omitted. Next, a photographing process of the sixth embodiment will be described with reference to the flowcharts of FIGS. 13A to 13C. The steps S2600 to S2605 are the same as the steps S2300 to S2305 of the third embodiment, so the description thereof will be omitted.

Next, in the step S2606, it is ascertained whether the focusing drive is performed properly. When the focusing drive is not performed properly, the procedure goes to the step S2607. On the other hand, when it is performed properly, the procedure goes to the step S2610. In this embodiment, the abnormal focusing means that a distance measurement signal from the distance measuring circuit 113 is not supplied to the CPU 114.

The steps S2607 to S2609 are the same as the steps S2311 to S2313 of the third embodiment, so the description thereof will be omitted. The steps S2610 to S2613 are the same as the steps S2306 to S2309 of the third embodiment, so the description thereof will be omitted. After completing the process of the step S2613, the procedure goes to the step S2614. The step S2614 and the later steps are the same as those of the third embodiment, so the description thereof will be omitted.

Figure 14:
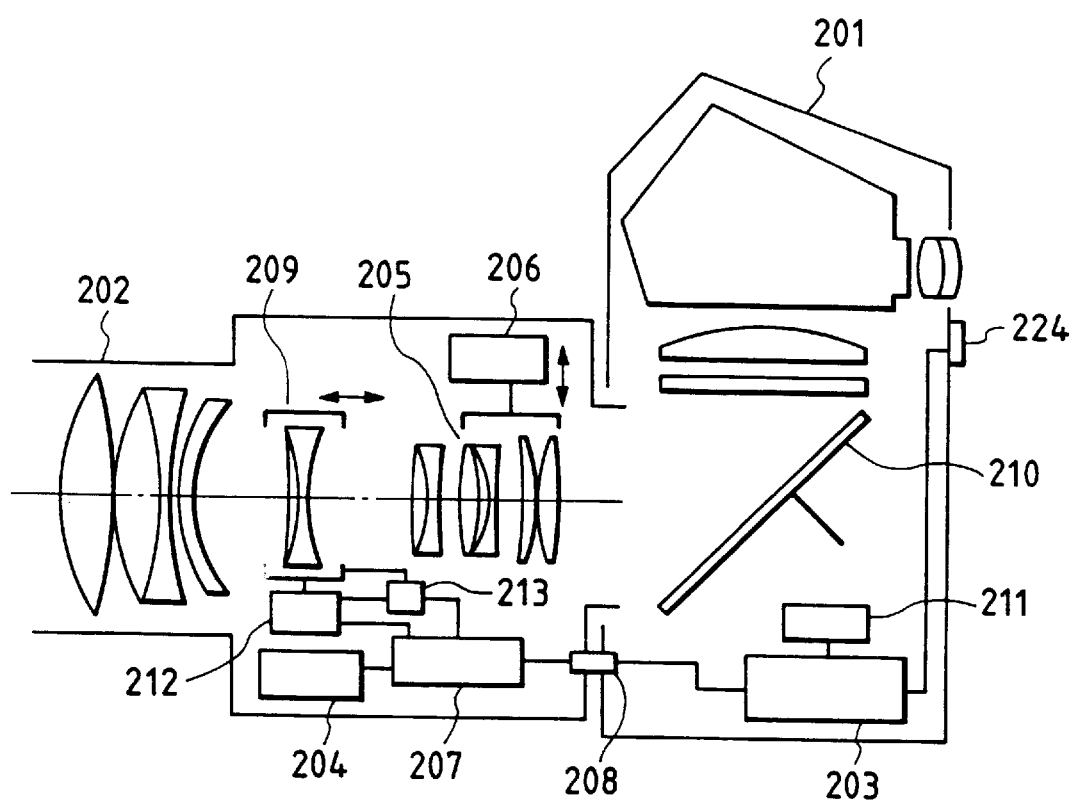
FIG. 14 is a schematic diagram showing a camera according to a seventh embodiment of the present invention.

FIG. 14 is a sectional view of a single-lens reflex camera according to a seventh embodiment of the present invention.

The single-lens reflex camera is constituted of a camera body 201 with a vibration correction function and an interchangeable lens 202. A camera body control section 203 is a computer for performing exposure control, autofocus control, display control and the like. A vibration detecting sensor 204 is vibration detecting means for detecting vibration generated due to a camera shake. A vibration correcting lens 205 is a lens for correcting the camera shake. An actuator 206 for vibration correction is lens drive means for correcting the camera shake by driving the vibration correcting lens 205. A lens control section 207 is a computer for controlling various devices in the interchangeable lens 202. The two control sections 203 and 207 are connected to each other via a contact 208 so as to send and receive necessary data. An AF lens 209 is a lens for performing focus adjustment of the photographing optical system of the interchangeable lens 202. A mirror 210 is for leading an image in the object field to a finder. An AF sensor 211 is a sensor for detecting a phase difference of the object so as to perform the focus adjustment of the photographing optical system of the interchangeable lens 202. An actuator 212 for the AF lens is a motor for driving the AF lens 209. An encoder 213 detects the amount of drive of the actuator 212 or the amount of drive of the AF lens 209. A warning display panel 224 is a display device for carrying out AF abnormality indication.

The camera body control section 203 and the AF sensor 211 are contained in the camera body 201. The vibration detecting sensor 204, the vibration correcting lens 205, the actuator 206 for vibration correction, the lens control section 207, the AF lens 209, the actuator 212 for the AF lens and the encoder 213 are contained in the interchangeable lens 202.

Figure 15:
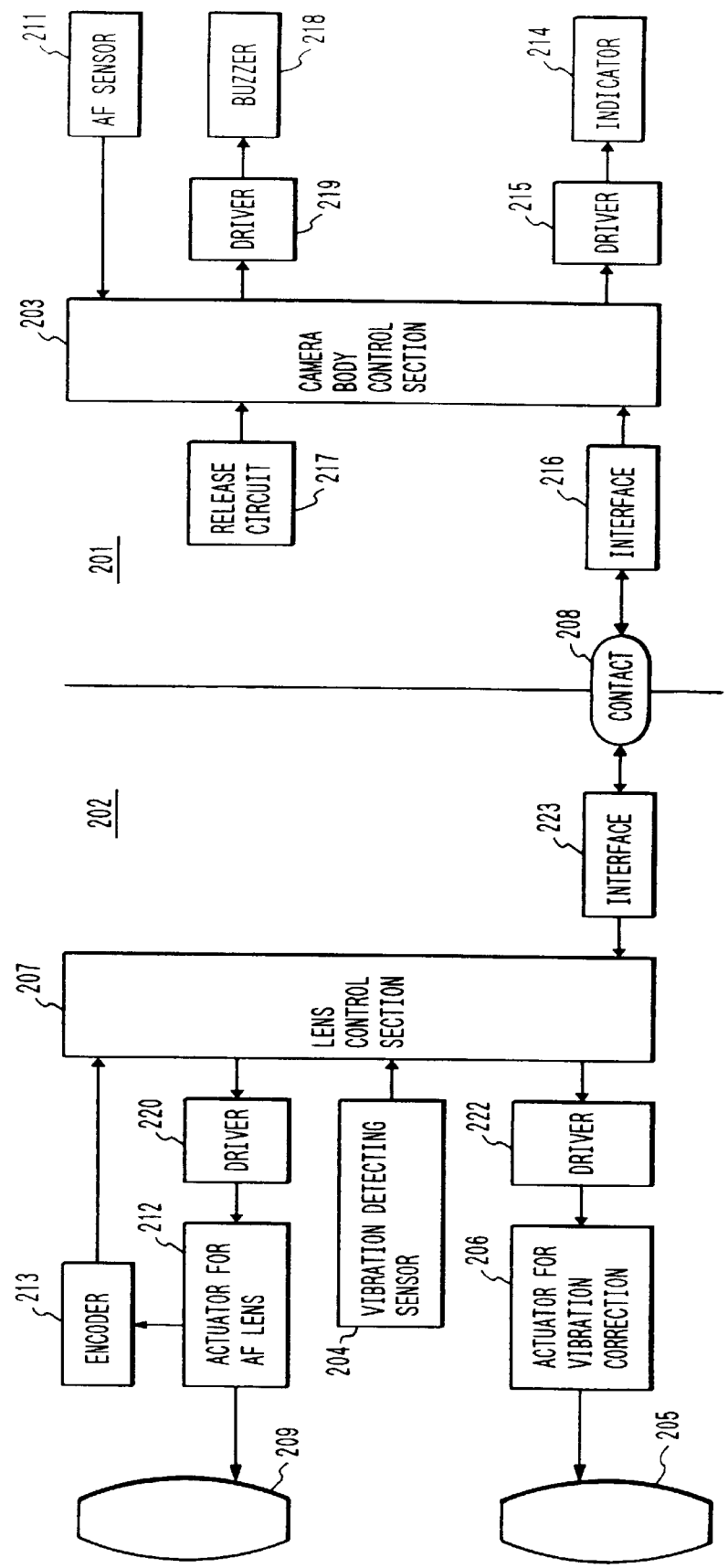
FIG. 15 is a block diagram showing the circuits of the camera according to the seventh embodiment of the present invention.

FIG. 15 is a block diagram showing a control system of the vibration correction function of the vibration correction device. To the camera body control section 203 are connected a release circuit 217 to be operated by depression of a release button, a driver 219 for driving a buzzer 218, a driver 215 for driving an indicator 214, an interface 216 connected to the contact 208, and the AF sensor 211. The release circuit 217 turns on a photometry and distance measuring switch when the release button is half depressed. Also, the release circuit 217 turns on a release switch when the release button is wholly depressed, whereby a shutter is opened and closed to take a picture.

To the lens control section 207 are connected a driver 220 for driving the actuator 212 for the AF lens, the encoder 213, the vibration detecting sensor 204 for detecting the frequency and the amplitude of vibration generated by a camera shake and outputting an analog signal, a driver 222 for driving the actuator 206 for vibration correction, and an interface 223 connected to the contact 208.

The lens control section 207 calculates the proper amount of vibration correction from focal length data of the lens and the analog signal input from the sensor 204, and drives the actuator 206 for vibration correction via the driver 222.

A half-depression signal of the release button, a whole-depression signal, an AF signal, a correction end signal and the like are supplied from the body control section 203 to the lens control section 207. Identification data of the interchangeable lens 202 with the vibration correcting mechanism, focal length data, a warning signal and the like are supplied from the lens control section 207 to the body control section 203.

Figure 16:
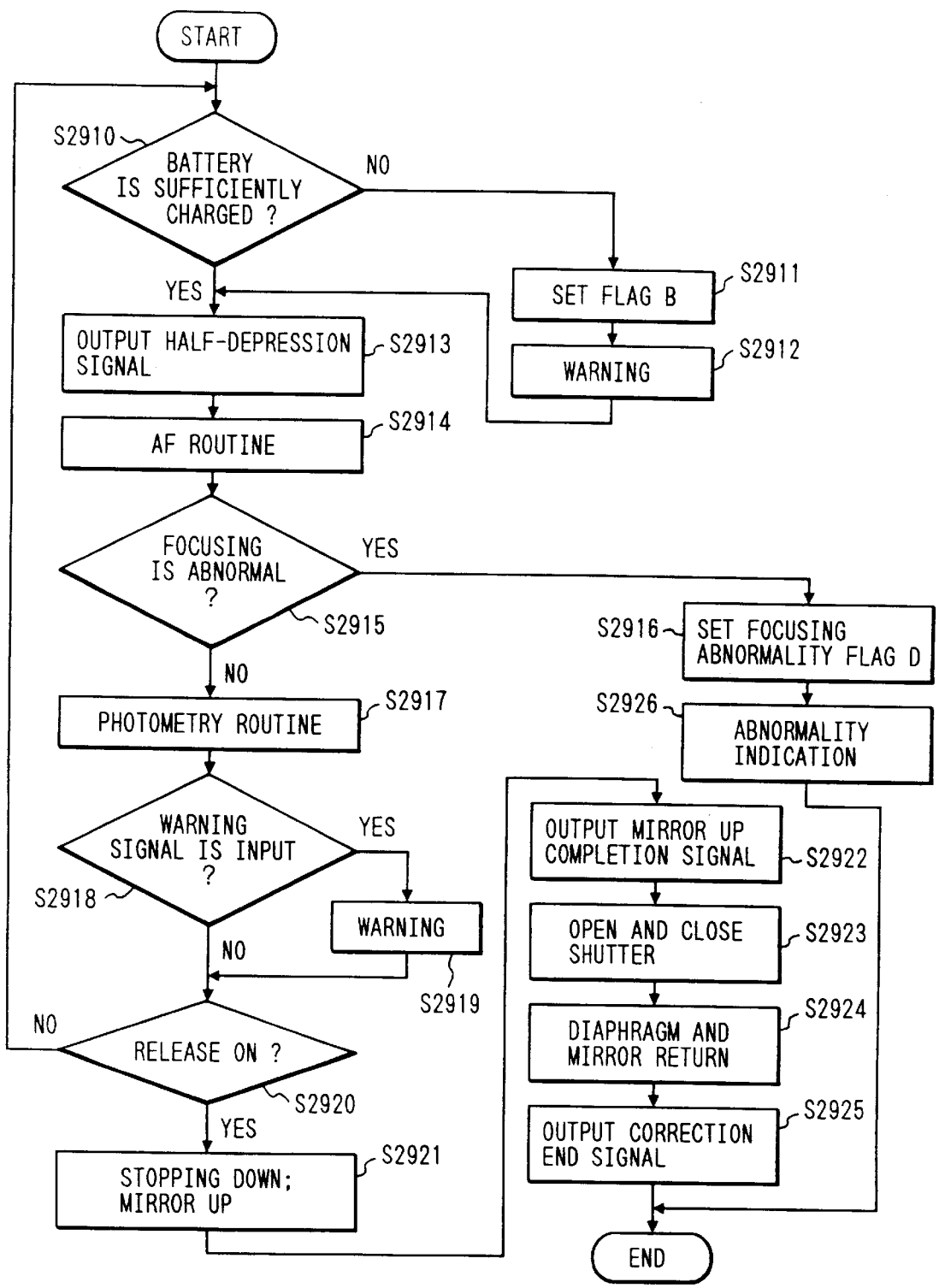
FIG. 16 is a flowchart for explaining a process performed by the camera body control section in the camera of the seventh embodiment of the present invention.
Figure 17:
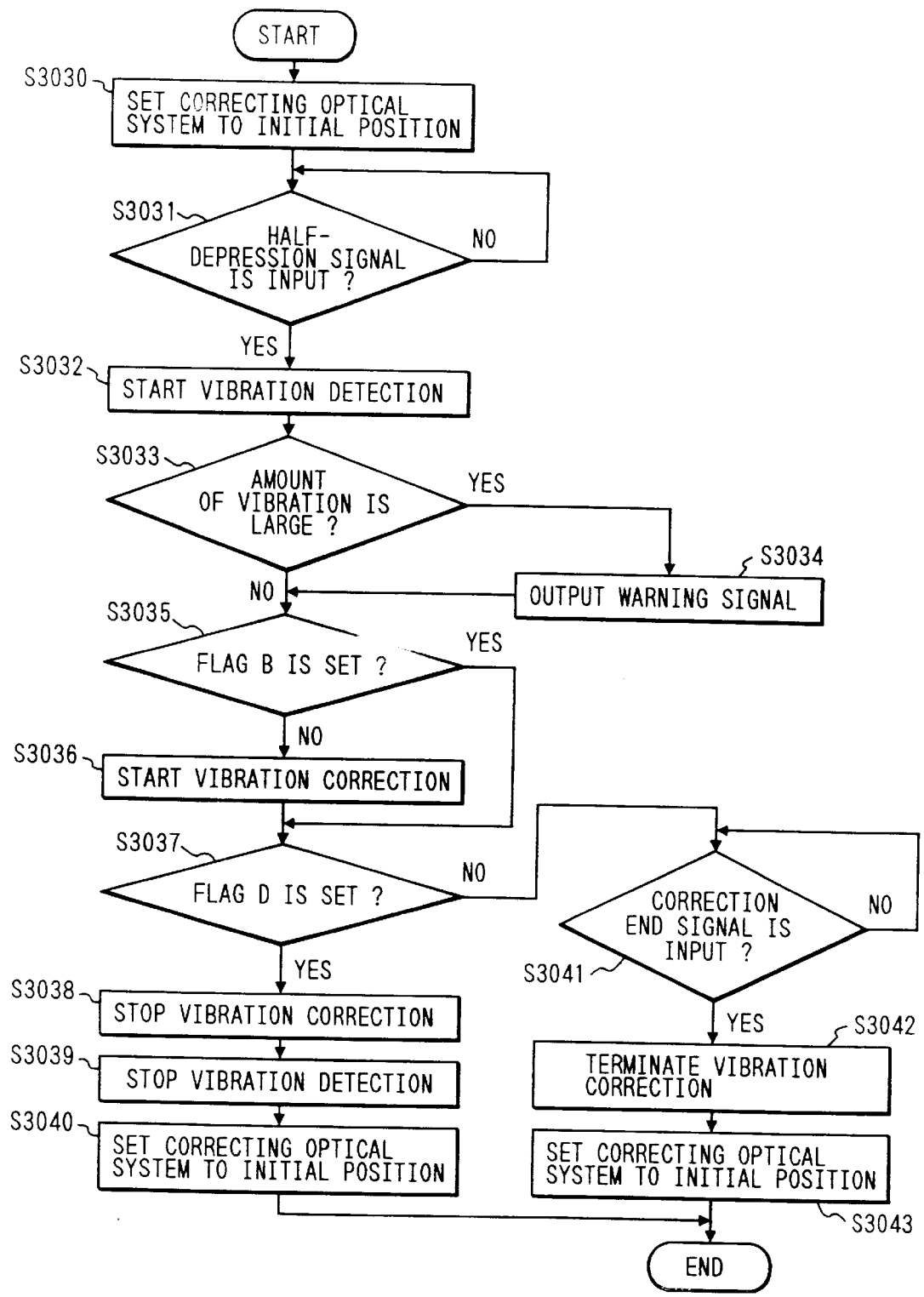
FIG. 17 is a flowchart for explaining a process performed by the lens control section of the camera of the seventh embodiment of the present invention.

Next, the operation of this embodiment will be described with reference to the flowcharts of FIGS. 16 and 17. First, the process of the camera body control section 203 will be described with reference to the flowchart of FIG. 16.

Upon half depression of the release button of the release circuit 217, the photometry and distance measuring switch is turned on to start this process. First, in the step S2910, it is judged whether a battery is sufficiently charged. As a result, when it is judged that more than a predetermined amount of the battery is spent, a battery flag B is set in the step S2911, and a warning signal is generated in the step S2912.

Next, in the step S2913, a half-depression signal indicating that the release button is half depressed is output to the lens control section 207 in the interchangeable lens 202, and in the step S2914, an AF (autofocus) process is performed.

In the AF process, first, the AF sensor 211 detects the amount of defocus of the photographing optical system. Then, the camera body control section 203 calculates the amount of drive of the AF lens 209, and sends an AF lens control signal to the lens control section 207. The lens control section 207 outputs a drive signal to the actuator 212 for the AF lens, and drives the AF lens 209 to perform focus adjustment of the photographing optical system.

Next, in the step S2915, it is judged whether the focusing is abnormal. In the step S2915, the encoder 213 detects the amount of drive of the actuator 212 for the AF lens. When the actuator 212 for the AF lens is not driven as instructed by the lens control section 207, a focusing abnormality signal is input, and the procedure goes to the step S2916.

In the step S2916, a focusing abnormality flag D is set, and in the step S2926, AF abnormality indication is carried out on the warning display panel 224.

In the step S2915, when it is judged that the focusing is not abnormal, a photometry process is performed in the step S2917. The photometry process is a process for determining an F-number and a shutter speed for obtaining proper exposure in photographing by reading photometry information from a photometry section (not shown).

Next, in the step S2918, it is judged whether a warning signal is input. The warning signal is a signal sent from the lens control section 207 in the interchangeable lens 202 to the body control section 203 when the amount of camera shake is beyond a correctable range. When this warning signal is input, the body control section 203 sounds the buzzer 218 via the driver 219. Then, in the step S2919, camera shake warning indication is carried out on the indicator 214 via the driver 215, warning the photographer that the amount of camera shake is beyond the correctable range.

Next, in the step S2920, it is judged whether the release switch is turned on by the whole depression of the release button. When the release switch is not on, the procedure goes back to the step S2910, and the above-mentioned process is repeated. When the release switch is on, a diaphragm mechanism is stopped down to the set F-number, and a mirror is raised up in the step S2921. Then, upon detecting the completion of the raising of the mirror by means of detecting means (not shown), a mirror up completion signal is output to the lens control section 207 in the interchangeable lens 202 in the step S2922.

Thereafter, in the step S2923, the shutter is opened and closed after imparting proper exposure to the photographic film. Next, the diaphragm is opened and the mirror is lowered in the step S2924. In the step S2923, a correction end signal is output to the lens control section 207 to end the process.

Next, the vibration correcting operation of the lens control section 207 will be described with reference to a flowchart of FIG. 17.

First, in the step S3030, the correcting optical system such as the correcting lens 205 is set to an initial position. Next, in the step S3031, it is judged whether a half-depression signal of the release button is input from the camera body control section 203 in the camera body 201. The half-depression signal of the release button is output according to the process in the above-mentioned step S2913.

As soon as the half-depression signal is input, the amount of vibration starts to be detected by the vibration detecting sensor 204 in the step S3032, and it is judged whether the amount of vibration is beyond the correctable range. When the amount of vibration is beyond the correctable range, a warning signal is output to the body control section 203. The body control section 203 judges the input of this warning signal in the above-mentioned step S2918, and carries out the warning indication in the step S2919.

Next, it is judged whether the battery flag B is set. The battery flag is a flag to be set in the step S2911 when more than the predetermined amount of the battery is spent. When the flag B is not set, the battery is sufficiently charged, so the vibration correction is started in the step S3036. When the battery flag B is set, the vibration correction is not performed, going to the following process.

Next, in the step S3037, it is judged whether the focusing abnormality flag D is set. The focusing abnormality flag D is a flag to be set in the step S2915 when abnormal focusing occurs. When the flag D is set, the procedure goes to the step S3038, and the vibration actuator 206 for vibration correction is stopped. Next, in the step S3039, the vibration detecting sensor 204 is stopped. In the step S3034, the vibration correcting lens 205 is set to the initial position to end the process. When the focusing abnormality flag D is not set in the step S3037, the vibration correction is continued until a vibration correction end signal is input in the step S3041. The vibration correction end signal is a signal output from the body control section 203 in accordance with the process in the above-mentioned step S2925. When the vibration correction end signal is input in the step S3041, the lens control section 207 terminates the vibration correction in the step S3042. Next, in the step S3043, the correcting optical system such as the correcting lens 205 is set to the initial position, ending the process.

Thus, in this embodiment, when a half-depression signal of the release button is input, the lens control section 207 starts the vibration detection by means of the vibration detecting sensor 204. Then, when the detected amount of vibration is beyond the correctable range, a warning signal is output to the body control section 203. Upon receiving the warning signal, the body control section 203 operates the buzzer 218 and the indicator 214 to warn the photographer that the amount of vibration is beyond the correctable range.

When the release operation is completed, the body control section 203 outputs a correction end signal to the lens control section 207. Upon receiving the correction end signal, the lens control section 207 terminates the vibration correction.

Next, an eighth embodiment of the present invention will be described.

Figure 18:
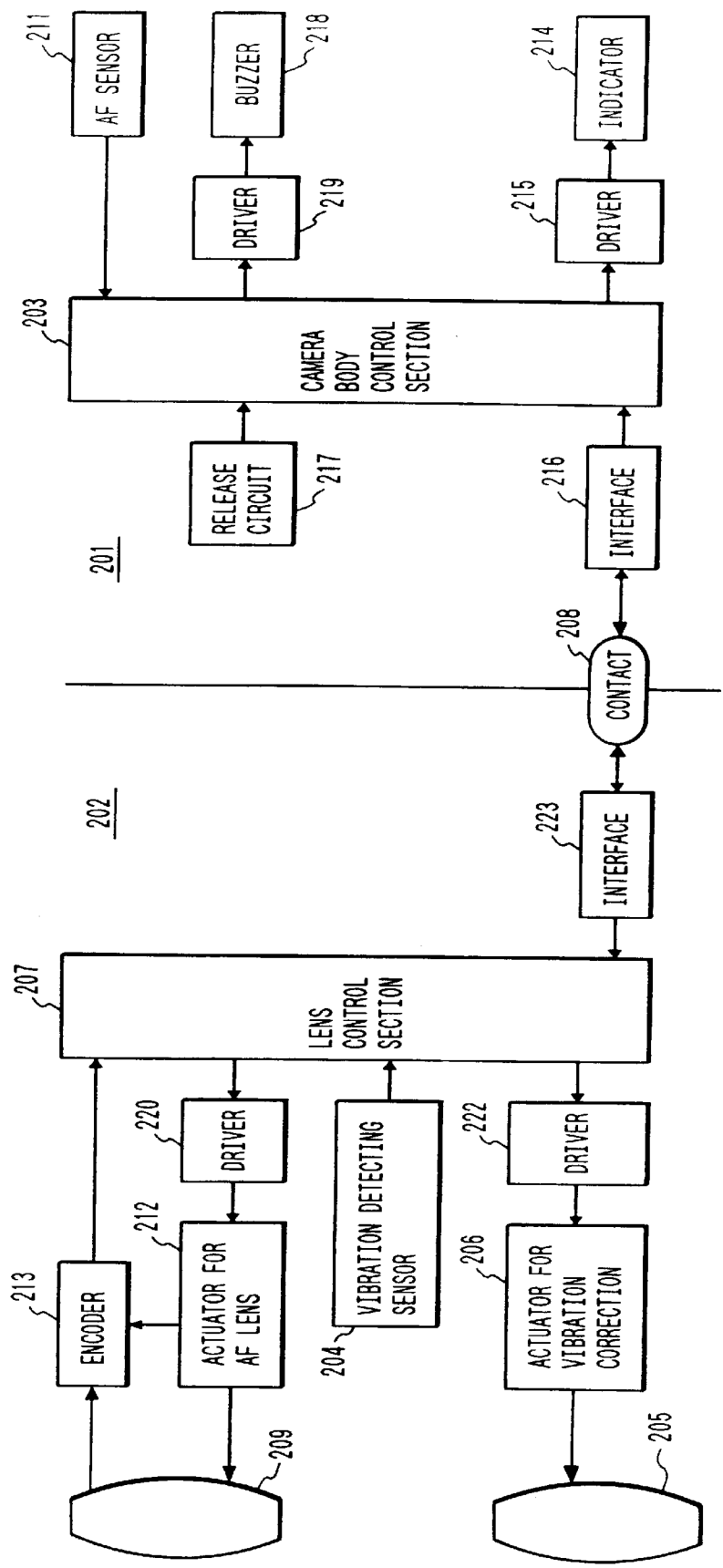
FIG. 18 is a block diagram showing circuits of a camera according to an eighth embodiment of the present invention.

FIG. 18 is a block diagram showing the control system of the vibration correction function of a vibration correction device. The encoder 213 detects the position of the AF lens 209 and outputs its result to the lens control section 207. The other structure is the same as the structure shown in FIG. 15 of the seventh embodiment, and then the description thereof will be omitted.

Figure 19A:
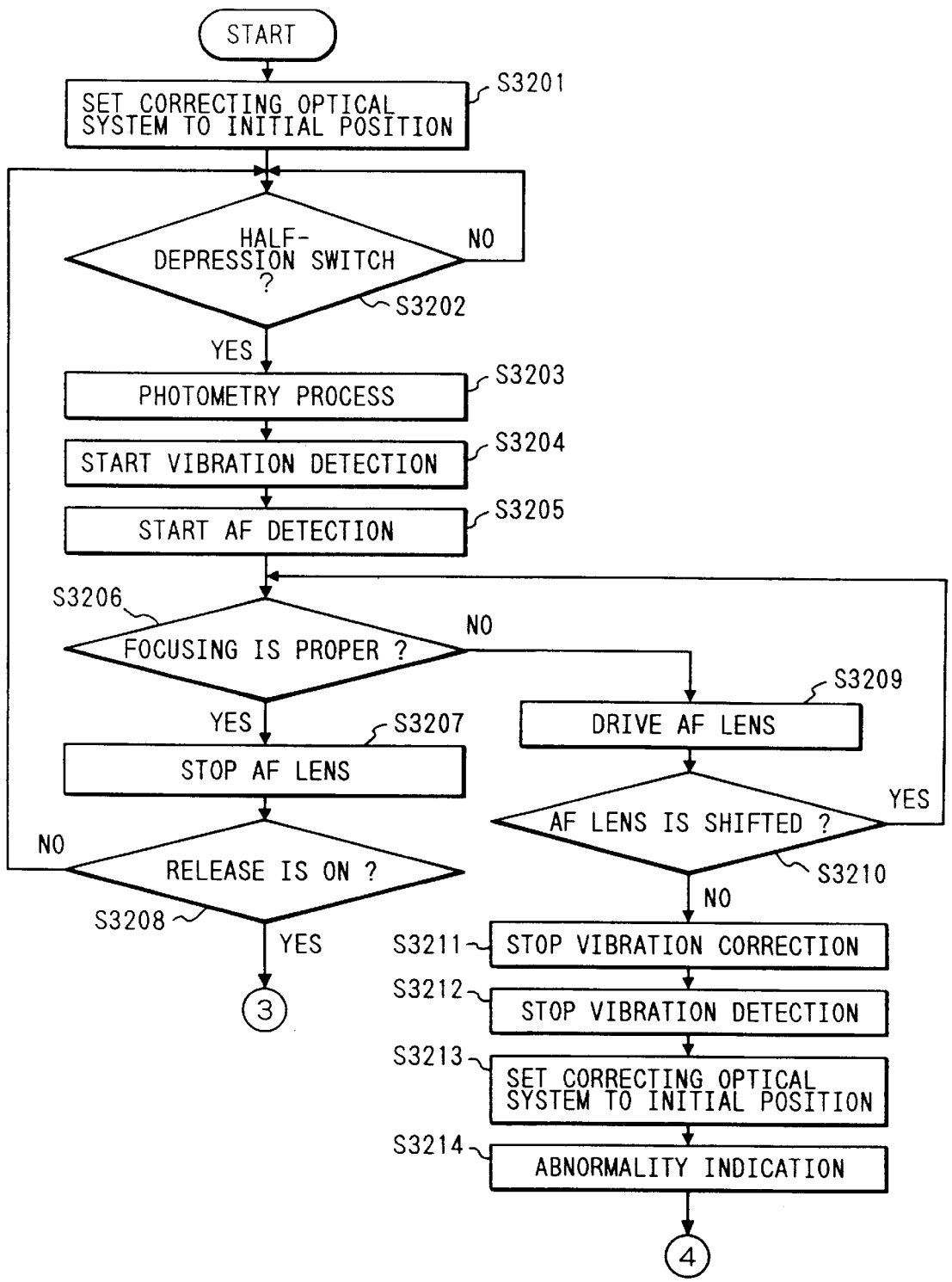
FIGS. 19A and 19B are flowcharts for explaining a process performed by the camera body control section of the camera of the eighth embodiment of the present invention.
Figure 19B:
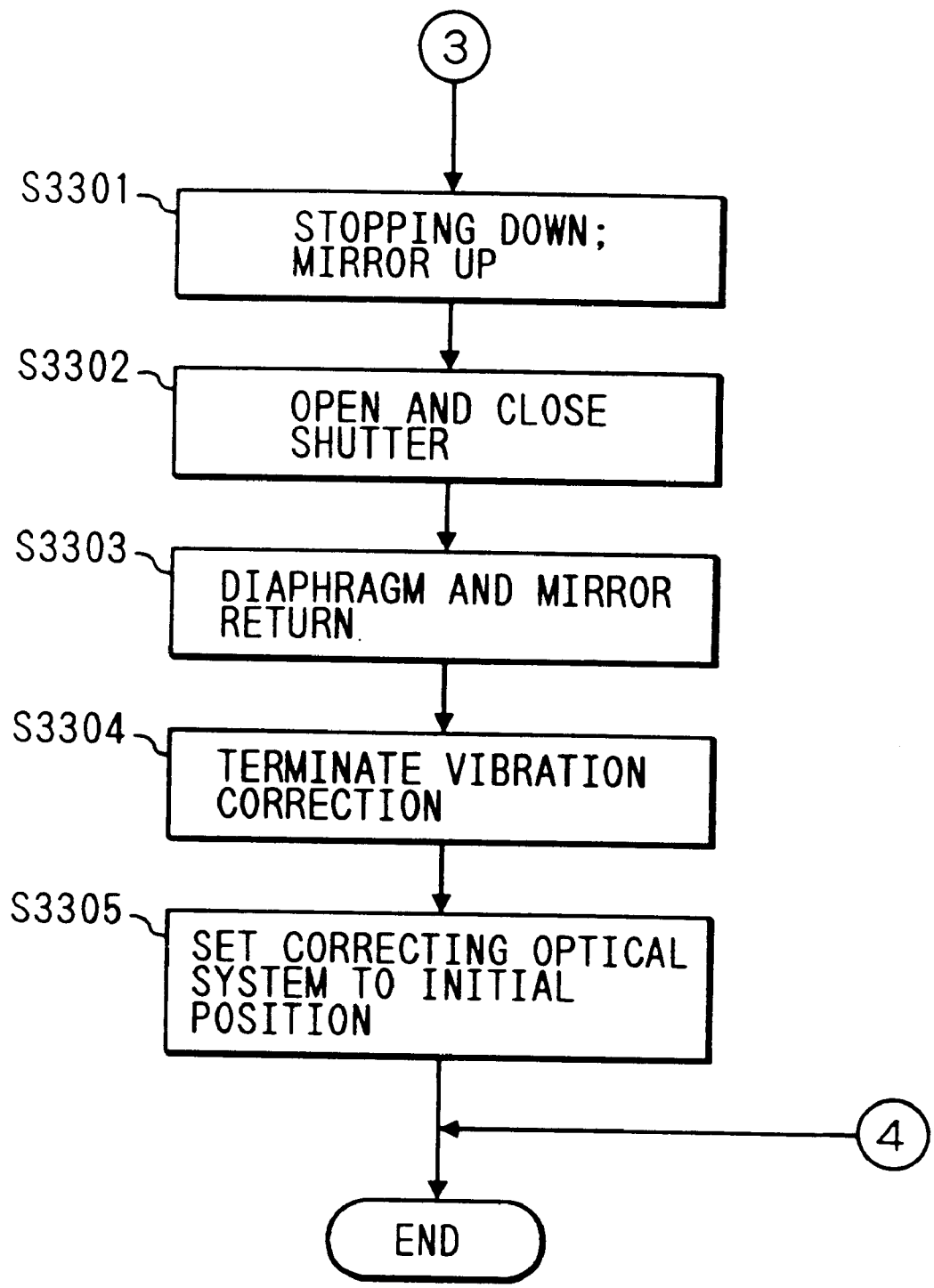

Next, the control of the camera body section 203 in the eighth embodiment will be described with reference to flowcharts shown in FIGS. 19A and 19B.

The main flow is started when the main switch is turned on.

First, in the step S3201, a signal is output to the lens control section 207 such that the correcting optical system such as the correcting lens 205 is set to the initial position. Next, in the step S3202, it is judged whether a half-depression signal of the release button is input from the camera body control section 203 in the camera body 201. In the step S3203, a photometry process is performed. The photometry process is a process for determining an F-number and a shutter speed for obtaining proper exposure in photographing by reading photometry information from a photometry section (not shown).

In the step S3204, a signal is output to the lens control section 207 so as to make the vibration detecting sensor 204 start detecting the amount of vibration, and the procedure goes to the step S3205. In the step S3205, the detection of the AF sensor 211 starts, and it is judged in the step S3206 whether the photographing optical system is focused on an object. When the focusing is proper, a signal is immediately output to the lens control section 207 to stop the drive of the AF lens 209 in the step S3207, and the procedure goes to the step S3208.

When the photographing optical system is not focused on the object properly in the step S3206, instructions are given to the lens control section 207 to drive the AF lens 209 in the step S3209. Next, in the step S3210, it is judged whether the AF lens 209 is actually driven in accordance with a signal from the encoder 213. When the AF lens 209 is actually driven, the procedure goes to the step S3206 and the above-mentioned process is repeated.

When the AF lens 209 is not actually driven in the step S3210, the procedure goes to the step S3211. Then, the correcting lens 205 is stopped by directing the lens control section 207 to stop the actuator 206 for vibration correction. Next, in the step S3212, instructions are given to the lens control section 207 to stop the vibration correcting sensor 204. Next, in the step S3213, instructions are given to the lens control section 207 to set the correcting optical system to the initial position. In the step S3214, the AF abnormality indication is carried out on the warning display panel 242.

When the release button is not wholly depressed in the step S3208, the procedure goes to the step S3202, and the above-mentioned process is repeated. When the release button is wholly depressed, the procedure goes to the step S3301 of FIG. 19B.

In the step S3301, the diaphragm mechanism is stopped down to set an F-number based on the result of the photometry process in the step S3203, and the mirror is raised up simultaneously. Then, in the step S3302, the shutter is opened and closed after imparting proper exposure to the photographic film. Next, the diaphragm is opened and the mirror is lowered in the step S3303. In the step S3305, a correction end signal is output to the lens control section 207 to end the process.

As the switch for preparation of starting photographing, instead of the half-depression switch, it is possible to utilize a switch for detecting the touch of a portion of the photographer's body, a sensor for detecting the photographer's approach toward the camera, or a sensor for detecting the photographer's line of sight.

The abnormality indication of the focusing may be carried out by flickering a portion or the whole of the liquid crystal display panel 131.

Figure 20:
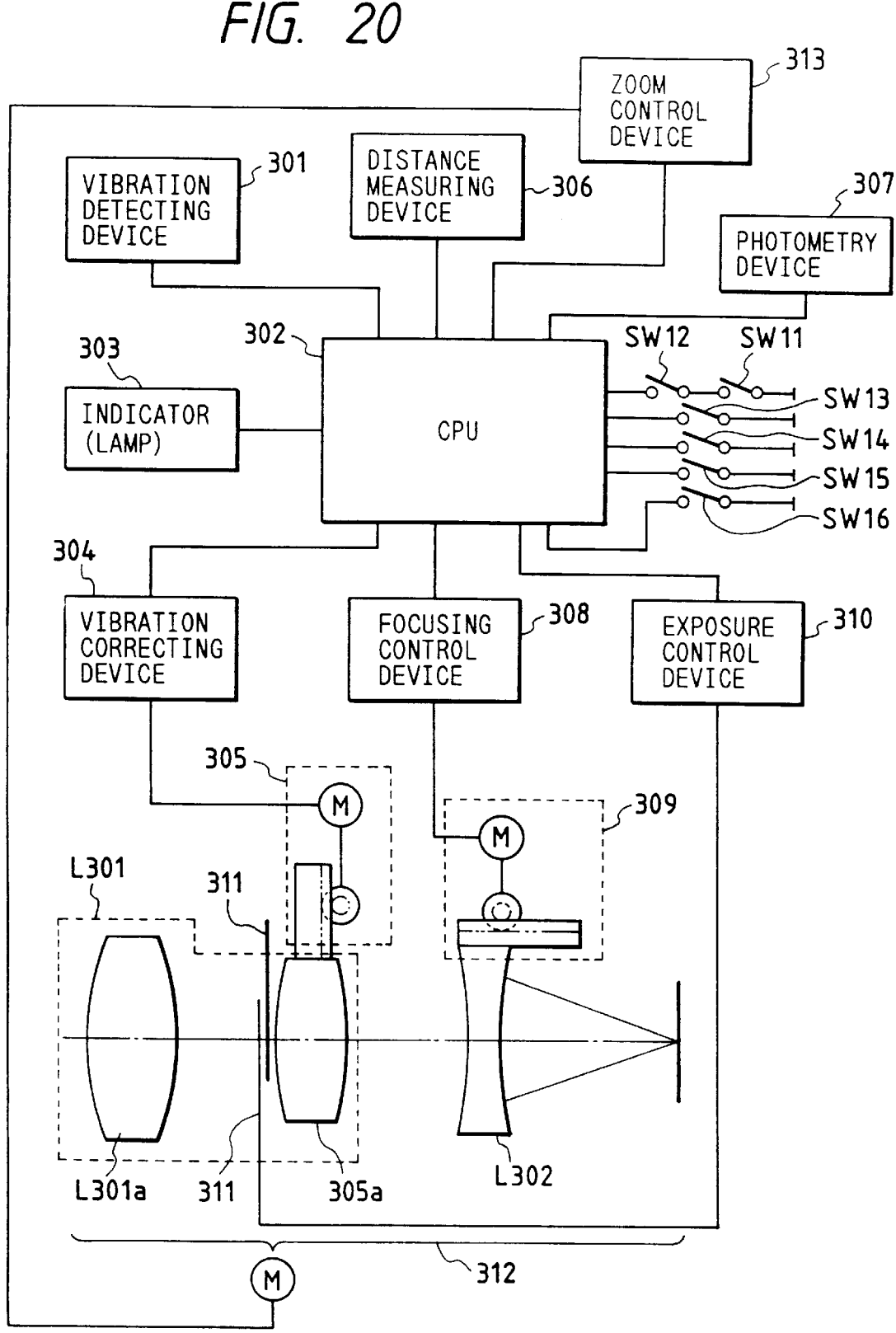
FIG. 20 is a block diagram showing circuits of a camera according to a ninth embodiment of the present invention.

FIG. 20 is a block diagram showing a camera with a vibration correction function according to a ninth embodiment of the present invention.

In FIG. 20, a photographing optical system is constituted of lens groups L301 and L302. The lens group L302 is shifted by a motor of a focusing drive device 309 in the optical axis direction to adjust a focal point to a surface of a photographic film. A vibration correcting lens group 305a forming a portion of the lens group L301 can be shifted by a motor of a lens drive device 305 in two directions perpendicular to the optical axis. By shifting the vibration correcting lens group 305a in a direction opposite to a direction in which the camera is shaken during exposure, it is possible to reduce the blurring of an image formed on the photographic film.

The lens groups L301a and 305a constituting the lens group L301 and the lens group L302 are driven by a motor in a zoom drive device 312 in the optical axis direction to vary their power. A shutter 311 is disposed in front of the vibration correcting lens group 305a (on the side of an object).

A CPU 302 controls whole sequences of the camera of this embodiment. Also, the CPU 302 has a timer circuit, a counter circuit, a memory circuit, a calculation circuit for executing various calculations.

A vibration detecting device 301 is a device for detecting an amount of vibration caused by a camera shake. The amount of vibration output from the vibration detecting device 301 is calculated by the CPU 312 and output as a vibration correcting signal.

A vibration correcting device 304 outputs a control signal for controlling the drive of the lens drive device 305 based on the vibration correcting signal from the CPU 312.

The lens drive device 305 shifts the vibration correcting lens group 305a based on the control signal from the vibration correcting device 304.

A distance measuring device 306 measures a distance to the object. Distance data output from the distance measuring device 306 is calculated by the CPU 302 in the FM calculation and output as a distance correcting signal.

A focusing control device 308 outputs a control signal for controlling the drive of a focusing drive device 309 based on the distance correcting signal from the CPU 302.

The focusing drive device 309 shifts the lens group L302 based on the control signal from the focusing control device 308.

A photometry device 307 is a device for measuring the luminance of the object. Photometry data output from the photometry device 307 is calculated in the AE calculation and output as an exposure signal.

An exposure control device 310 controls the shutter 311 based on the exposure signal from the CPU 302.

An indicator 303 is an LED or the like and indicates the state of the camera.

SW11 and SW12 are press button switches constituting a release button. The half depression of the release button causes the switch SW11 to be turned on, while the whole depression of the release button causes the switches SW11 and SW12 to be turned on.

SW13 and SW14 are press button switches. When the switch SW13 is turned on, the zoom control device 313 is driven via the CPU 302 to drive the lens groups L301, L302 by means of the motor of the zoom drive device 312 to zoom up them, i.e., to make them have a long focal length. When the switch SW14 is turned on, the zoom control device 313 is driven via the CPU 302 to drive the lens groups L301, L302 by means of the motor of the zoom drive device 312 to zoom down them, i.e., to make them have a short focal length. Thus, these switches SW13 and SW14 constitute a zoom operation button. SW15 is a press button switch, and each time the switch SW15 is turned on, a fixed magnification photographing mode is set or canceled. SW16 is a press button switch, and each time the switch SW16 is turned on, a zoom continuous shot photographing mode is set or canceled.

FIGS. 21, 22A to 22C and 23A to 23D are flowcharts for explaining the operation of the CPU 302 in the camera of this embodiment.

Figure 21:
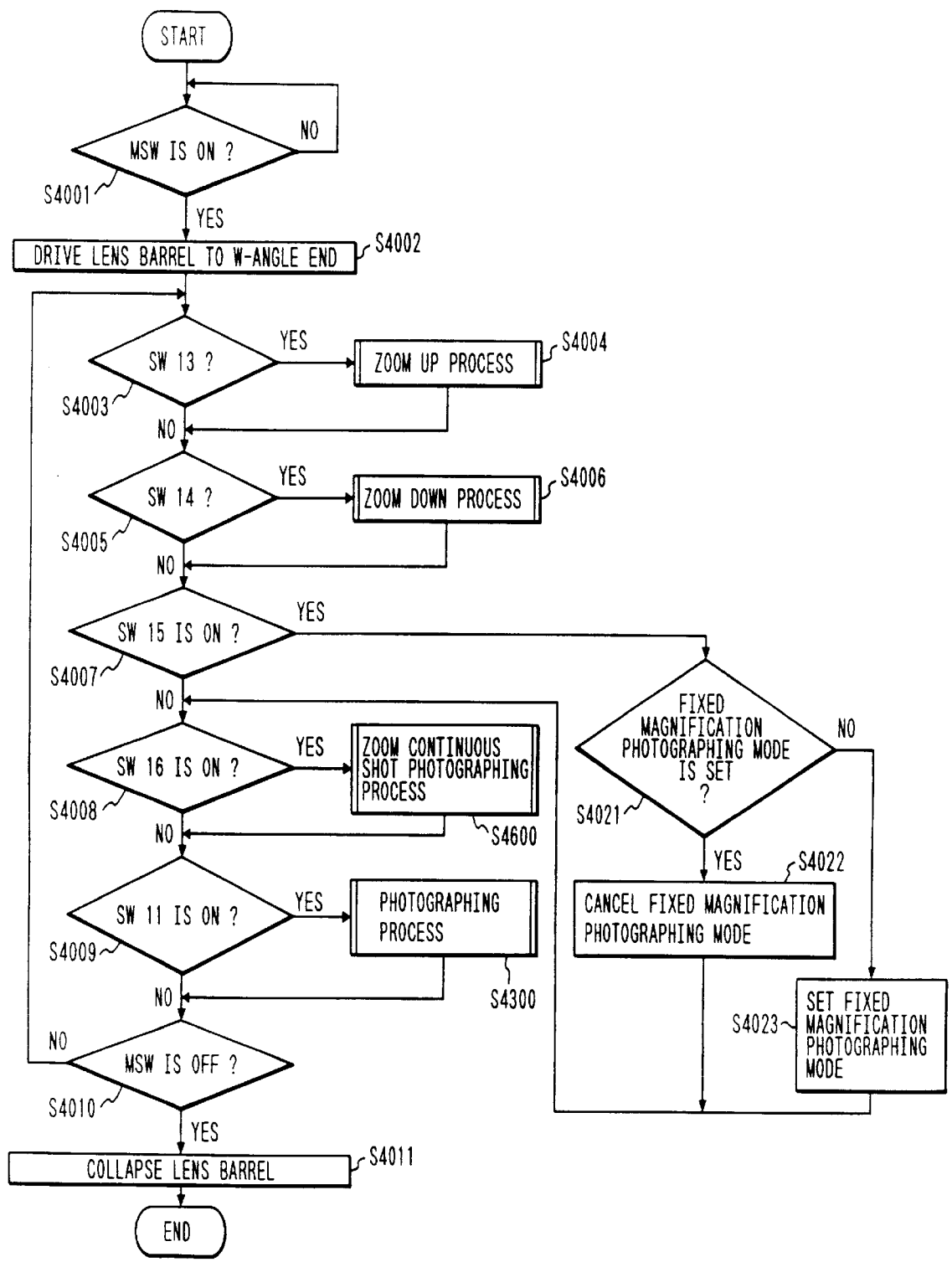
FIG. 21 is a flowchart showing a main flow of the ninth embodiment of the present invention.

FIG. 21 is a main flowchart showing the whole operation of the camera.

When the program is started, it is judged whether a main switch MSW (power source switch; not shown) is turned on in the step S4001, and wait until the main switch MSW is turned on. When the MSW is turned on, the lens barrel is driven to the wide-angle end (short focal length position) in the step S4002.

In the step S4003, it is judged whether the switch SW13 is on, and when it is on, a zoom up process is carried out in the step S4004, and the procedure goes to the step S4005. When the switch SW13 is off, the procedure goes to the step S4005.

In the step S4005, it is judged whether the switch SW14 is on, and when it is on, the procedure goes to the step S4006. When the switch SW14 is off, the procedure goes to the step S4007.

In the step S4006, a zoom down process is carried out, and the procedure goes to the step S4007. In the step S4007, it is judged whether the switch SW15 is turned on. When the switch SW15 is turned on, the procedure goes to the step S4021.

In the step S4021, it is judged whether the fixed magnification photographing mode is set. When the fixed magnification photographing mode is set, it is canceled in the step S4022, and the procedure goes to the step S4008.

When the fixed magnification photographing mode is not set in the step S4021, it is set in the step S4023, and the procedure goes to the step S4008.

In the step S4008, it is judged whether the switch SW16 is turned on, and when it is turned on, a zoom continuous shot photographing process is performed in the step S4600. Thereafter, the procedure goes to the step S4009. In the step S4009, it is judged whether the switch SW11 is turned on, and when it is turned on, a photographing process is performed in the step S4300. Thereafter, the procedure goes to the step S4010. When the switch SW11 is not turned on in the step S4009, the procedure goes to the step S4010.

In the step S4010, it is judged whether the MSW is off, and when it is on, the procedure returns to the step S4003. When it is off, the lens barrel is collapsed in the step S4011, ending the program.

Next, the sub-routine program of the photographing process will be described with reference to FIGS. 22A to 22C.

Figure 22A:
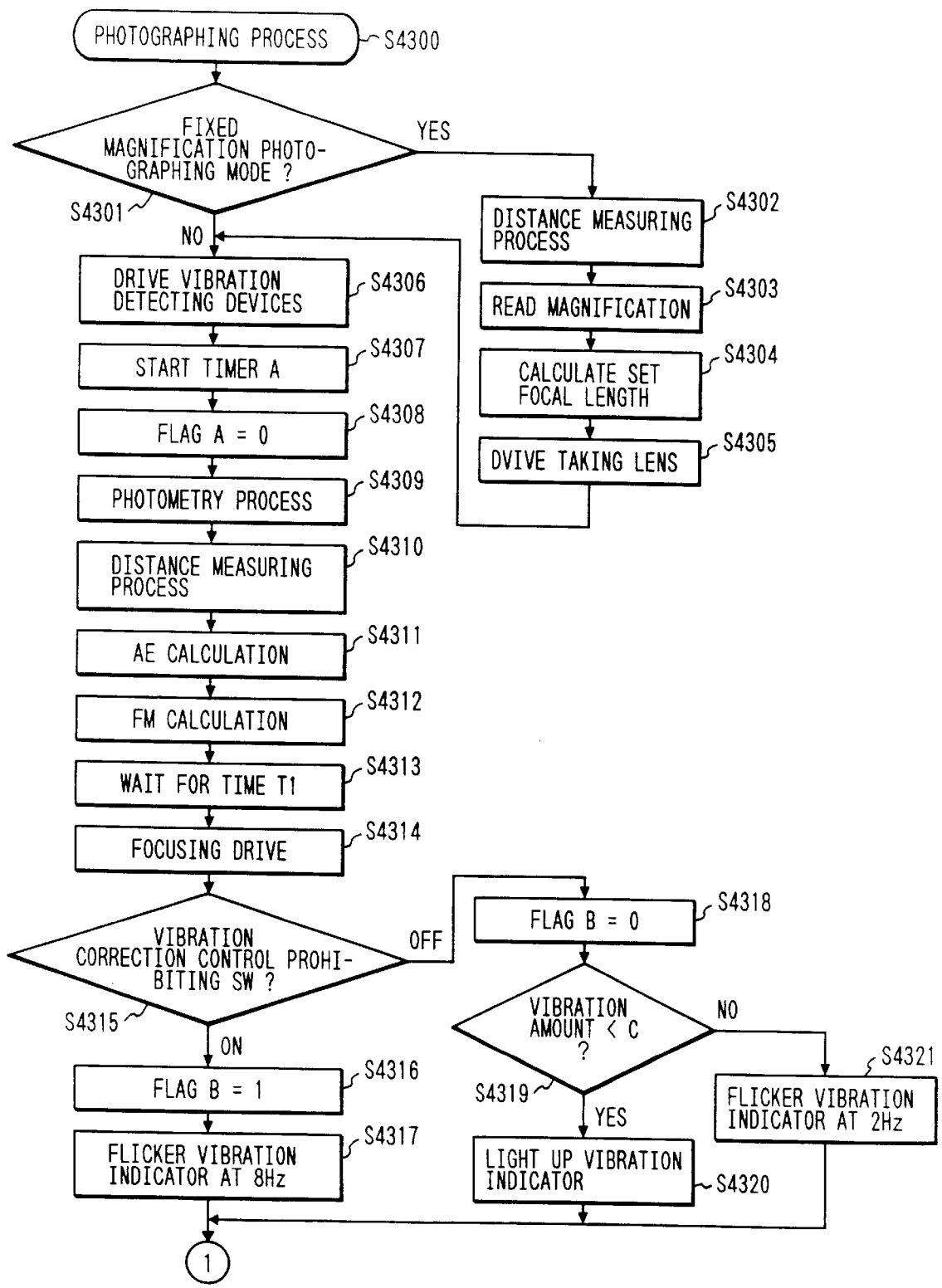
FIGS. 22A to 22C are flowcharts for explaining a photographing process of the ninth embodiment of the present invention.

In FIG. 22A, when the sub-routine program of the photographing process is started in the step S4300, it is judged whether the fixed magnification photographing mode is set, and when it is set, the procedure goes to the step S4302. On the other hand, when the fixed magnification photographing mode is not set, the procedure goes to the step S4306.

In the step S4302, distance data from the distance measuring device 306 is received (distance measuring process).

In the step S4303, the magnification is read, and in the step S4304, a set focal length is calculated. In the step S4305, the taking lens is driven in accordance with the set focal length, and the procedure goes to the step S4306.

In the step S4306, the vibration detecting device 301 is driven.

Next, in the step S4307, a timer A is started and in the step S4308, a flag A is set to "0".

In the step S4309, photometry data from the photometry device 307 is received (photometry process).

In the step S4310, distance data from the distance measuring device 307 is received (distance measuring process).

Thereafter, in the step S4311, the AE calculation is executed based on the photometry data received in the step S4309.

In the step S4312, the FM calculation is executed based on the distance data received in the step S4310.

Next, in the step S4313, wait for time T1, and the procedure goes to the step S4314. The wait for time T1 is secured to stabilize the vibration detecting device 301.

In the step S4314, the AF calculation is executed based on the distance data received in the step S4310, and the calculated signal is output to the focusing control device 308, whereby the focusing drive device 309 is driven to shift the lens group L302 to a predetermined position.

Next, in the step S4315, it is judged whether a vibration correction control prohibiting switch (not shown) is on. When it is on, the procedure goes to the step S4316, and the flag B is set to "1". Then, in the step S4317, the indicator 303 is flickered at 8 Hz, and the procedure goes to the step S4401. The 8 Hz flickering indication indicates that the vibration correction is not carried out.

In the step S4315, when it is ascertained that the vibration correction control prohibiting switch is off, the flag B is set to "0" in the step S4318.

Then, in the step S4319, it is judged whether the output of the vibration detecting device 301, i.e., the amount of vibration is smaller than a predetermined value C. The predetermined value C is the amount of vibration which can be corrected by the vibration correcting mechanism in the camera.

Figure 22B:
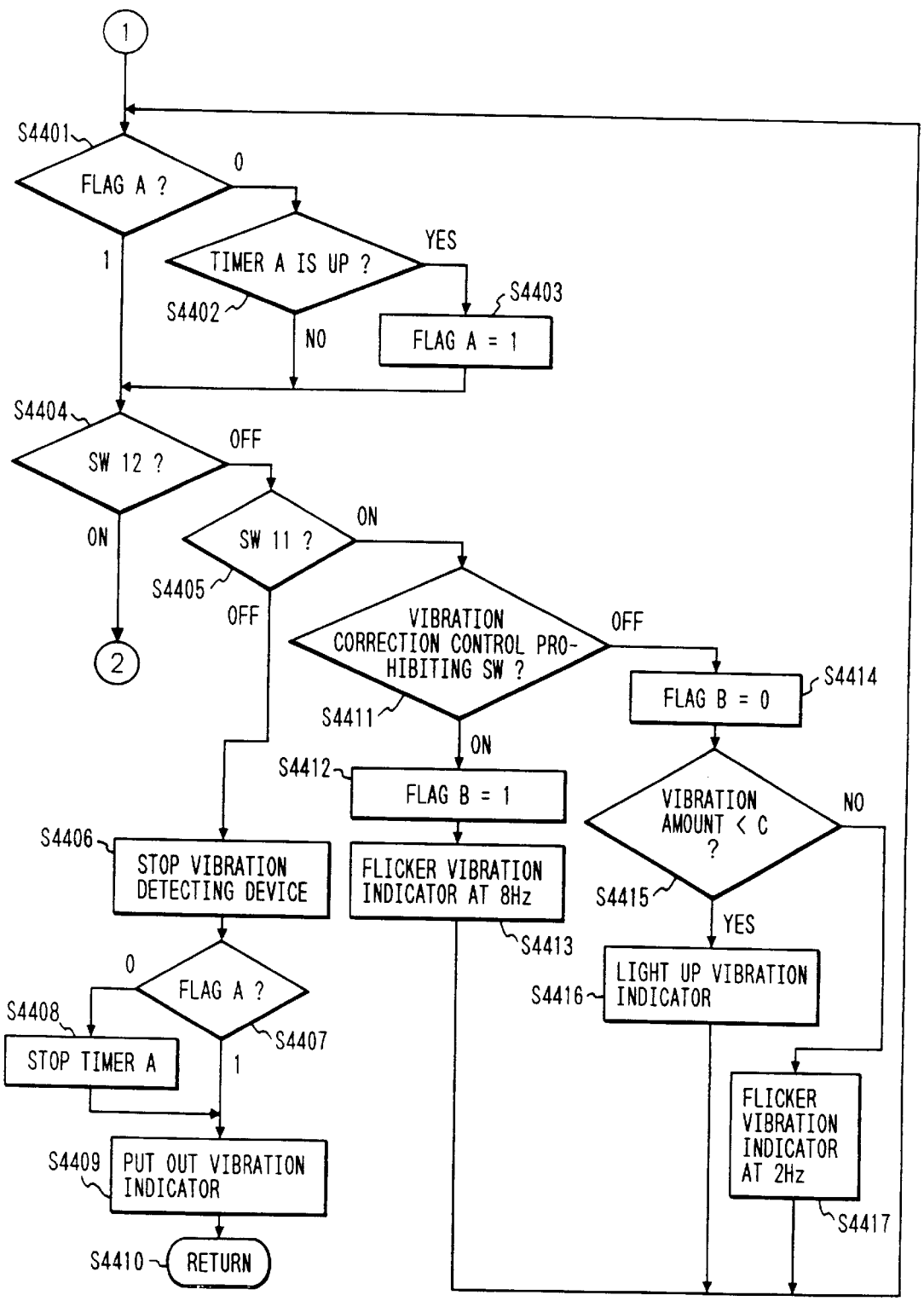

When the amount of vibration is smaller than the predetermined value C in the step S4319, the indicator 303 is lit up in the step S4320, and the procedure goes to the step S4401 of FIG. 22B. The lighting indication of the indicator 303 means that the detected amount of vibration is within a correctable range.

When the amount of vibration is larger than the predetermined value C in the step S4319, the indicator 303 is flickered at 2 Hz in the step S4321, and the procedure goes to the step S4401 of FIG. 22B. The 2 Hz flickering indication of the indicator 303 means that the detected amount of vibration is not within the correctable range.

In the step S4401 of FIG. 22B, the flag A is checked, and when the flag A set in the step S4308 is "0", the procedure goes to the step S4402.

When the flag A is set to "1" in the step S4401, the procedure goes to the step S4404.

In the step S4402, when the timer A is up (the timer A is up when the time necessary for detecting a reference value of the amount of vibration has elapsed), the flag A is set to "1" in the step S4403, and the procedure goes to the step S4404.

In the step S4404, it is ascertained whether the release button is wholly depressed (the switch SW12 is on), and when it is on, the procedure goes to the step S4501.

When the switch SW12 is off in the step S4404, it is ascertained whether the release button is half depressed (the switch SW11 is on) in the step S4405.

When the switch SW11 is off in the step S4405, the vibration detecting device 301 is stopped in the step S4406.

Thereafter, in the step S4407, the flag A is checked, and when the flag A is "1", the procedure goes to the step S4409. When the flag A is "0", the timer A is stopped in the step S4408, and the procedure goes to the step S4409.

In the step S4409, the indicator 303 is put out, and from the step S4410, the procedure returns to the flowchart of FIG. 21. In this case, photographing is not carried out.

After the switch SW11 is ascertained to be on in the step S4405, it is ascertained whether the vibration correction control prohibiting switch is on in the step S4411. When it is on, the flag B is set to "1". Then in the step S4413, the indicator 303 is flickered at 8 Hz, and the procedure returns to the step S4401.

When the vibration correction control prohibiting switch is off in the step S4411, the flag B is set to "0" in the step S4414. In the step S4415, it is judged whether the output of the vibration detecting device 301, the amount of vibration is larger than the predetermined value C.

When the amount of vibration is smaller than the predetermined value C in the step S4415, the indicator 303 is lit up in the step S4416, and the procedure returns to the step S4401.

When the amount of vibration is larger than the predetermined value C in the step S4415, the indicator 303 is flickered at 2 Hz in the step S4417, and the procedure returns to the step S4401.

Figure 22C:
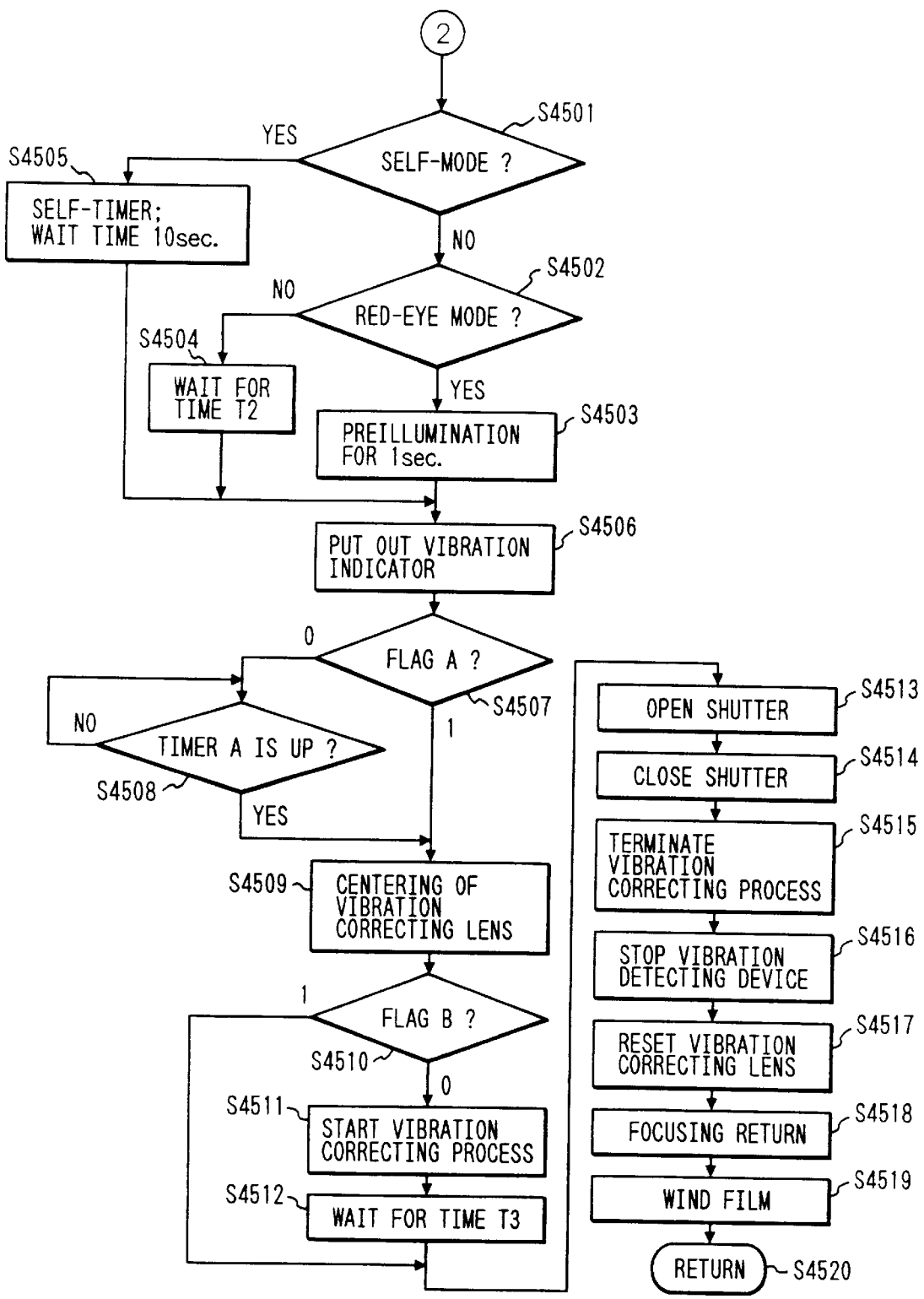

In the step S4501 of FIG. 22C, it is judged whether a self-mode is selected. When it is selected, the procedure goes to the step S4506 after a self-timer (e.g., 10 sec.) is up in the step S4505.

When the self-mode is not selected in the step S4501, a red-eye mode is checked in the step S4502. In the case of "YES", after preillumination is carried out for one second in the step S4503, the procedure goes to the step S4506. In the case of "NO", wait for time T2 (the shock avoiding time at the release), and the procedure goes to the step S4506.

In the step S4506, the indicator 303 is put out, and the procedure goes to the step S4507.

In the step S4507, the flag A is checked, and when the flag A is "1", the procedure goes to the step S4509. When the flag A is "0" in the step S4507, wait in the step S4508 when the timer A started in the step S4307 is up, and thereafter, the procedure goes to the step S4509.

In the step S4509, the center of the vibration correcting lens 305a is moved from the initial reset position to the center position of the optical axis.

Next, in the step S4510, the flag B is checked. When the flag B is "1" in the step S4510, it is recognized as the vibration correction control prohibiting mode, and the procedure goes to the step S4513.

When the flag B is "0" in the step S4510, it is recognized as the mode for performing the vibration correction control, and a vibration correcting process is started in the step S4511. Thereafter, in the step S4512, wait for time T3 (the approach run time for stabilization of the vibration correction control), and the procedure goes to the step S4513.

In the step S4513, the shutter starts opening.

The vibration correcting process continues from the step S4511 before the opening of the shutter to the step S4515 immediately after the closing of the shutter.

The shutter is opened at a predetermined shutter speed based on the exposure value in accordance with the AE calculation value obtained in the step S4311.

Thereafter, the shutter is closed in the step S4514, and the vibration correcting process is terminated in the step S4515.

Then, in the step S4516, the vibration detecting device 301 is stopped.

Next, the vibration correcting lens 305a is returned to the initial position in the step S4517, and the focusing lens L302 is driven to the predetermined reset position in the step S4518.

Then, in the step S4519, the photographic film is wound.

Thereafter, from the step S4520, the procedure returns to the flowchart of FIG. 21.

Next, the sub-routine program of the zoom continuous shot photographing process will be described with reference to FIGS. 23A–23D.

When the sub-routine program of the zoom continuous shot photographing mode starts in the step S4600, a zoom switch flag is reset in the step S4601. This zoom switch flag is for judging whether the zoom operation button is operated, and set upon the operation of the zoom operation button.

After the zoom switch flag is reset in the step S4601, it is judged whether the switch SW13 is on in the step S4602. When denied, the procedure goes to the step S4603.

In the step S4603, it is judged whether the switch SW14 is on. When denied, the procedure goes to the step S4604.

In the step S4604, it is judged whether the switch SW11 is on, i.e., the release button is half depressed. When affirmed, the procedure goes to the step S4605, while when denied, the procedure returns to the step S4602.

In the step S4605, the number m of set focal lengths (f mm) in the zoom continuous shot photographing is read from a memory circuit (not shown).

Next, in the step S4606, the count n of a counter in the counter circuit is set to "0".

Further, in the step S4607, the count n of the counter is compared with the number m (preset in the CPU 302) of set focal lengths and it is judged whether both values are equal. When they are equal, the procedure returns to the flowchart of FIG. 21 from the step S4608. On the other hand, when denied in the step S4607, the procedure goes to the step S4609.

In the step S4609, the count of the counter is increased by 1.

In the step S4610, the n-th (at first, n=1) set focal length (f mm) is read from the memory circuit.

In the step S4611, it is judged whether this value is closer to the wide-angle (W) side than the present focal length f mm. When the value of the n-th set focal length (f mm) is closer to the wide-angle (W) side than the present focal length f mm, the procedure goes to the step S4612. When the value of the n-th set focal length (f mm) is closer to the telescopic (T) side than the present focal length f mm, the procedure goes to the step S4613.

In the step S4612, the lens barrel is zoomed down till the following focal length f mm, and the procedure goes to the step S4701.

In the step S4613, the lens barrel is zoomed up till the following focal length f mm, and the procedure goes to the step S4701.

On the other hand, when the switch SW13 is on in the step S4602, the procedure goes to the step S4621.

In the step S4621, a zoom down flag is set.

Next, in the step S4622, the lens barrel is zoomed up to the telescopic end, and the procedure goes to the step S4623.

Also, in the step S4603, when the switch SW14 is on, the procedure goes to the step S4624.

In the step S4624, the zoom down flag is reset.

Next, in the step S4625, the lens barrel is zoomed down till the wide-angle end, and the procedure goes to the step S4623.

In the step S4623, the zoom SW flag is set, and the procedure returns to the step S4602.

Figure 23A:
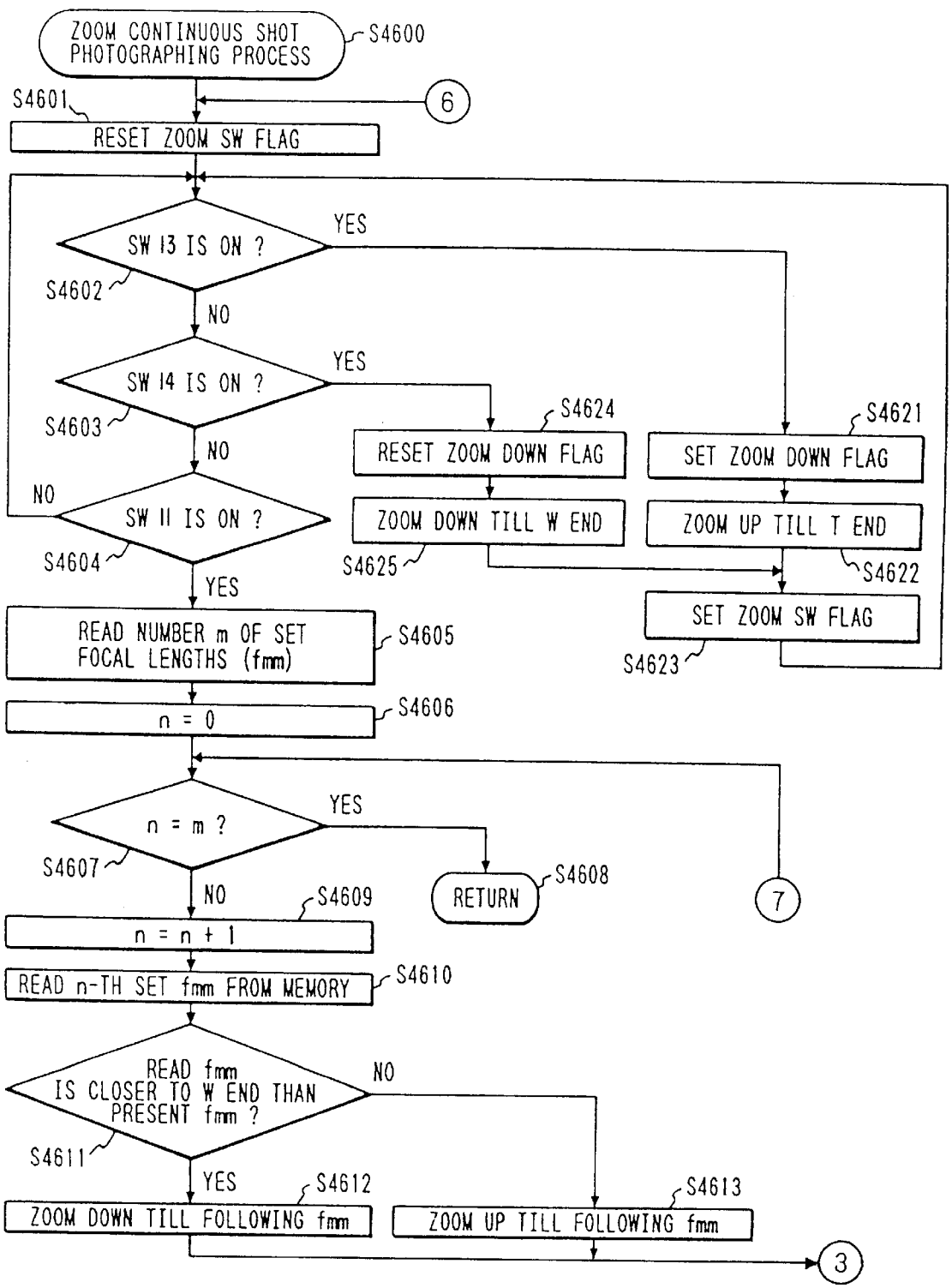
FIGS. 23A to 23D are flowcharts for explaining a zoom continuous shot photographing process of the ninth embodiment of the present invention.
Figure 23B:
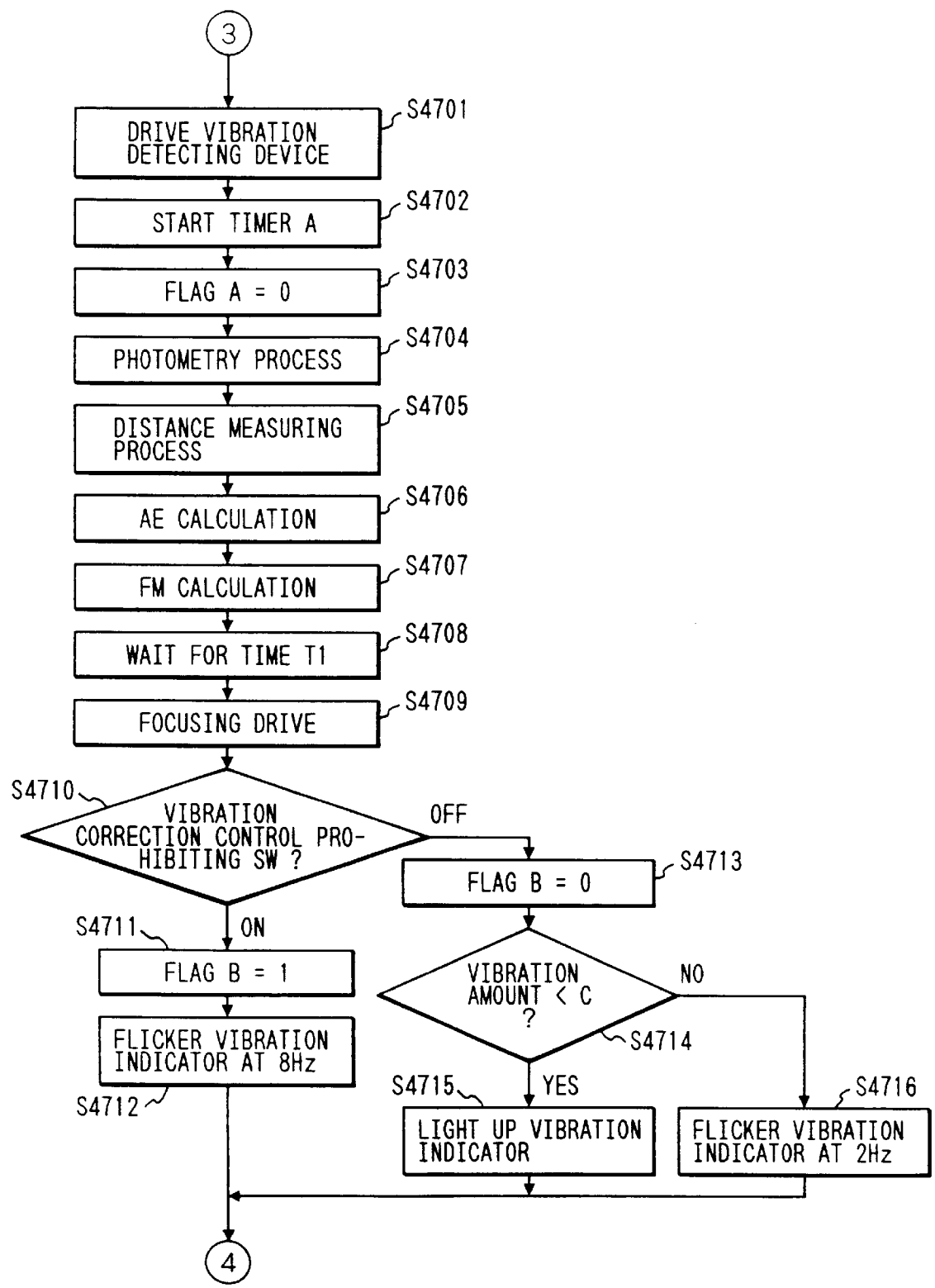

In the step S4701 of FIG. 23B, the vibration detecting device 301 is driven.

Next, the timer A is started in the step S4702, and the flag A is set to "0" in the step S4703.

Then, in the step S4704, photometry data from the photometry device 307 is received (photometry process).

In the step S4705, distance data from the distance measuring device 306 is received (distance measuring process).

Thereafter, in the step S4706, the AE calculation is executed based on the photometry data received in the step S4704.

In the step S4707, the FM calculation is executed based on the distance data received in the step S4705.

Next, in the step S4708, wait for time T1, and the procedure goes to the step S4709. The wait for time T1 is the time secured to stabilize the vibration detecting device 301.

In the step S4709, the AF calculation is executed based on the distance data received in the step S4705, and a calculated signal is output to the focusing control device 308, whereby the focusing drive device 309 is driven to shift the lens group L302 to a predetermined position.

Next, in the step S4710, it is judged whether the vibration correction control prohibiting switch (not shown) is on. When it is on, the procedure goes to the step S4711, and the flag B is set to "1". Then, in the step S4712, the indicator 303 is flickered at 8 Hz, and the procedure goes to the step S4801. The 8 Hz flickering indication means that the vibration correction control is not performed.

When the vibration correction control prohibiting switch is off in the step S4710, the flag B is set to "0" in the step S4713.

Then, in the step S4714, it is judged whether the output of the vibration detecting device 301, i.e., the amount of vibration is smaller than the predetermined value C. The predetermined value C is the amount of vibration which can be corrected by the vibration correcting mechanism in the camera.

Figure 23C:
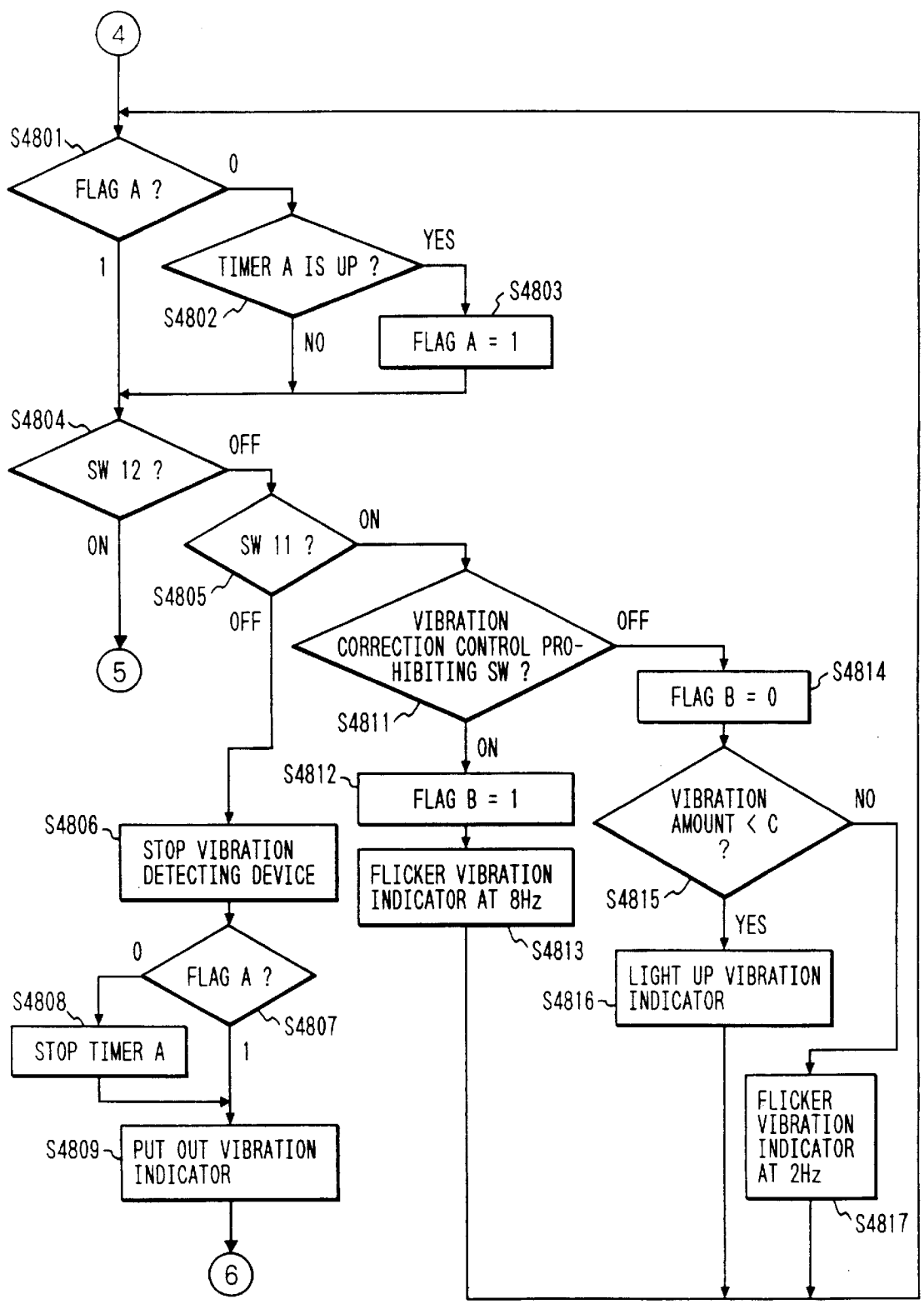

When the amount of vibration is smaller than the predetermined value C in the step S4714, the indicator 303 is lit up in the step S4715, and the procedure goes to the step S4801 of FIG. 23C. The lighting indication of the indicator 303 means that the detected amount of vibration is within a correctable range.

When the amount of vibration is larger than the predetermined value C in the step S4714, the indicator 303 is flickered at 2 Hz in the step S4716, and the procedure goes to the step S4801. The 2 Hz flickering indication of the indicator 303 means that the detected amount of vibration is not within the correctable range.

In the step S4801 of FIG. 23C, the flag A is checked and when the flag A set in the step S4701 is "0", the procedure goes to the step S4802.

When the flag A is "1", the procedure goes to the step S4804.

In the step S4802, when it is ascertained that the timer A is up (the timer A is up after the time required for detecting the reference value of the amount of vibration has elapsed), the flag A is set to "1" in the step S4803, and the procedure goes to the step S4804.

Figure 23D:
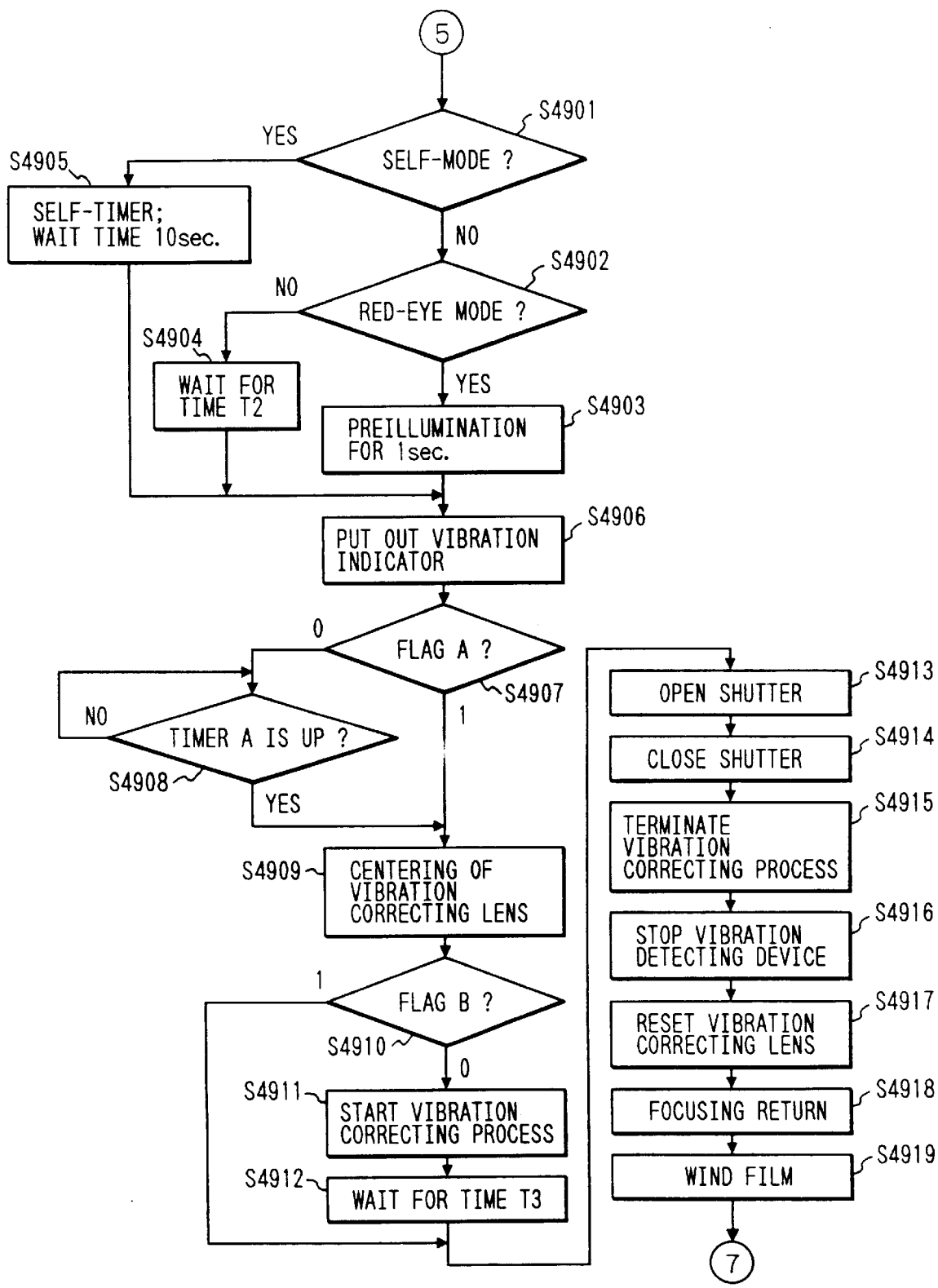

In the step S4804, it is ascertained whether the release button is wholly depressed (the switch SW12 is on), and when it is on, the procedure goes to the step S4901 of FIG. 23D.

When the switch SW12 is off in the step S4804, it is ascertained whether the release button is half depressed (the switch SW11 is on) in the step S4805.

When the switch SW11 is off in the step S4805, the vibration detecting device 301 is stopped in the step S4806.

Thereafter, in the step S4807, the flag A is checked, and when the flag A is "1", the procedure goes to the step S4809. On the other hand, when the flag A is "0", the timer A is stopped in the step S4808, and the procedure goes to the step S4809.

In the step S4809, the indicator 303 is put out, and the procedure goes to the step S4601 of FIG. 23A. In this case, photographing is not carried out.

When the switch SW11 is on in the step S4805, it is ascertained whether the vibration correction control prohibiting switch is on in the step S4811. When it is on, the flag B is set to "1" in the step S4812. Then, in the step S4813, the indicator 303 is flickered at 8 Hz, and the procedure returns to the step S4801.

When the vibration correction control prohibiting switch is off in the step S4811, the flag B is set to "0" in the step S4814, and it is judged whether the output of the vibration detecting device 301, i.e., the amount of vibration is larger than the predetermined value C.

When the amount of vibration is smaller than the predetermined value C in the step S4815, the indicator 303 is lit up in the step S4816, and the procedure returns to the step S4801.

When the amount of vibration is larger than the predetermined value C in the step S4815, the indicator 303 is flickered at 2 Hz in the step S4817, and the procedure returns to the step S4801.

In the step S4901 of FIG. 23D, it is judged whether a self-mode is selected. When it is selected, the procedure goes to the step S4906 after a self-timer (e.g., 10 sec.) is up in the step S4905.

When the self-mode is not selected in the step S4901, a red-eye mode is checked in the step S4902. In the case of "YES", preillumination is carried out for one second in the step S4903, and the procedure goes to the step S4906. In the case of "NO", wait for time T2 (the shock avoiding time at the time of a release) in the step S4904, and the procedure goes to the step S4906.

In the step S4906, the indicator 303 is put out, and the procedure goes to the step S4907.

In the step S4907, the flag A is checked, and when the flag A is "1", the procedure goes to the step 4909. When the flag A is "0" in the step S4907, wait until the timer A started in the step S4702 is up in the step S4908, and the procedure goes to the step S4909.

In the step S4909, the center of the vibration correcting lens 305a is moved from the initial reset position to the center position of the optical axis.

In the step S4910, the flag B is checked. When the flag B is "1" in the step S4910, it is recognized as the vibration correction control prohibiting mode, and the procedure goes to the step S4913.

When the flag B is "0" in the step S4910, it is recognized as the mode for performing the vibration correction control, and the vibration correcting process is started in the step S4911. Thereafter, in the step S4912, wait for time T3 (the approach run time for stabilization of the vibration correction control), and the procedure goes to the step S4913.

In the step S4913, the shutter starts opening.

The vibration correcting process continues from the step S4911 before the opening of the shutter to the step S4915 immediately after the closing of the shutter.

The shutter is opened at a predetermined shutter speed based on the exposure value in accordance with the AE calculation value obtained in the step S4706.

Thereafter, the shutter is closed in the step S4914, and the vibration correcting process is terminated in the step S4915.

Then, the vibration detecting device 301 is stopped in the step S4916.

Next, the vibration correcting lens 305a is returned to the initial position in the step S4917, and the focusing lens L302 is driven to the predetermined reset position in the step S4918.

Then, in the step S4919, the photographic film is wound.

Thereafter, the procedure goes to the step S4602 of FIG. 23A.

In this embodiment, the taking lens is the zoom lens, but may be a multifocal lens such as a bifocal lens capable of changing its refractive power with the focal length 35 mm and 70 mm.

Having described preferred embodiments of the present invention, it is to be understood that any variations will occur to those skilled in the art within the scope of the appended claims.

What is claimed is:

1. A camera with a vibration correction function, comprising:
   a photographing optical system to photograph an object field;
   a focus adjusting device to perform focus adjustment of said photographing optical system;
   a shutter to open and close a light path of said photographing optical system;
   a vibration correcting device to correct vibration of said camera at the time of photographing; and
   a control device to prohibit the operation of said vibration correcting device in response to an abnormality of said focus adjusting device.

2. A camera according to claim 1, wherein said vibration correcting device has a vibration detecting section to detect said vibration of said camera at the time of photographing, and said control device prohibits the operation of said vibration detecting section in response to the abnormality of said focus adjusting device.

3. A camera according to claim 1, wherein said vibration correcting device has a vibration detecting section to detect said vibration of said camera at the time of photographing and a vibration correcting section to correct said vibration in response to the detection of said vibration detecting section, and said control device prohibits the operation of said vibration correcting section in response to the abnormality of said focus adjusting device.

4. A camera according to claim 1, wherein said focus adjusting device has a focus detecting section to detect a focusing condition of an object and outputting a focus detection signal; and an adjusting section to perform focus adjustment of said photographing optical system in response to said focus detection signal, and said control device prohibits the operation of said vibration correcting device in response to the abnormality of said adjusting section.

5. A camera according to claim 1, wherein said focus adjusting device has a focus detecting section to detect a focusing condition of an object and outputting a focus detection signal; and an adjusting section to perform focus adjustment of said photographing optical system in response to said focus detection signal, and said control device prohibits the operation of said vibration correcting device in response to the abnormality of said focus detecting section.

6. A camera according to claim 5, wherein the abnormality of said focus detecting section means that said focus detection signal is not output.

7. A camera according to claim 4, wherein said focusing adjusting section has a drive portion to drive said photographing optical system to a predetermined position in response to said focus detection signal; and a position detecting portion to detect the position of said photographing optical system, and when said position detecting portion detects that said photographing optical system is not driven to said predetermined position, said control device prohibits the operation of said vibration correcting device.

8. A camera according to claim 1, wherein said focus detecting device has a distance measuring section to measure a distance to an object and outputting a distance signal; and a focus adjusting section to perform focus adjustment of said photographing optical system in response to said distance signal, and said control device prohibits the operation of said vibration correcting device in response to the abnormality of said focus adjusting section.

9. A camera according to claim 1, wherein said focus adjusting device has a distance measuring section to measure a distance to an object and outputting a distance signal; and a focus adjusting section to perform focus adjustment of said photographing optical system in response to said distance signal, and said control device prohibits the operation of said vibration correcting device in response to abnormality of said distance measuring section.

10. A camera according to claim 9, wherein the abnormality of said distance measuring section means that said distance signal is not output.

11. A camera according to claim 1, wherein said control device prohibits the operation of said shutter in response to the abnormality of said focus adjusting device.

12. A camera according to claim 1, wherein said control device is a one chip microcomputer.

13. A camera with a vibration correction function, comprising:

a focus adjusting device to perform focus adjustment of an optical system;

a vibration correcting device to correct vibration of said camera at the time of photographing; and a control device to prohibit the operation of said vibration correcting device in response to an abnormality of said focus adjusting device.

* * * * *